United States Patent
Nassiri-Toussi et al.

(10) Patent No.: US 8,170,617 B2
(45) Date of Patent: May 1, 2012

(54) EXTENSIONS TO ADAPTIVE BEAM-STEERING METHOD

(75) Inventors: Karim Nassiri-Toussi, Belmont, CA (US); Jeffrey M. Gilbert, Palo Alto, CA (US)

(73) Assignee: SiBeam, Inc., Sunnyvale, CA (US)

( * ) Notice: Subject to any disclaimer, the term of this patent is extended or adjusted under 35 U.S.C. 154(b) by 911 days.

(21) Appl. No.: 12/055,160

(22) Filed: Mar. 25, 2008

(65) Prior Publication Data

US 2008/0240031 A1 Oct. 2, 2008

Related U.S. Application Data

(60) Provisional application No. 60/920,168, filed on Mar. 26, 2007.

(51) Int. Cl.
*H04M 1/00* (2006.01)
(52) U.S. Cl. ............ 455/562.1; 455/101; 375/299
(58) Field of Classification Search ............ 455/561, 455/562.1, 101, 103; 375/299
See application file for complete search history.

(56) References Cited

U.S. PATENT DOCUMENTS

| | | | | |
|---|---|---|---|---|
| 6,133,868 A * | 10/2000 | Butler et al. | | 342/174 |
| 6,218,985 B1 * | 4/2001 | Adams | | 342/372 |
| 7,898,478 B2 * | 3/2011 | Niu et al. | | 342/377 |
| 2005/0135318 A1 | 6/2005 | Walton et al. | | |
| 2005/0141545 A1 * | 6/2005 | Fein et al. | | 370/445 |
| 2005/0220228 A1 * | 10/2005 | Trachewsky et al. | | 375/343 |
| 2007/0037528 A1 | 2/2007 | Doan et al. | | |
| 2007/0099666 A1 * | 5/2007 | Astely et al. | | 455/562.1 |
| 2007/0211823 A1 * | 9/2007 | Mazzarese et al. | | 375/299 |
| 2008/0198801 A1 * | 8/2008 | Kesselman et al. | | 370/329 |
| 2010/0166107 A1 * | 7/2010 | Webster et al. | | 375/295 |

FOREIGN PATENT DOCUMENTS

| | | |
|---|---|---|
| EP | 1 326 356 A | 7/2003 |
| WO | WO 00/72464 A | 11/2000 |
| WO | WO 01/69814 A | 9/2001 |
| WO | WO 2006/043242 A | 4/2006 |
| WO | WO 2007/095328 A | 8/2007 |

OTHER PUBLICATIONS

International Serach Report mailed Nov. 3, 2008 for PCT/US08/003974, filed Mar. 25, 2008, 8 pages.
Written Opinion of the International Seraching Authority mailed Nov. 3, 2008 for PCT/US08/003974, filed Mar. 25, 2008, 10 pages.

* cited by examiner

*Primary Examiner* — Raymond Dean
(74) *Attorney, Agent, or Firm* — Blakely, Sokoloff, Taylor & Zafman LLP

(57) ABSTRACT

A radio frequency (RF) transmitter is coupled to and controlled by a processor to transmit data. A physical layer circuit is coupled to the RF transmitter to encode and decode between a digital signal and a modulated analog signal. The physical layer circuit comprises a high rate physical layer circuit (HRP) and a low rate physical layer circuit (LRP). In a first embodiment, the LRP circuit generates a LRP packet comprising an LRP transmit power control feedback. In a second embodiment, the LRP and HRP circuit generate a packet comprising a beam-forming phase and magnitude feedback information. In a third embodiment, the LRP and HRP circuit supports up to 64 independent transmit antenna elements.

55 Claims, 46 Drawing Sheets

| Data Rate Mode | Modulation | FEC | PHY Rate (Mbps) | | Replication Omni/BF |
|---|---|---|---|---|---|
| | | | Omni | Beam-Formed | |
| 0 | BPSK | 1/3 | 2.512 | 20.096 | 8x / 1x |
| 1 | BPSK | 1/2 | 3.768 | 30.144 | 8x / 1x |
| 2 | BPSK | 2/3 | 5.024* | 40.192 | 8x / 1x |
| 3 | BPSK | 2/3 | 10.048* | . | 4x / - |

1500

| Code Rate r | Puncturing pattern | Transmitted sequence |
|---|---|---|
| 1/3 | X: 1<br>Y: 1<br>Z: 1 | $X_1Y_1Z_1$ |
| 4/7 | X: 1111<br>Y: 1011<br>Z: 0000 | $X_1Y_1X_2X_3Y_3X_4Y_4$ |
| 2/3 | X: 11<br>Y: 10<br>Z: 00 | $X_1Y_1Z_2$ |
| 4/5 | X: 1111<br>Y: 1000<br>Z: 0000 | $X_1Y_1X_2X_3X_4$ |

| Data Rate Mode | Modulation | FEC | PHY Rate (Mbps) | | Replication Omni/BF |
|---|---|---|---|---|---|
| | | | Omni | Beam-Formed | |
| 0 | BPSK | 1/3 | 2.512 | 20.096 | 8x / 1x |
| 1 | | 1/2 | 3.768 | 30.144 | 8x / 1x |
| 2 | | 2/3 | 5.024* | 40.192 | 8x / 1x |
| 3 | | 2/3 | 10.048* | - | 4x / - |

FIG. 15

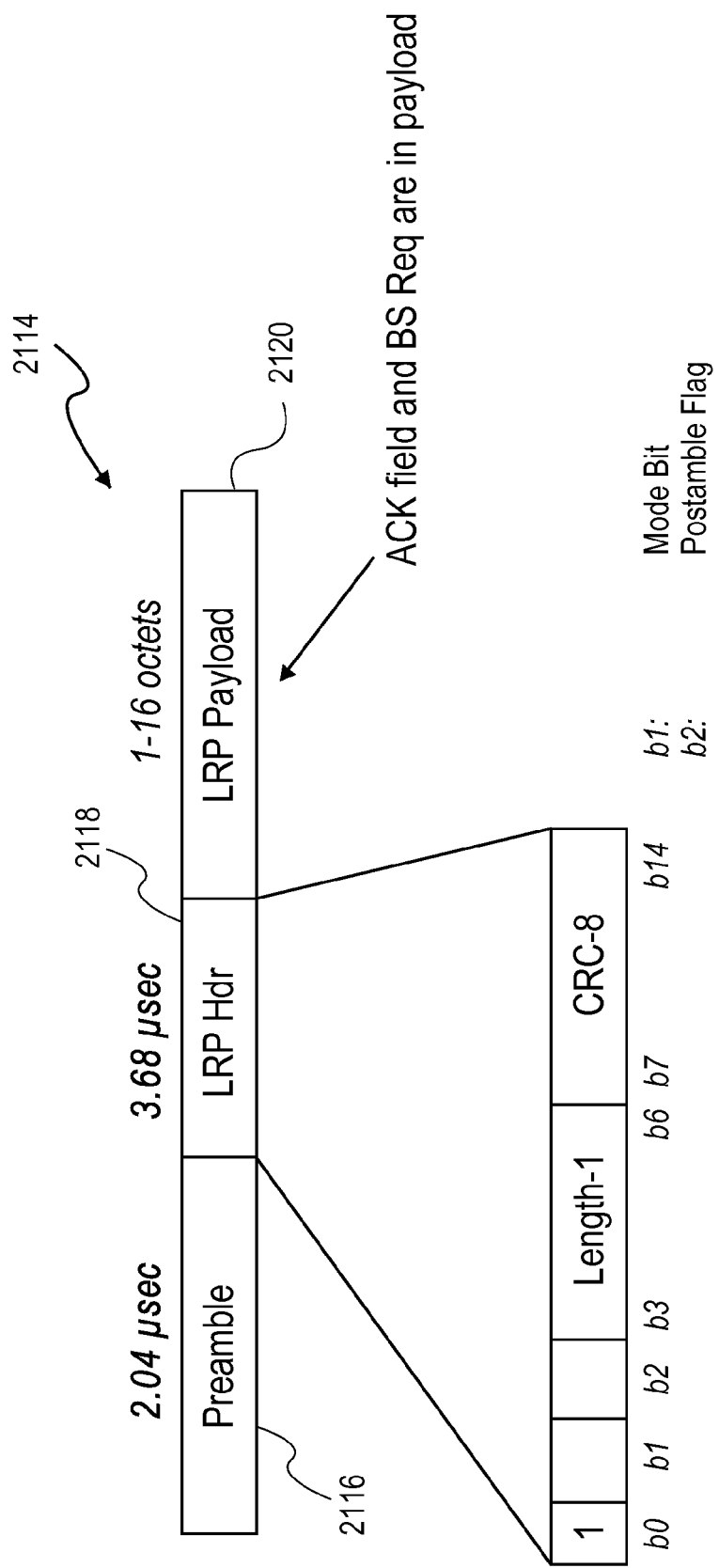

EXTENSIONS TO ADAPTIVE BEAM-STEERING METHOD

RELATED APPLICATIONS

This application claims the benefit of U.S. Provisional Application No. 60/920,168 filed on Mar. 26, 2007, which is incorporated herein by reference.

FIELD OF THE INVENTION

The present invention relates to the field of wireless communication; more particularly, the present invention relates to a wireless communication device that uses adaptive beamforming.

BACKGROUND OF THE INVENTION

In 1998, the Digital Display Working Group (DDWG) was formed to create a universal interface standard between computers and displays to replace the analog VGA connection standard. The resulting standard was the Digital Visual Interface (DVI) specification, released in April 1999.

There are a number of content protection schemes available. For example, HDCP and DTCP are well-known content protection schemes. HDCP was proposed as a security component for DVI and was designed for digital video monitor interfaces.

HDMI is a connection interface standard that was developed to meet the explosive demand for high-definition audio and video. HDMI is capable of carrying video and audio and is backward-compatible with DVI (which carries only video signals). The key advantage of DVI and HDMI is that both of them are capable of transmitting uncompressed high-definition digital streams via a single cable.

HDCP is a system for protecting content being transferred over DVI and HDMI from being copied. See HDCP 1.0 for details. HDCP provides authentication, encryption, and revocation. Specialized circuitry in the playback device and in the display monitor encrypts video data before it is sent over. With HDCP, content is encrypted immediately before (or inside) the DVI or HDMI transmitter chip and decrypted immediately after (or inside) the DVI or HDMI receiver chip.

In addition to the encryption and decryption functions, HDCP implements authentication to verify that the receiving device (e.g., a display, a television, etc.) is licensed to receive encrypted content. Re-authentication occurs approximately every two seconds to continuously confirm the security of the DVI or HDMI interface. If, at any time, re-authentication does not occur, for example by disconnecting a device and/or connecting an illegal recording device, the source device (e.g., a DVD player, a set-top box, etc.) ends transmission of encrypted content.

While discussions of HDMI and DVI are generally focused on wired communication, the use of wireless communication to transmit content has become more prevalent every day. While much of the current focus is on cellular technologies and wireless networks, there has been a growing interest in the unlicensed spectrum around 60 GHz for wireless video transmission or very high-speed networking. More specifically, seven GHz of contiguous bandwidth has been opened for unlicensed use at millimeter-wave frequencies around 60 GHz in the U.S. and Japan.

SUMMARY OF THE INVENTION

Extensions to adaptive beam-steering method are disclosed. In one embodiment, a radio frequency (RF) transmitter is coupled to and controlled by a processor to transmit data. A physical layer circuit is coupled to the RF transmitter to encode and decode between a digital signal and a modulated analog signal. The physical layer circuit comprises a high rate physical layer circuit (HRP) and a low rate physical layer circuit (LRP) which include extensions to their basic beamforming mechanism. In a first embodiment, the LRP circuit generates a LRP packet comprising an LRP transmit power control feedback. In a second embodiment, the LRP and HRP circuit generate a packet comprising a magnitude feedback. In a third embodiment, the LRP and HRP circuit supports up to 64 independent transmit antenna elements.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 15 is a table of low rate packet (LRP) data rates of the wireless HD communication system of FIG. 1.

FIG. 21B is a block diagram of one embodiment of a format for a directional low rate packet (LRP) data packet with payload.

DETAILED DESCRIPTION OF THE PRESENT INVENTION

Figure 1:
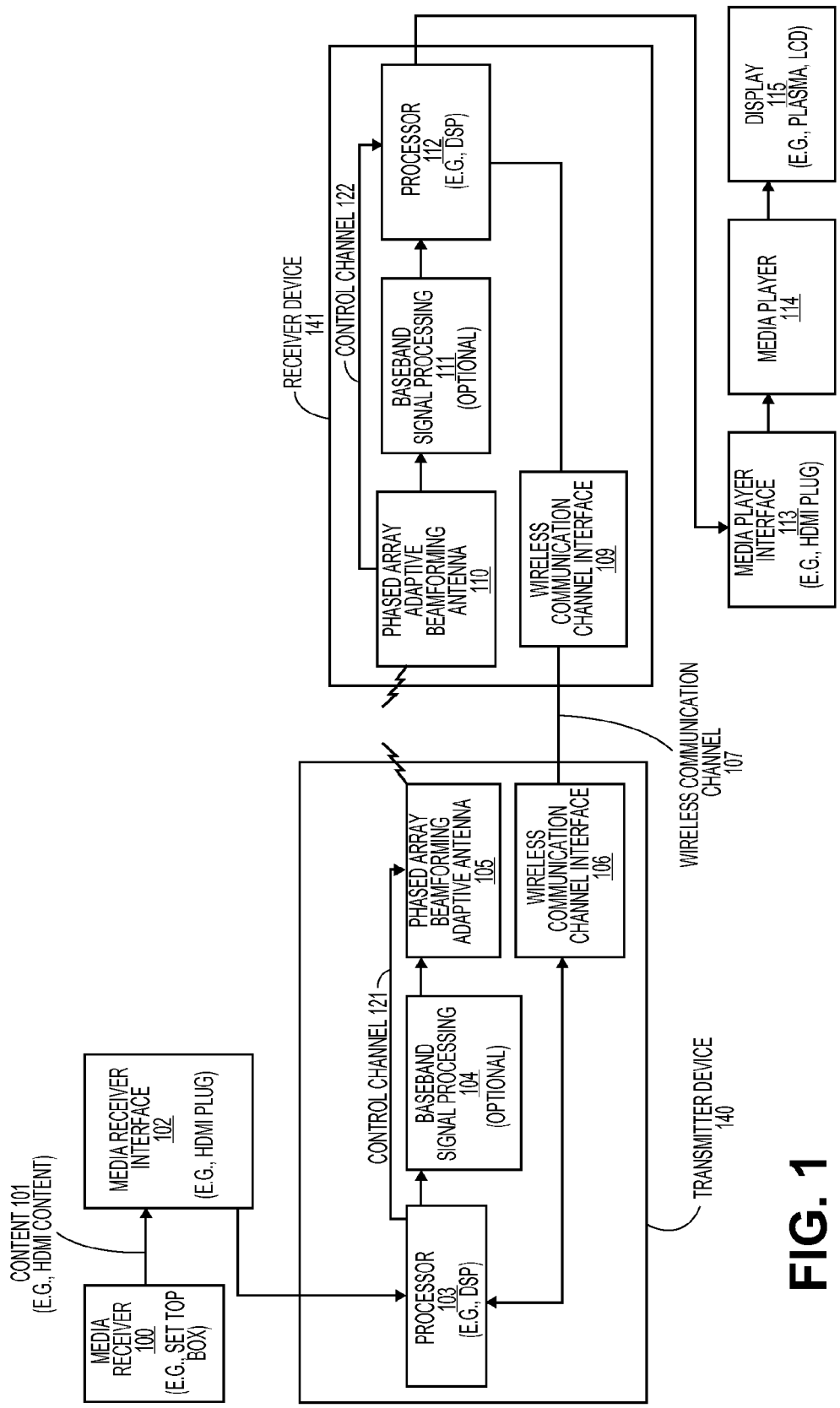
FIG. 1 is a block diagram of one embodiment of a communication system.

An apparatus and method for wireless communication is disclosed. In one embodiment, the wireless communication occurs using a wireless transceiver with an adaptive beamforming antenna. As would be apparent to one skilled in the art, the wireless communication could occur with a wireless receiver or transmitter.

In one embodiment, the wireless communication includes an additional link, or channel, for transmitting information between a transmitter and a receiver. The link may be unidirectional or bi-directional. In one embodiment, the channel is used to send antenna information back from a receiver to a transmitter to enable the transmitter to adapt its antenna array by steering the antenna elements to find a path to another direction. This may be obstacle avoidance.

In one embodiment, the link is also used to transfer information corresponding to the content that is being transferred wirelessly (e.g., wireless video). This information may be content protection information. For example, in one embodiment, the link is used to transfer encryption keys and acknowledgements of encryption keys when the transceivers are transferring HDMI data. Thus, in one embodiment, the link transfers control information and content protection information.

This additional link may be a separate channel in the 60 GHz band. In an alternative embodiment, the link may be a wireless channel in the 2.4 or 5 GHz band.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Example of a Communication System

FIG. 1 is a block diagram of one embodiment of a communication system. Referring to FIG. 1, the system comprises media receiver 100, a media receiver interface 102, a transmitting device 140, a receiving device 141, a media player interface 113, a media player 114 and a display 115.

Media receiver 100 receives content from a source (not shown). In one embodiment, media receiver 100 comprises a set top box. The content may comprise baseband digital video, such as, for example, but not limited to, content adhering to the HDMI or DVI standards. In such a case, media receiver 100 may include a transmitter (e.g., an HDMI transmitter) to forward the received content.

Media receiver 101 sends content 101 to transmitter device 140 via media receiver interface 102. In one embodiment, media receiver interface 102 includes logic that converts content 101 into HDMI content. In such a case, media receiver interface 102 may comprise an HDMI plug and content 101 is sent via a wired connection; however, the transfer could occur through a wireless connection. In another embodiment, content 101 comprises DVI content.

In one embodiment, the transfer of content 101 between media receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beamforming. The other wireless connection is via wireless communications channel 107, referred to herein as the back channel. In one embodiment, wireless communications channel 107 is uni-directional. In an alternative embodiment, wireless communications channel 107 is bi-directional.

Receiver device 141 transfers the content received from transmitter device 140 to media player 114 via media player interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection.

Media player 114 causes the content to be played on display 115. In one embodiment, the content is HDMI content and media player 114 transfer the media content to display via a wired connection; however, the transfer could occur through a wireless connection. Display 115 may comprise a plasma display, an LCD, a CRT, etc.

Note that the system in FIG. 1 may be altered to include a DVD player/recorder in place of a DVD player/recorder to receive, and play and/or record the content.

Figure 3:
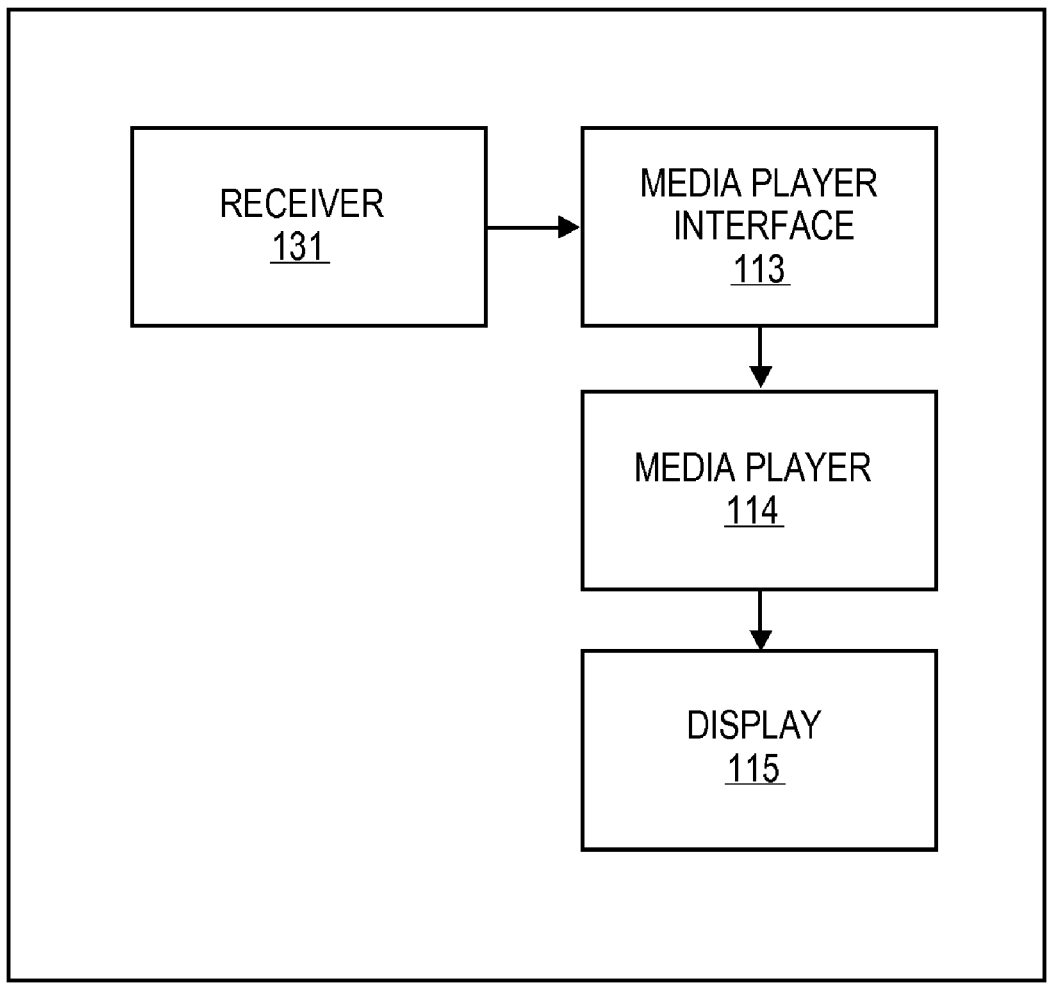
FIG. 3 is a block diagram of one embodiment of a peripheral device.

In one embodiment, transmitter 140 and media receiver interface 102 are part of media receiver 100. Similarly, in one embodiment, receiver 140, media player interface 113, and media player 114 are all part of the same device. In an alternative embodiment, receiver 140, media player interface 113, media player 114, and display 115 are all part of the display. An example of such a device is shown in FIG. 3.

In one embodiment, transmitter device 140 comprises a processor 103, an optional baseband processing component 104, a phased array antenna 105, and a wireless communication channel interface 106. Phased array antenna 105 comprises a radio frequency (RF) transmitter having a digitally controlled phased array antenna coupled to and controlled by processor 103 to transmit content to receiver device 141 using adaptive beamforming.

In one embodiment, receiver device 141 comprises a processor 112, an optional baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beamforming.

In one embodiment, processor 103 generates baseband signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals. In one embodiment, the baseband signals are single carrier phase, amplitude, or both phase and amplitude modulated signals.

In one embodiment, transmitter device 140 and/or receiver device 141 are part of separate transceivers.

Transmitter device 140 and receiver device 141 perform wireless communication using phased array antenna with adaptive beamforming that allows beam steering. Beamforming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna 110. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at another location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information comprises information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110, or vice versa.

An Example of Transceiver Architecture

Figure 2:
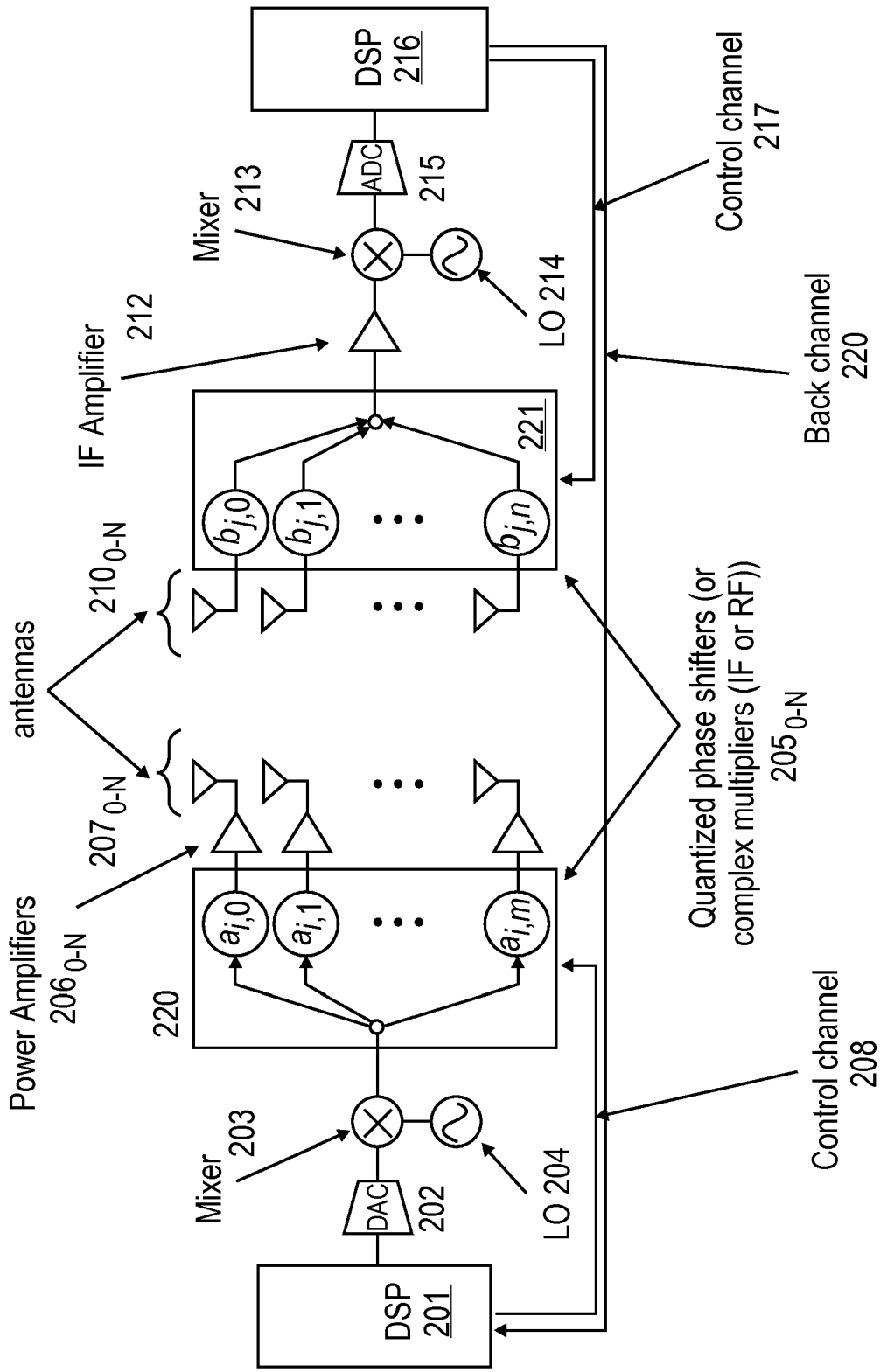
FIG. 2 is a more detailed block diagram of one embodiment of the communication system.

FIG. 2 is a block diagram of one embodiment of an adaptive beam forming multiple antenna radio system containing transmitter device 140 and receiver device 141 of FIG. 1. Transceiver 200 includes multiple independent transmit and receive chains. Transceiver 200 performs phased array beam forming using a phased array that takes an identical RF signal and shifts the phase for one or more antenna elements in the array to achieve beam steering.

Referring to FIG. 2, Digital Signal Processor (DSP) 201 formats the content and generates real time baseband signals. DSP 201 may provide modulation, FEC coding, packet assembly, interleaving and automatic gain control.

DSP 201 then forwards the baseband signals to be modulated and sent out on the RF portion of the transmitter. In one embodiment, the content is modulated into OFDM signals in a manner well known in the art.

Digital-to-analog converter (DAC) 202 receives the digital signals output from DSP 201 and converts them to analog signals. In one embodiment, the signals output from DAC 202 are between 0-256 MHz signals. In an alternative embodiment, the signals output from DAC 202 are between 0-750 MHz signals.

Mixer 203 receives signals output from DAC 202 and combines them with a signal from a local oscillator (LO) 204. The signals output from mixer 203 are at an intermediate frequency. In one embodiment, the intermediate frequency is between 2-15 GHz.

Multiple phase shifters $205_{0-N}$ receive the output from mixer 203. A demultiplier is included to control which phase shifters receive the signals. In one embodiment, these phase shifters are quantized phase shifters. In an alternative embodiment, the phase shifters may be replaced by complex multipliers, which control both phase and magnitude. In one embodiment, DSP 201 also controls, via control channel 208, the phase and magnitude of the currents in each of the antenna elements in phased array antenna 220 to produce a desired beam pattern in a manner well-known in the art. In other words, DSP 201 controls the phase shifters $205_{0-N}$ of phased array antenna 220 to produce the desired pattern.

Each of phase shifters $205_{0-N}$ produce an output that is sent to one of power amplifiers $206_{0-N}$, which amplify the signal. The amplified signals are sent to antenna array 207 which has multiple antenna elements $207_{0-N}$. In one embodiment, the signals transmitted from antennas $207_{0-N}$ are radio frequency signals between 56-64 GHz. Thus, multiple beams are output from phased array antenna 220.

With respect to the receiver, antennas $210_{0-N}$ receive the wireless transmissions from antennas $207_{0-N}$ and provide them to phase shifters $211_{0-N}$. As discussed above, in one embodiment, phase shifters $211_{0-N}$ comprise quantitized phase shifters. Alternatively, phase shifters $211_{0-N}$ may be replaced by complex multipliers. Phase shifters $211_{0-N}$ receive the signals from antennas $210_{0-N}$, which are combined to form a single line feed output. In one embodiment, a multiplexer is used to combine the signals from the different elements and output the single feed line. The output of phase shifters $211_{0-N}$ is input to intermediate frequency (IF) amplifier 212, which reduces the frequency of the signal to an intermediate frequency. In one embodiment, the intermediate frequency is between 2-9 GHz.

Mixer 213 receives the output of the IF amplifier 212 and combines it with a signal from LO 214 in a manner well-known in the art. In one embodiment, the output of mixer 213 is a signal in the range of 0 to about 250 MHz. In one embodiment, there are I and Q signals for each channel. In an alternative embodiment, the output of mixer 213 is a signal in the range of 0 to about 750 MHz.

Analog-to-digital converter (ADC) 215 receives the output of mixer 213 and converts it to digital form. The digital output from ADC 215 is received by DSP 216. DSP 216 restores the amplitude and phase of the signal. DSPs 211 may provide demodulation, packet disassembly, de-interleaving, FEC decoding, and automatic gain control.

In one embodiment, each of the transceivers includes a controlling microprocessor that sets up control information for DSP. The controlling microprocessor may be on the same die as the DSP.

DSP-Controlled Adaptive Beam Forming

In one embodiment, the DSPs implement an adaptive algorithm with the beam forming weights being implemented in hardware. That is, the transmitter and receiver work together to perform the beam forming in RF frequency using digitally controlled analog phase shifters; however, in an alternative embodiment, the beamforming is performed in IF. Phase shifters $205_{0-N}$ and $211_{0-N}$ are controlled via control channel 208 and control channel 217, respectfully, via their respective DSPs in a manner well known in the art. For example, DSP 201 controls phase shifters $105_{0-N}$ to have the transmitter perform adaptive beamforming to steer the beam while DSP 211 controls phase shifters $211_{0-N}$ to direct antenna elements to receive the wireless transmission from antenna elements and combine the signals from different elements to form a single line feed output. In one embodiment, a multiplexer is used to combine the signals from the different elements and output the single feed line.

DSP 201 performs the beam steering by pulsing, or energizing, the appropriate phase shifter connected to each antenna element. The pulsing algorithm under DSP 201 controls the phase and gain of each element. Performing DSP controlled phase array beamforming is well known in the art.

The adaptive beam forming antenna is used to avoid interfering obstructions. By adapting the beam forming and steering the beam, the communication can occur avoiding obstructions which may prevent or interfere with the wireless transmissions between the transmitter and the receiver.

In one embodiment, with respect to the adaptive beamforming antennas, they have three phases of operations. The three phases of operations are the training phase, a searching phase, and a tracking phase. The training phase and searching phase occur during initialization. The training phase determines the channel profile with predetermined sequences of spatial patterns $\{A\hat{i}\}$ and $\{B\hat{j}\}$. The searching phase computes a list of candidate spatial patterns $\{A\hat{i}\}$, $\{B\hat{j}\}$ and selects a prime candidate $\{A\hat{0}, B\hat{0}\}$ for use in the data transmission between the transmitter of one transceiver and the receiver of another. The tracking phase keeps track of the strength of the candidate list. When the prime candidate is obstructed, the next pair of spatial patterns is selected for use.

In one embodiment, during the training phase, the transmitter sends out a sequence of spatial patterns $\{A\hat{i}\}$. For each spatial pattern $\{A\hat{i}\}$, the receiver projects the received signal onto another sequence of patterns $\{B\hat{j}\}$. As a result of the projection, a channel profile is obtained over the pair $\{A\hat{i}\}$, $\{B\hat{j}\}$.

In one embodiment, an exhaustive training is performed between the transmitter and the receiver in which the antenna of the receiver is positioned at all locations and the transmitter sending multiple spatial patterns. Exhaustive training is well-known in the art. In this case, M transmit spatial patterns are transmitted by the transmitter and N received spatial patterns are received by the receiver to form an N by M channel matrix. Thus, the transmitter goes through a pattern of transmit sectors and the receiver searches to find the strongest signal for that transmission. Then the transmitter moves to the next sector. At the end of the exhaustive search process, a ranking of all the positions of the transmitter and the receiver and the signals strengths of the channel at those positions has been obtained. The information is maintained as pairs of positions of where the antennas are pointed and signal strengths of the channels. The list may be used to steer the antenna beam in case of interference.

In an alternative embodiment, bi-section training is used in which the space is divided in successively narrow sections with orthogonal antenna patterns being sent to obtain a channel profile.

Assuming DSP 101 is in a stable state and the direction the antenna should point is already determined. In the nominal state, the DSP will have a set of coefficients that it sends the phase shifters. The coefficients indicate the amount of phase the phase shifter is to shift the signal for its corresponding antennas. For example, DSP 101 sends a set of digital control information to the phase shifters that indicate the different phase shifters are to shift different amounts, e.g., shift 30 degrees, shift 45 degrees, shift 90 degrees, shift 180 degrees, etc. Thus, the signal that goes to that antenna element will be shifted by a certain number of degrees of phase. The end result of shifting, for example, 16, 34, 32, 64 elements in the array by different amounts enables the antenna to be steered in a direction that provides the most sensitive reception location for the receiving antenna. That is, the composite set of shifts over the entire antenna array provides the ability to stir where the most sensitive point of the antenna is pointing over the hemisphere.

Note that in one embodiment the appropriate connection between the transmitter and the receiver may not be a direct path from the transmitter to the receiver. For example, the most appropriate path may be to bounce off the ceiling.

The Back Channel

In one embodiment, the wireless communication system includes a back channel, or link, for transmitting information between wireless communication devices (e.g., a transmitter and receiver, a pair of transceivers, etc.). The information is related to the beamforming antennas and enables one or both of the wireless communication devices to adapt the array of antenna elements to better direct the antenna elements of a transmitter to the antenna elements of the receiving device together. The information also includes information to facilitate the use of the content being wirelessly transferred between the antenna elements of the transmitter and the receiver.

In FIG. 2, back channel 220 is coupled between DSP 216 and DSP 201 to enable DSP 216 to send tracking and control information to DSP 201. In one embodiment, back channel 220 functions as a high speed downlink and an acknowledgement channel.

In one embodiment, the back channel is also used to transfer information corresponding to the application for which the wireless communication is occurring (e.g., wireless video). Such information includes content protection information. For example, in one embodiment, the back channel is used to transfer encryption information (e.g., encryption keys and acknowledgements of encryption keys) when the transceivers are transferring HDMI data. In such a case, the back channel is used for content protection communications.

More specifically, in HDMI, encryption is used to validate that the data sink is a permitted device (e.g., a permitted display). There is a continuous stream of new encryption keys that is transferred while transferring the HDMI datastream to validate that the permitted device has not been changed. Blocks of frames for the HD TV data are encrypted with different keys and then those keys have to be acknowledged back on back channel 220 in order to validate the player. Back channel 220 transfers the encryption keys in the forward direction to the receiver and acknowledgements of key receipts from the receiver in the return direction. Thus, encrypted information is sent in both directions.

The use of the back channel for content protection communications is beneficial because it avoids having to complete a lengthy retraining process when such communications are sent along with content. For example, if a key from a transmitter is sent alongside the content flowing across the primary link and that primary link breaks, it will force a lengthy retrain of 2-3 seconds for a typical HDMI/HDCP system. In one embodiment, this separate bi-directional link that has higher reliability than the primary directional link given its omni-directional orientation. By using this back channel for communication of the HDCP keys and the appropriate acknowledgement back from the receiving device, the time consuming retraining can be avoided even in the event of the most impactful obstruction.

During the active period when the beamforming antennas are transferring content, the back channel is used to allow the receiver to notify the transmitter about the status of the channel. For example, while the channel between the beamforming antennas is of sufficient quality, the receiver sends information over the back channel to indicate that the channel is acceptable. The back channel may also be used by the receiver to send the transmitter quantifiable information indicating the quality of the channel being used. If some form of interference (e.g., an obstruction) occurs that degrades the quality of the channel below an acceptable level or prevents transmissions completely between the beamforming antennas, the receiver can indicate that the channel is no longer acceptable and/or can request a change in the channel over the back channel. The receiver may request a change to the next channel in a predetermined set of channels or may specify a specific channel for the transmitter to use.

In one embodiment, the back channel is bi-directional. In such a case, in one embodiment, the transmitter uses the back channel to send information to the receiver. Such information may include information that instructs the receiver to position its antenna elements at different fixed locations that the transmitter would scan during initialization. The transmitter may specify this by specifically designating the location or by indicating that the receiver should proceed to the next location designated in a predetermined order or list through which both the transmitter and receiver are proceeding.

In one embodiment, the back channel is used by either or both of the transmitter and the receiver to notify the other of specific antenna characterization information. For example, the antenna characterization information may specify that the antenna is capable of a resolution down to 6 degrees of radius and that the antenna has a certain number of elements (e.g., 32 elements, 64 elements, etc.).

In one embodiment, communication on the back channel is performed wirelessly by using interface units. Any form of wireless communication may be used. In one embodiment, OFDM is used to transfer information over the back channel. In another embodiment, continuous-phase modulation (CPM) with low peak-to-average power ratio is used to transfer information over the back channel.

Physical Layer (PHY) Overview

Wireless HD specification supports two basic types of PHY: high rate PHY (HRP) and low rate PHY (LRP).

In accordance with one embodiment, HRP supports multi-Gbps data rates. HRP may operate in a directional mode (typically beam-formed mode). HRP may be used to transmit audio, video, data, and control messages. LRP can only be sent from HTx/HTR devices to HRx/HTR devices. In one embodiment, HRP occupies roughly 1.7 GHz bandwidth.

In accordance with one embodiment, LRP supports multi-Mbps data rates. LRP may operate in a directional, omni-directional, or beam-formed modes. In one embodiment, LRP may be used to transmit control messages, beacons, and acknowledgements. In an alternative embodiment, LRP may further be used to transmit audio or compressed video. In yet another embodiment, LRP may further be used to transmit low-speed data. LRP can be sent between any devices. LRP occupies one of three 91 MHz sub-channels within HRP channel as discussed below.

Frequency Planning

Figure 4:
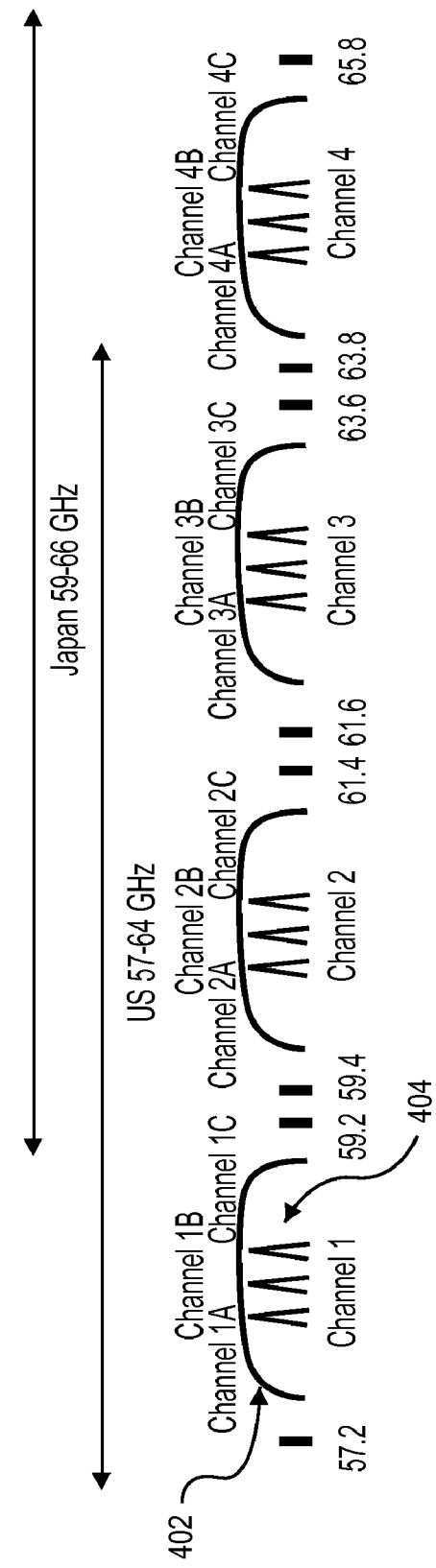
FIG. 4 is a block diagram of one embodiment of different channels sharing frequencies.

HRP and LRP may share the same frequency band. FIG. 4 illustrates one embodiment of frequency planning for HRP and LRP. The low-rate channels 404 share the same frequency band as the corresponding high-rate channels 402. Three low-rate channels 1A, 1B, 1C may be allocated within each high-rate channel bandwidth (channel 1) to avoid interference. In accordance with another embodiment, the low-rate and high-rate channels may operate in time-division duplex mode. FIG. 4 illustrates an example of four channels between 57 GHz to 66 GHz: channel 1 operating between 57.2 GHz and 59.2 GHz, channel 2 operating between 59.4 GHz and 61.4 GHz, channel 3 operating between 61.6 GHz and 63.6 GHz, channel 4 operating between 63.8 GHz and 65.8 GHz.

A single low-cost crystal oscillator may be able to generate those frequencies. The baseband clock frequency may be near 2.5 GHz (e.g. 2.508 GHz). In accordance with one embodiment, the frequency planning may support implementation-friendly RF Synthesizer design. The resultant center frequencies may be: 58.608 GHz, 60.720 GHz, 62.832 GHz, and 64.944 GHz. Possible crystal frequencies may include 44 MHz, 66 MHz, and 132 MHz.

High-Rate PHY (HRP)

HRP may support data rates of 3.76 Gbps, 1.88 Gbps, 0.94 Gbps. The data rates may individually correspond to video resolution standard of 1080p, 1080i, 480p for various sampling rates depending on needs. As a result, the range may be increased at lower data rates. Higher PHY rates may still allow for multiple lower-rate streams via MAC.

HRP may utilize several types of coding and modulation: OFDM, 16QAM and QPSK modulations, inner convolutional code (rate of $\frac{1}{3}$, $\frac{2}{3}$, $\frac{4}{7}$, $\frac{4}{5}$), and outer Reed-Solomon rate 0.96 code. The use of Reed-Solomon outer code in addition to the inner convolution code reduces SNR requirements by about 2 dB. An outer interleaver may be used to realize full gains of the outer code.

HRP may utilize four channels across the global 60 GHz band for an active channel bandwidth of 1.7 GHz. In accordance with one embodiment, there may be three channels per region.

HRP may be scalable to include parallelization of FEC stream for cost-effective implementation and supports of UEP concepts.

Figure 5A:
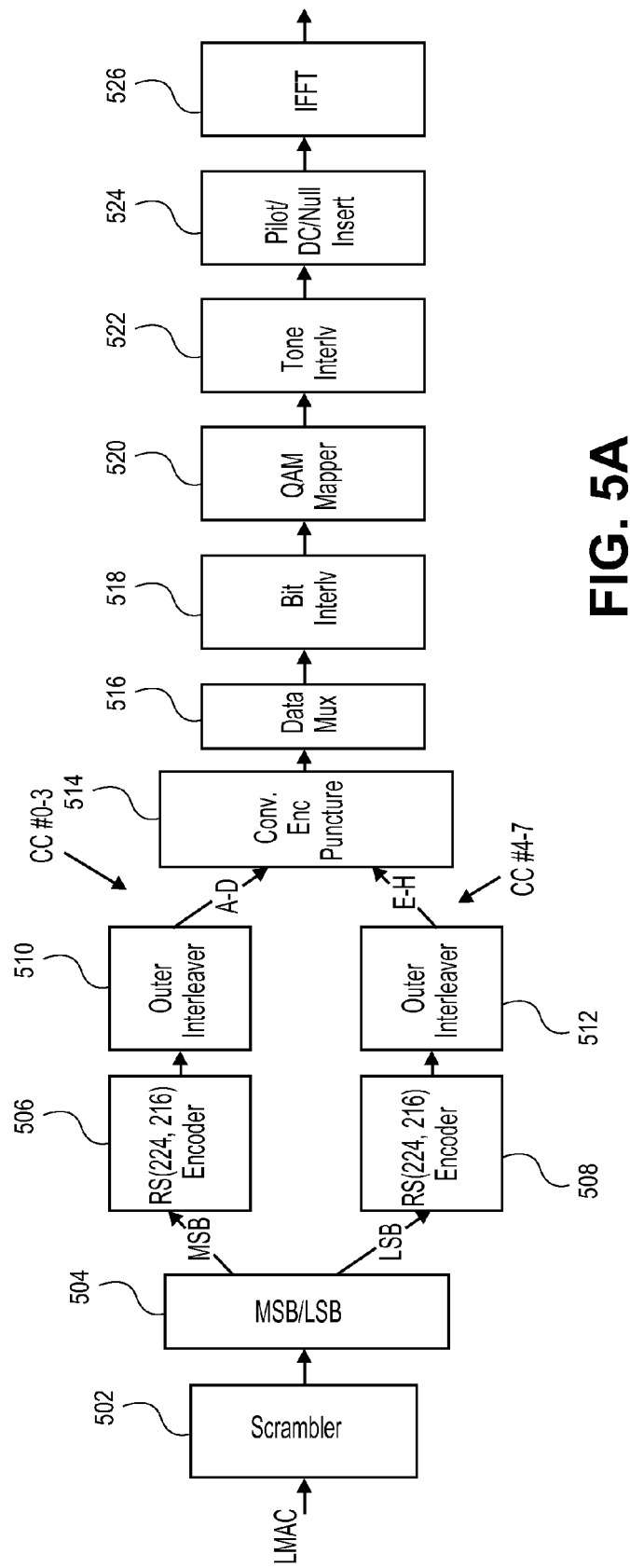
FIG. 5A is a block diagram of one embodiment of a physical layer for the wireless HD communication system of FIG. 1.

FIG. 5A illustrates one embodiment of a Tx PHY block diagram. A scrambler 502 receives LMAC data and feeds into MSB/LSB separation block 504. For MSB, RS encoder 506 and outer interleaver 510 may be used. For LSB, RS encoder 508 and outer interleaver 512 may be used. A puncture circuit 514 may be coupled to outer interleavers 510 and 512. The following circuits form the sequence following the puncture circuit 514: data mux 516, bit interleaver 518, QAM mapper 520, tone interleaver 522, pilot/DC/null insert 524, and IFFT 526.

HRP Outer interleavers 510, 512 may include a block interleaver and a convolutional interleaver. The function of the outer interleaver is to ensure that each byte of the outer code is mapped to consecutive bits for the inner code codeword and consecutive bytes of the outer code is mapped to different inner code codeword. The block interleaver requires almost no memory in the transmitter and may improve efficiency without zero insertion. Tail bits may be easy to add by the outer interleaver. The convolutional interleaver requires several shift registers in the transmitter and may degrade efficiency with zero insertion. When convolutional interleaver is used, four OFDM symbols may be needed to transmit the initial/final zeros in the shift registers. The efficiency may degrade from about 0.5% to about 2%. The block outer interleaver 510, 512 can minimize the memory requirement between the outer Reed-Solomon code and inner convolutional codes. In one embodiment, the block interleaver has a depth of 4 and there are M=4 inner convolutional encoders for each outer interleaver. In one embodiment, the outer block interleaver is operated with a depth of four for HRP data. In one embodiment, the block interleaver may be implemented by a table of octets with the number of columns the same as the depth and the number of rows the same as the length of the Reed-Solomon code as:

$$b(i,k), i=0,1,\ldots, \text{depth}-1; k=0,1,\ldots, N-1$$

The octets of b(i,K), b(i,K+1), . . . , b(i,N−1) are the Reed-Solomon code parity of the octets of b(i,0), b(i,1), . . . , b(i,K−1), where RS(N,K) is the Reed-Solomon code. In one embodiment, the parameters for the outer interleaver are depth=4, K=216 and N=224. In another embodiment, the block interleaver is operated on group of bits, called bytes. In another embodiment, each byte has 8 bits or one octet. In another embodiment, each byte has more than 1 bit.

Figure 5B:
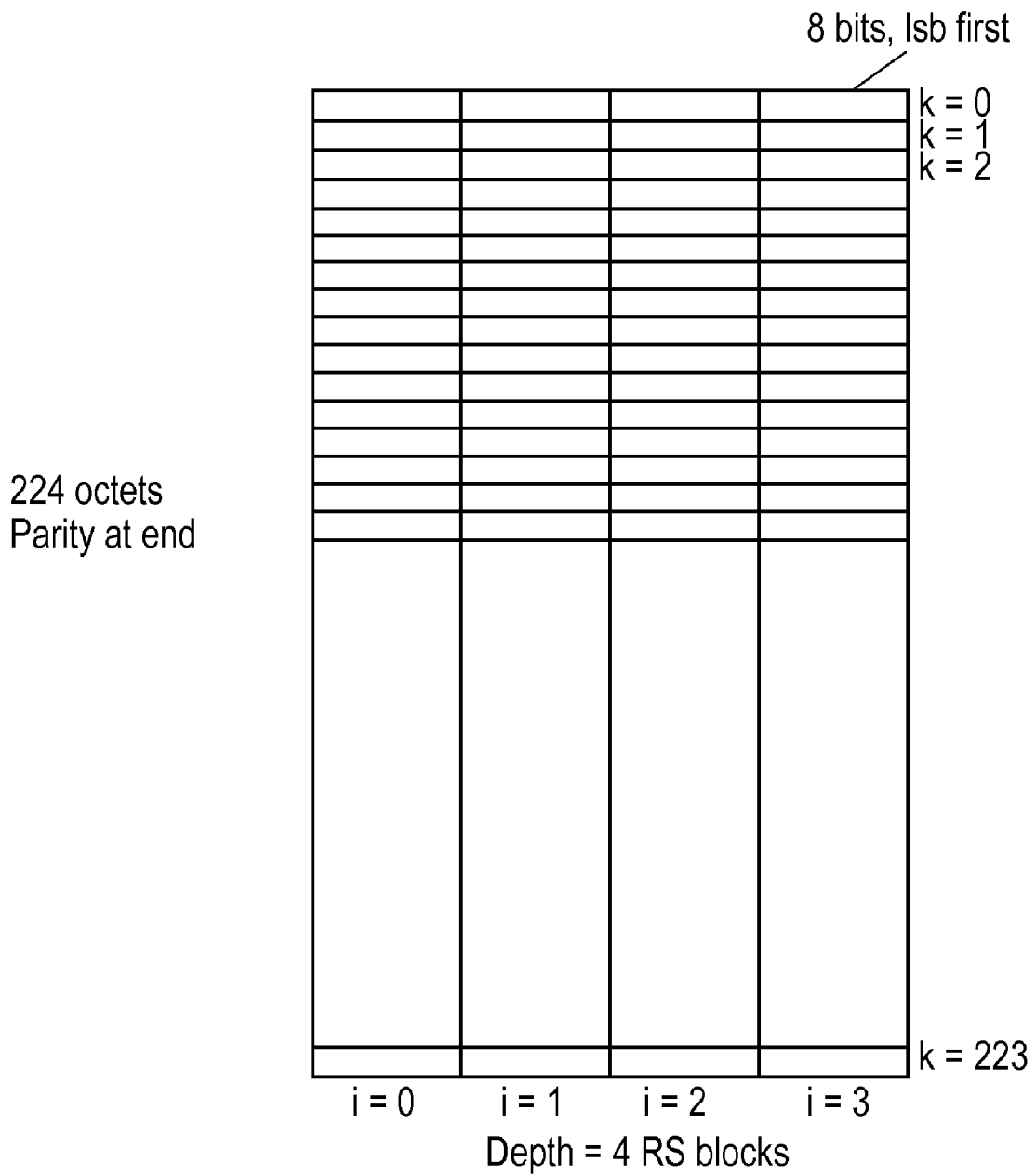
FIG. 5B is a table illustrating one example of a block interleaver code.

FIG. 5B illustrates one example of a block interleaver code. To reduce the memory requirement, the mapping to the columns and rows of FIG. 5B uses following formulas:

$$i=\text{floor}\{[l \bmod(\text{depth}*M)]/M\}$$

$$k=M\,\text{floor}[l/(\text{depth}*M)+l \bmod M$$

$$l=0,1,\ldots, \text{depth}*K-1$$

where l is the octet number at the input to the outer interleaver.

The outer interleaver may output the octets from i=0, k=0 first to i=depth−1, k=N−1 last. In one embodiment, with M parallel convolutional inner encoders for each RS codeword, the outer interleaver gives the octets of b(0,0), . . . , b(depth−1,0) to the first convolutional encoder with LSB first. In one embodiment, all octets of b(i,k*M+m), i=0, . . . , depth−1, k=0, 1, . . . , N/M−1, is output to the $m^{th}$ convolutional encoder. The tail bit for convolutional encoder is inserted by the outer interleaver. The i=depth−1 column of FIG. 5B is a shortened RS(N−M, K−M, t=4) code with parity bytes located at b(depth−1, K−M−9), b(depth−1, K−M−8), . . . , b(depth−1, K−M−1). The bytes of b(depth−1, N−M), . . . , b(depth−1, N−1) are padded with zeroes.

Figure 6:
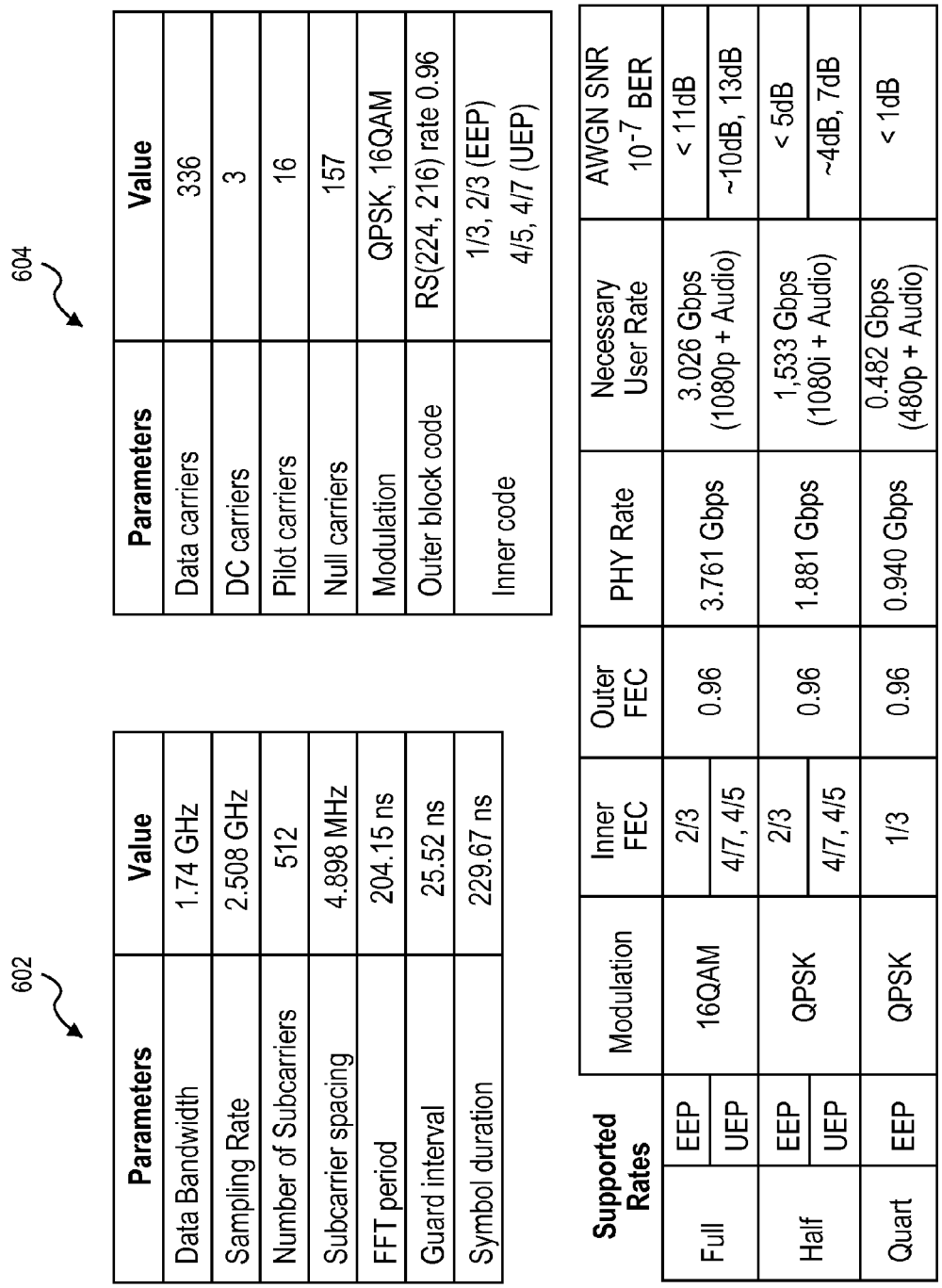
FIG. 6 is a block diagram of one embodiment of high rate packets (HRP) parameters for the wireless HD communication system of FIG. 1.

FIG. 6 illustrates various parameters of HRP in three different tables (602, 604, 606). Tables 602 and 604 illustrate different parameters of HRP in accordance with one embodiment. Table 606 illustrates supported rates in different modes of HRP.

Figure 7:
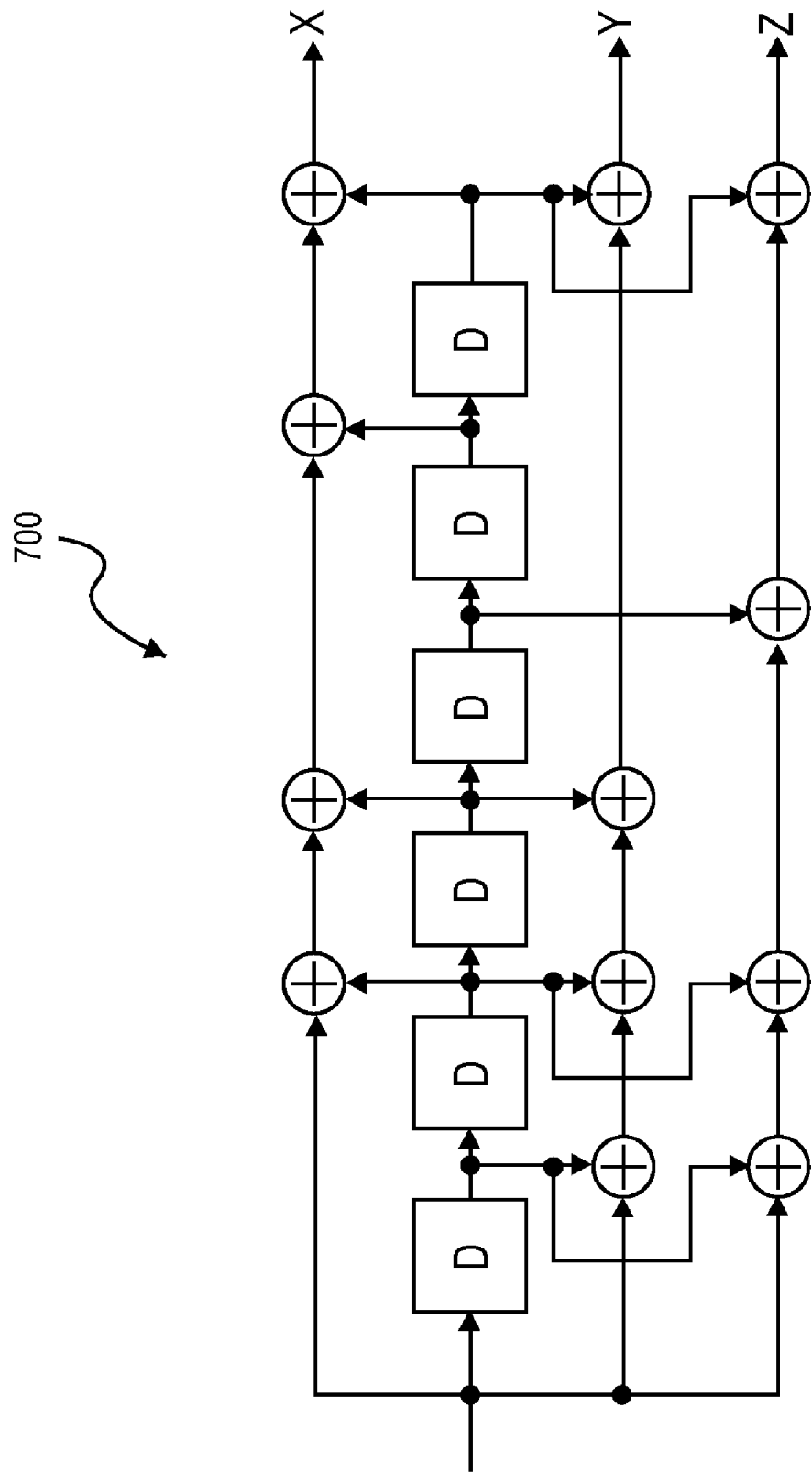
FIG. 7 is a block diagram of one embodiment of an inner code circuit of the wireless HD communication system of FIG. 1.
Figure 8:
FIG. 8 is a table of inner code rate of the inner code circuit of FIG. 7.

One embodiment of the HRP inner code circuit is illustrated in FIGS. 7 and 8. FIG. 7 illustrates a circuit diagram 700 of an HRP inner code. The inner code circuit may be described using the polynomial of (133, 171, 165). FIG. 8 illustrates a table of code rates, puncturing pattern, and transmitted sequence of the HRP inner code circuit. A "0" in the puncturing pattern means puncture or delete and a "1" in the puncturing pattern means non-puncture or not deleted.

In order to support 3.9 Gbps data rate, convolutional encoder parallelism may be needed. In one embodiment, radix-4 accumulated-compared-selected (ACS) technique may be used at the receiver. Radix-4 ACS processes 2 bits per cycle. The required clock frequency is equal to 3.9 Gbps divided by the number of decoders and divided two. For example, for 8 decoders, a 244 MHz clock may be required.

HRP Data Multiplixer 516 may combine the data from 8 convolutional encoders. Its mode may depend on EEP or UEP. In EEP mode, a round robin scheme is implemented to distribute the bits evenly. In UEP modulation mode, MSB corresponds to I branch of the QAM mapper, and LSB corresponds to the Q branch of the QAM mapper. In UEP coding mode, a strong MSB convolutional code results in more MSB bits than LSB bits at the input of the data multiplexer 516. A block of 4 input bits for each of 8 convolutional encoders (total 32) may represent one full cycle of puncture pattern. The UEP coding mode may result in 28 MSB bits with 20 LSB bits at the convolutional encoder output that are mapped to 48 transmitted bits spread over I and Q.

HRP Bit Interleaver 518 may spread bits from HRP Data Multiplexer 516 to the I/Q-branches of the QAM or QPSK constellations. MSB and LSB of QAM constellation do not provide the same coded BER. The bit interleaver may ensure the same BER for each bit stream from the same inner code encoder. Each bit stream maps to equal number of MSB and LSB of QAM constellation. One proposed solution is the following:

P16: 0, 1, 2, 3, 4, 5, 6, 7, 9, 8, 11, 10, 13, 12, 15, 14 with $$i=M*\text{floor}(k/M)+\text{mod}(2*\text{floor}(k/2)+\text{mod}(k+\text{floor}(k/M),2),M), k=0,1,\ldots, 2M-1$$

where i is the index of output bits and k is the index of input bits in a block of 2M=16. P32: 0, 1, 2, 3, 4, 5, 6, 7, 11, 8, 9, 10, 15, 12, 13, 14, 18, 19, 16, 17, 22, 23, 20, 21, 25, 26, 27, 24, 29, 30, 31, 28 with $$i=M*\text{floor}(k/M)+\text{mod}(4*\text{floor}(k/4)+\text{mod}(k+\text{floor}(k/M),4),M), k=0,1,\ldots 4M-1$$

where i is the index of output bits and k is the index of input bits in a block of 4M=32.

Figure 9:
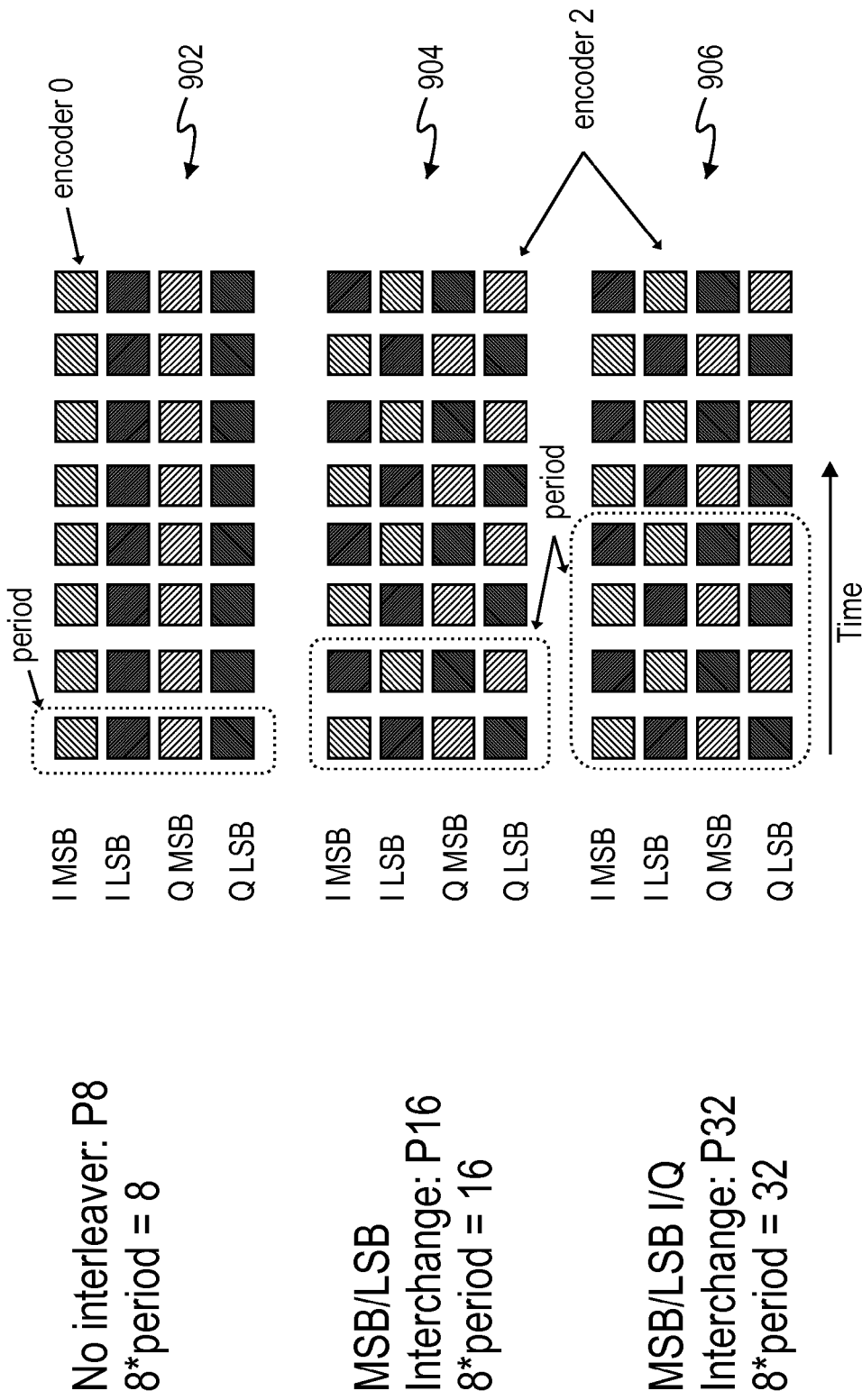
FIG. 9 is a block diagram of one embodiment of a bit interleaver of the wireless HD communication system of FIG. 1
Figure 10:
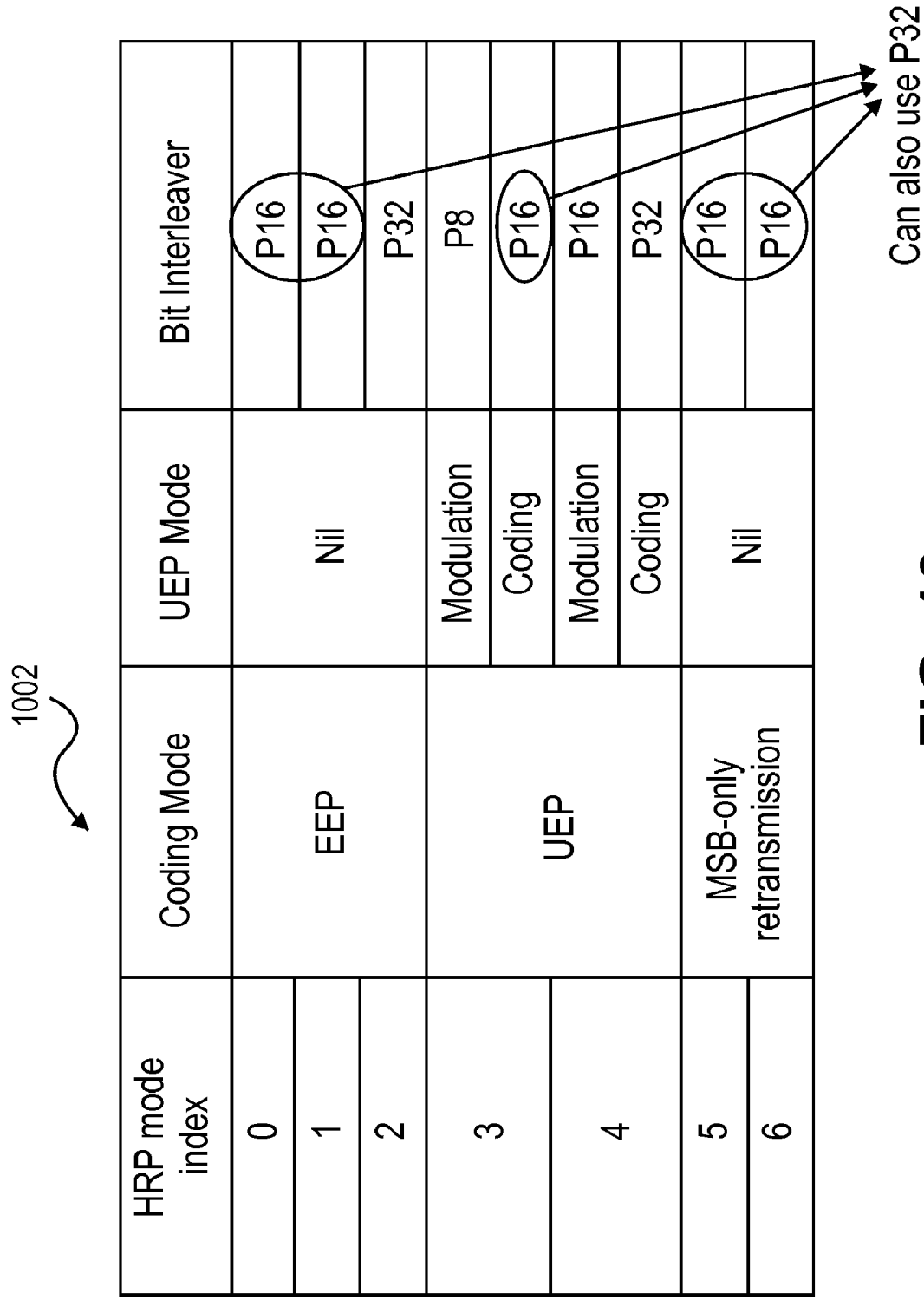
FIG. 10 is a table of specification of the bit interleaver of FIG. 9.

The above solution is graphically illustrated in FIGS. 9 and 10.

In the HRP channel with frequency selective fading, different subchannels of a OFDM symbol may have different channel response and adjacent OFDM subchannels are typically experience with the same fading effect. To improve performance, a tone interleaver maps adjacent data to far away OFDM subchannels. In one embodiment, HRP Helical Scan Tone Interleaver may include the following solution:

$$i=\text{mod}(\text{floor}(k/24)+3*\text{mod}(k,24),14)*24+\text{mod}(k,24), k=0,0,\ldots, N_{dsc(HR)}-1$$

where i is the index of output tones and k is the index of input tones.

Figure 11:
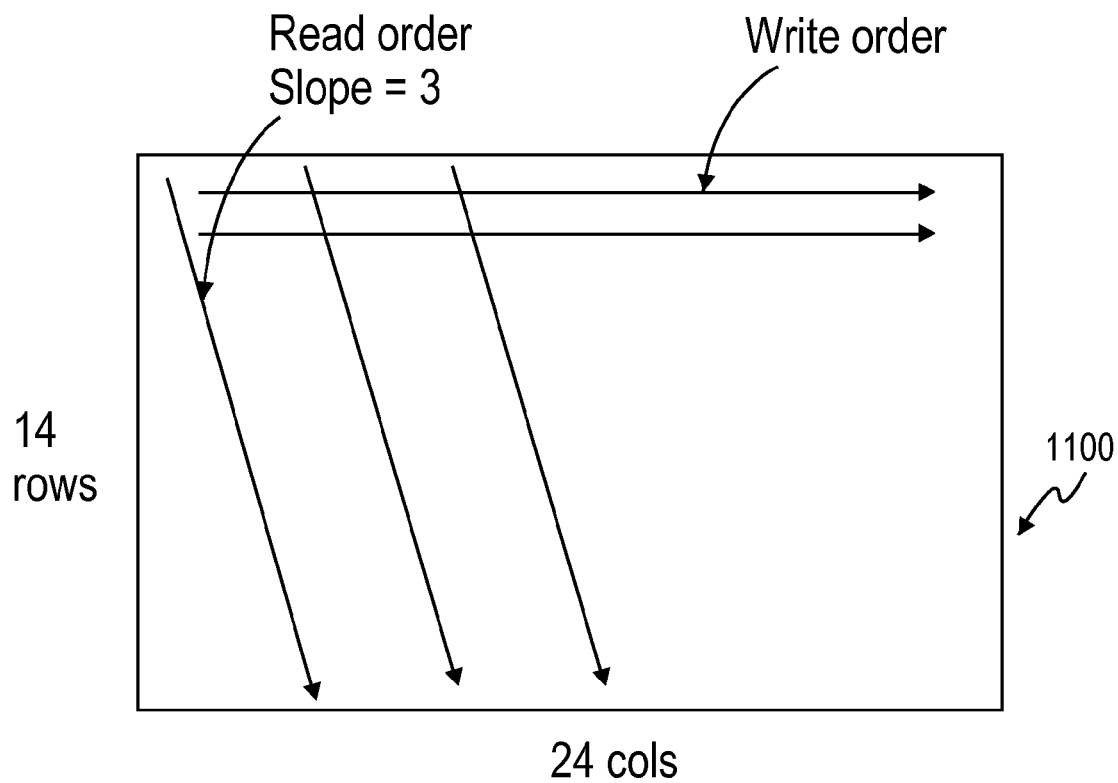
FIG. 11 is a graph diagram of one embodiment of a tone interleaver of the wireless HD communication system of FIG. 1.

The above solution is graphically illustrated in FIG. 11.

In an alternative embodiment, the tone interleaver may be designed based on the bit-reversal principle. In practical implementation of IFFT, there is a bit reversal circuit either before or after the IFFT calculations. In the bit-reversal circuits, the index of the input data is first represented as binary number, the resulted binary representation is bit reversed, and the bit reversed binary number becomes the index of the output data. When the bit-reversal tone interleaver is used, the tone interleaver and the IFFT calculations can be combined. The IFFT calculation circuit embedded the bit-reversal tone interleaver. In one embodiment, DC, null, and pilot tones are inserted in the bit-reversal position before the tone interleaver. This makes sure that after permutation, the DC, null and pilot tones will appear in the pre-specified positions. With traveling pilot as described later, the bit-reversal position for the pilot changes from OFDM symbol to symbol. The bit-reversal tone interleaver may be operated the best for radix-2 IFFT implementation that uses many 2 by 2 fundamental building blocks. As an example, for radix-8 IFFT implementation that uses many 8 by 8 building blocks, the index of the input data should be first represented as an octal number, the octal-reversal number is the output data. In this specific example, the octal-reversal tone interleaver provides the simplest implementation for the combined tone interleaver and IFFT.

HRP Pilot 524 may include a rotating pilot scheme to vary pilot carriers per symbol to allow better channel tracking over the packet if desired. This also avoids having to change the polarity of all pilots from one OFDM symbol to the next OFDM symbol, according to a cover sequence. Pilot values may be the same as in the corresponding tones of HRP preamble #5 described later. The pilot tone locations may be defined with a symbol index start at Preamble #5. For symbol=0:Nsymbol−1, k=(−177+mod(3*symbol, 22):22:177) where k!={−1,0,1}. In accordance with one embodiment, the pilot rotation speed may be fixed so as to rotate 3 bins per symbol. In contrast, if the pilot locations were fixed, their values would need to be changed over time to avoid any spectrum ripples effect.

HRP Preamble may include 8 symbols. Symbols #1-#4 may be based on PN sequence. 6 consecutive m-sequences may be used in 4 symbols. Symbols #1-#4 may be used for packet detection, frame synchronization and AGC training. Symbols #5-#8 may be based on OFDM symbols and may be used for frequency offset estimation and channel estimation. In accordance with one embodiment, a scale factor correction may be used to keep power of 8 preamble symbols the same as the remaining OFDM symbols for data transmission. In one of the embodiment, the power of the symbols #1-#4 may be 3 dB larger than symbols #5-#8.

Figure 12:
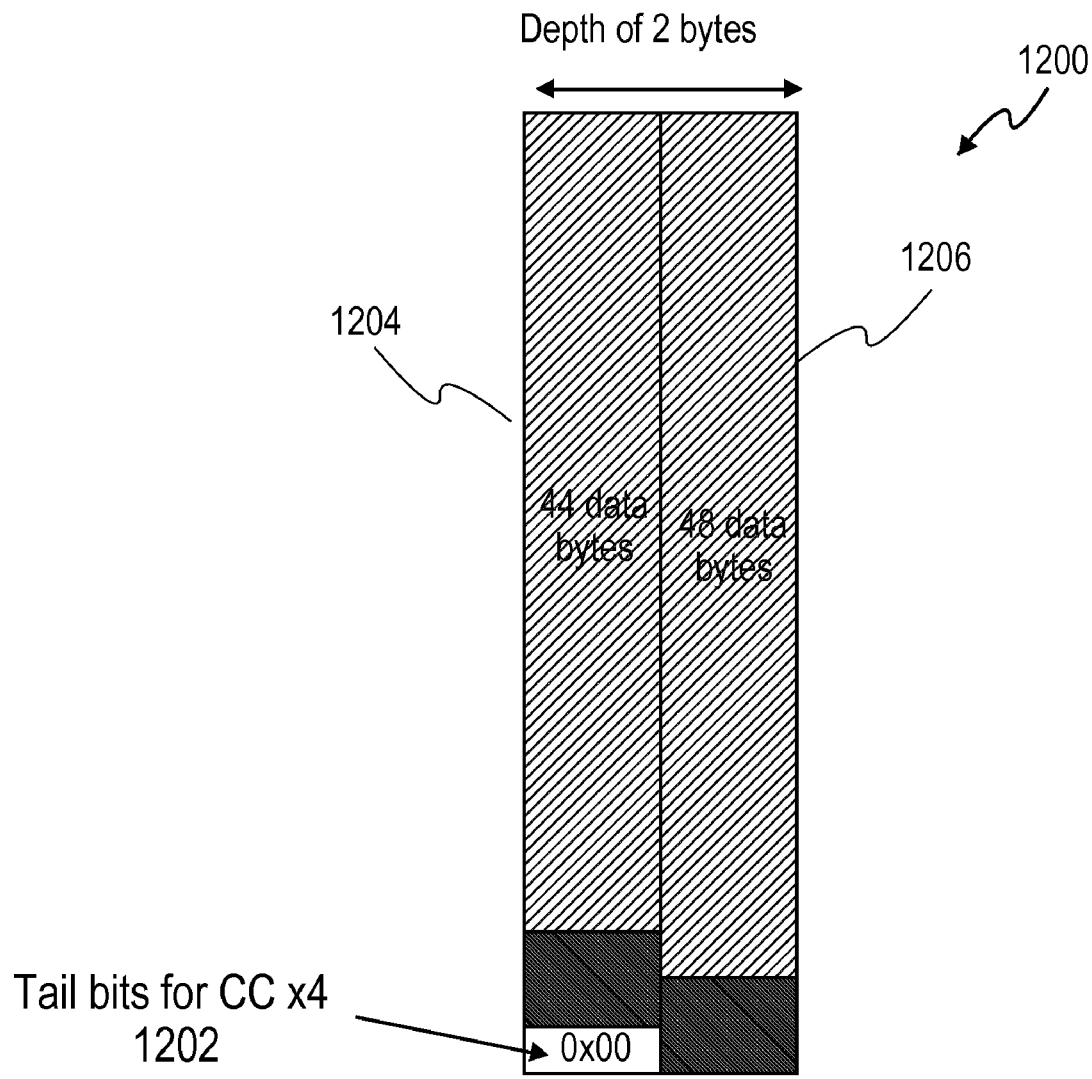
FIG. 12 is a block diagram of one embodiment of a high rate packet (HRP) header outer FEC of the wireless HD communication system of FIG. 1.

FIG. 12 illustrates one embodiment of outer FEC for HRP Header. HRP Header outer FEC is somewhat similar to the outer FEC for HRP data in that it provides the same or better error protection as the data. It uses the same Reed-Solomon generator. It uses the same method to provide tail bits to terminate convolutional codewords. It uses the same Reed-Solomon decoder in the receiver. Four OFDM symbols may be used for HRP header in quarter rate with 112 coded bytes. HRP Header FEC may use the same RS code generator polynomial as the data. The HRP Header FEC may include 92 or more uncoded bytes. One coding branch may include 4 convolutional encoders having 4 tail bytes 1202. The depth of the HRP Header FEC may be 2 bytes 1204 and 1206. Bytes 1204 may include 44 data bytes, 8 parity bytes, and tail bits 1202. Bytes 1206 may include 48 data bytes, 8 parity bytes. The depth of 2 block interleaver may provide sufficient performance.

Figure 13:
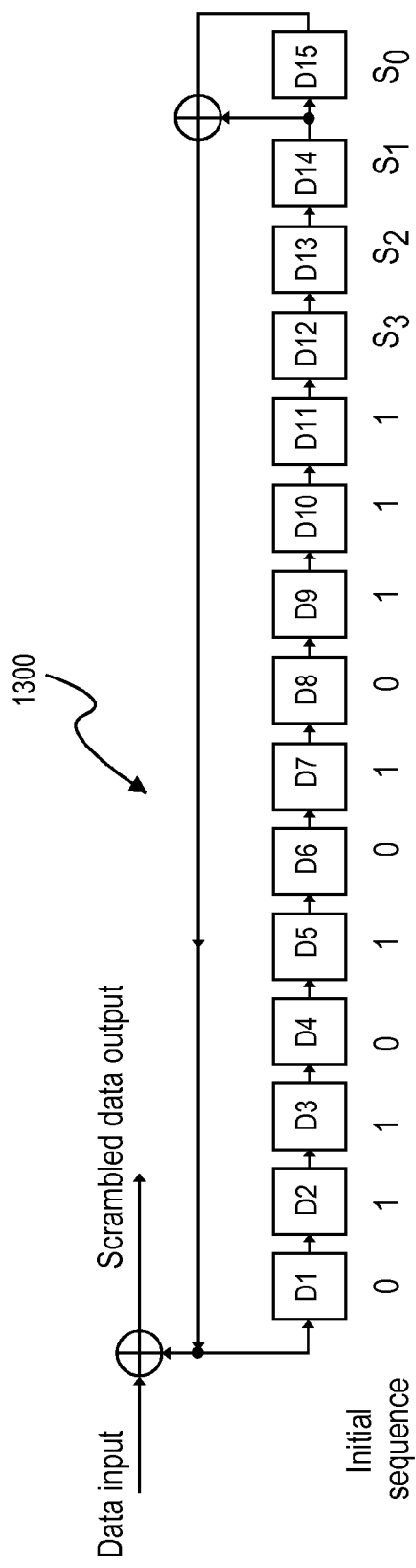
FIG. 13 is a block diagram of one embodiment of a high rate packet (HRP) data scrambler of the wireless HD communication system of FIG. 1.

FIG. 13 illustrates one embodiment of a HRP data scrambler. A polynomial of degree 15 may be used ($x^{15}+x^{14}+1$) to improve randomness of the transmitted data for HRP. FIG. 13 illustrates an initialization sequence with four bits at positions D12 to D15 (with D15 first).

Low-Rate PHY (LRP)

LRP may be used for MAC frame transmission (e.g., ACKs, beacons, discovery, etc. . . . ), for low rate (less than 40 Mbps) streaming from A/V source, for transmission of data used for antenna steering and tracking. LRP may be designed with OFDM based on 128-point FFT with BPSK modulation, and convolutional coding at ⅓, ½, and ⅔ rate. No Reed-Solomon code may be required due to messages being shorter and a higher BER tolerance. LRP may operate in three modes: LRP Omnidirectional (long) mode, LRP Beam-formed mode, and LRP Directional (short) mode. The different modes are further discussed below.

Figure 14:
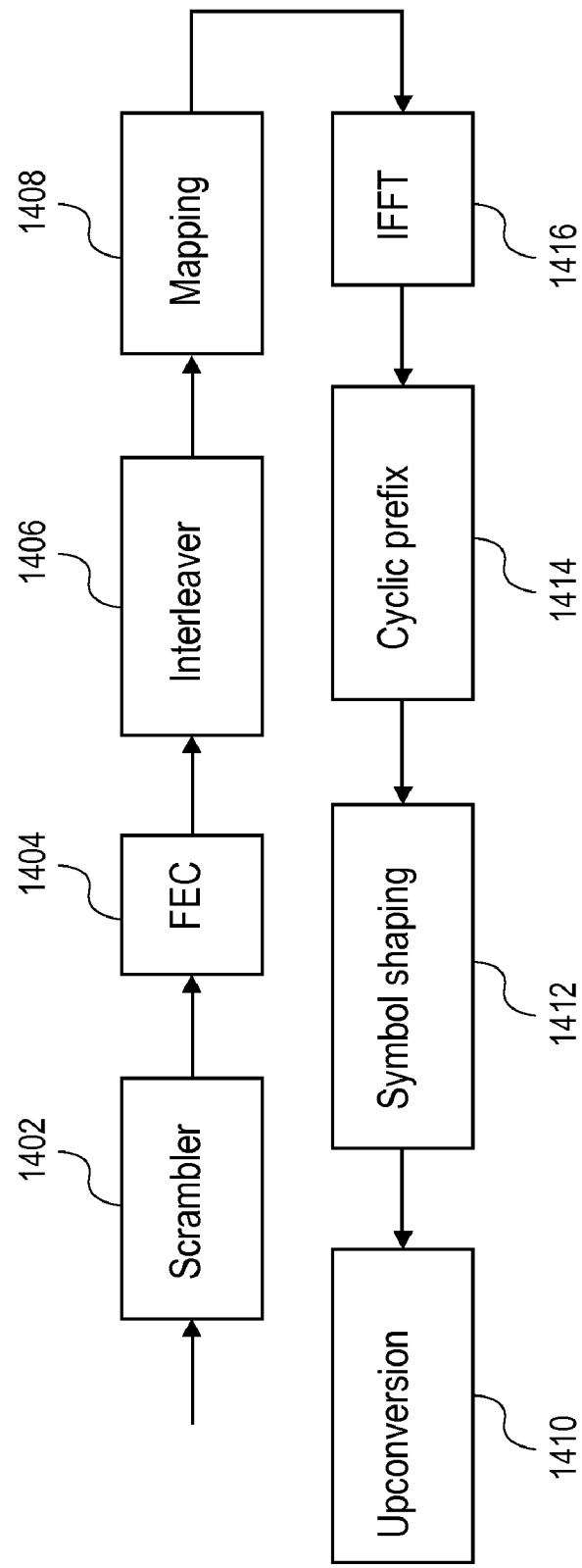
FIG. 14 is a block diagram of one embodiment of a physical layer of a low rate packet (LRP) transmission of the wireless HD communication system of FIG. 1.

FIG. 14 illustrates one implementation of a LRP Tx processing. The LRP circuit may include Scrambler 1402, FEC 1404, Interleaver 1406, Mapping 1408, IFFT 1416, Cyclic prefix 1414, Symbol shaping 1412, and Upconversion 1410.

FIG. 15 illustrates a table of LRP Data Rates. As shown, the different LRP modes produce different LRP data rates.

LRP Pilot and Data Tone may be defined as follows: 128-point FFT, 30 Data tones and 4 pilot tones, three unused tones at DC (tone numbers −1, 0, and 1), pilot tone positions may be modified, fixed pilot tone positions at tone numbers −14, −6, 6, and 14, data tones at all other positions from −18 to +18.

LRP Scrambler 1402 may use a polynomial of degree 6. The scrambler initialization field may be 4 bits. To initialize this polynomial, the 4 bit initialization field may be concatenated with 01 bits.

In LRP Omnidirectional mode, the produced signal is omnidirectional, has at least as much range as any forward-channel mode, tolerates stronger multipath than forward channel. The line rates in the LRP Omnidirectional mode may be from about 5 to about 10 Mbps, with a target BER less than $10^{-6}$. In LRP omnidirectional mode, each signal is transmitted multiple times using different antenna patterns. In one embodiment, each signal is repeated 8 times using 8 different antenna patterns. In one embodiment, different antenna patterns are orthogonal with each other. Thus, each replication uses a different Tx phase array setting (switched during cyclic prefix). The receiver can combine replications using MRC or similar techniques. Spatial diversity helps maintain omni coverage.

Figure 16:
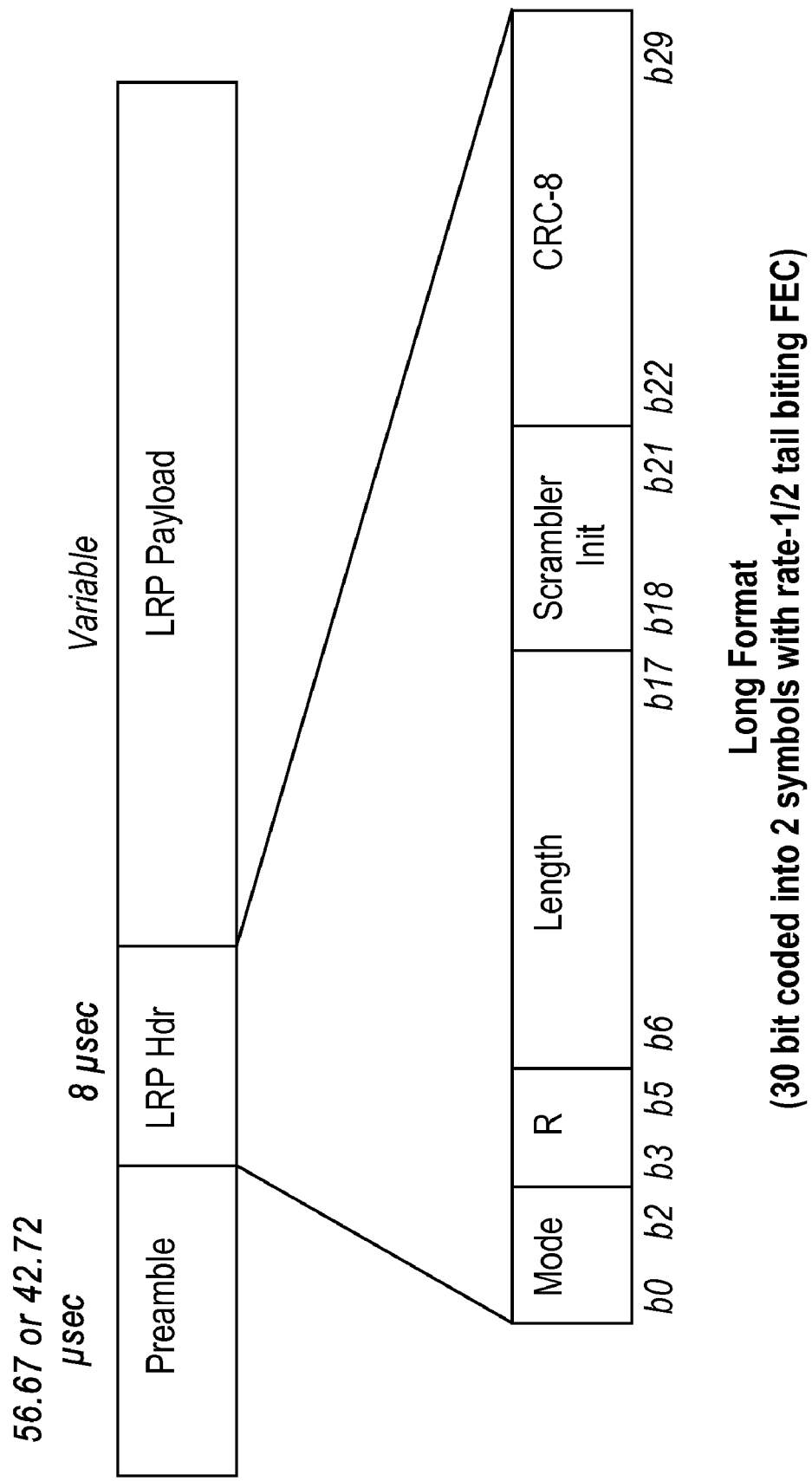
FIG. 16 is a block diagram of one embodiment of a format for an omnidirectional low rate packet (LRP) data packet.

FIG. 16 illustrates an LRP Omni data packet format comprising: preamble 1602, header 1604, payload 1606. Header 1604 may comprise mode 1608, Reserved 1610, Length 1612, Scrambler Init 1614, and CRC-8. Header 1604 is a long format with 30 bit coded into 2 OFDM symbols with rate ½ tail biting convolutional code. When tail biting is used, the initial and final states of the convolutional code are the same. In one embodiment, the last six information bits of the header may be used to initialize the state of the convolutional encoder. LRP Omni Preamble 1602 may include two types: a long omni preamble and a short omni preamble.

The Long Omni Preamble may be about 56.67 μsec long. This type of preamble may be used for beacons and other LRP data packets that require blind timing synchronization.

Figure 17:
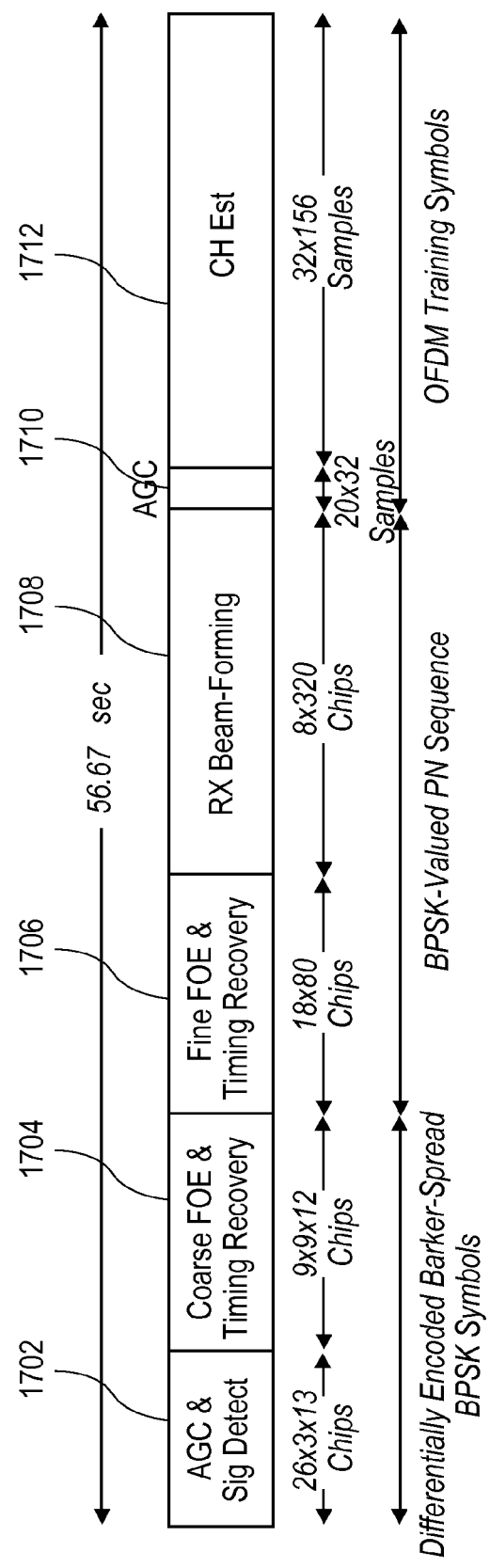
FIG. 17 is a block diagram of one embodiment of a long preamble format for an omnidirectional low rate packet (LRP) data packet.

FIG. 17 illustrates one embodiment of a Long Omni Preamble 1700 having 6 segments (with 17766 samples): automatic gain control (AGC) and signal detection segment 1702, coarse frequency offset estimation (FOE) & timing recovery segment 1704, fine FOE & timing recovery segment 1706, Rx beam-forming segment 1708, AGC segment 1710, and Channel Estimation segment 1710. The first three preamble segments 1702, 1704, 1706 consist of sequences of Offset-QPSK modulated chips with chip rate of 156.75 MHz (one-half of the sampling rate), which are filtered to comply with 91 MHz LRP transmission mask.

The AGC and Signal Detect segment 1702 field is composed of 78 symbols, with each symbol being defined as a 1 or −1 being spread by the Barker-13 ([−1 −1 −1 −1 −1 1 1 −1 −1 1 −1 1 −1]) chip sequence for both I and Q components. The symbol sequence $\{S_k\}$, $S_k=\mp 1$, is constructed by differential encoding of 26 times repetition of the 3-symbol sequence $\{b_k\}=[-1, 1, -1]$, specifically $S_k=S_{k-1}\times b_k$ with $S_0=1$.

The Coarse FOE (Frequency Offset Estimation) segment 1704 field is composed of 81 symbols, with each symbol being defined as a 1 or −1 being spread by the Barker-13 chip sequence for both I and Q components. The symbol sequence {$S_k$}, $S_k = \mp 1$, is constructed by differential encoding of 9 times repetition of the 9-symbol sequence {$b_k$}=[−1 −1 −1 1 1 −1 1 −1], specifically $S_{9i+k}=S_{9i+k-1} \times b_k$, where $S_0$ is the last symbol of the previous field Fine FOE & Timing Recovery segment 1706 field consists of a 1440 PN chip used for both I and Q components, which is generated by using polynomial $x^{12}+x^{11}+x^8+x^6+1$ with initial condition 0xB95.

Rx Beam-forming segment 1708 field consists of a 2560 PN chip sequence used for both I and Q components, which is constructed by repeating the 63-tap M-sequence generated by the polynomial $x^6+x^5+1$ with initial condition 101001.

AGC segment 1710 is a 20 times repetition of a 32-sample long OFDM training symbol, which is equal to IFFT of the following BPSK 32-point sequence: subcarriers −4 to 4 equal to {1 1 1 −1 0 −1 −1 1 −1} and all others are equal to zero.

Channel Estimation segment 1712 consists of 32 128-sample OFDM training symbols, where each is equal to IFFT of the following 128-point BPSK sequence preceded by a 28-sample cyclic prefix: subcarriers 2-18 equal to {1 −1 1 −1 −1 1 −1 1 1 1 1 1 1 −1 −1 1 1}, subcarriers −18 to −2 equal to {−1 1 1 1 1 1 −1 −1 1 1 −1 −1 −1 −1 1 −1 1}, and all others are equal to zero. Tx antenna phase array pattern may change at regular intervals for each of the five fields in the LRP Omni Preamble 1602. So for 8 Tx antennas, Tx phase array changes every 78, 234, 160, 640, 64, and 156 samples for each of the above five fields respectively.

The Short Omni Preamble may be about 42.72 μsec long. This type of preamble may be used in contention period (for slotted CSMA), and other LRP data packets that require only limited (+/−135 nsec) timing synchronization.

Figure 18:
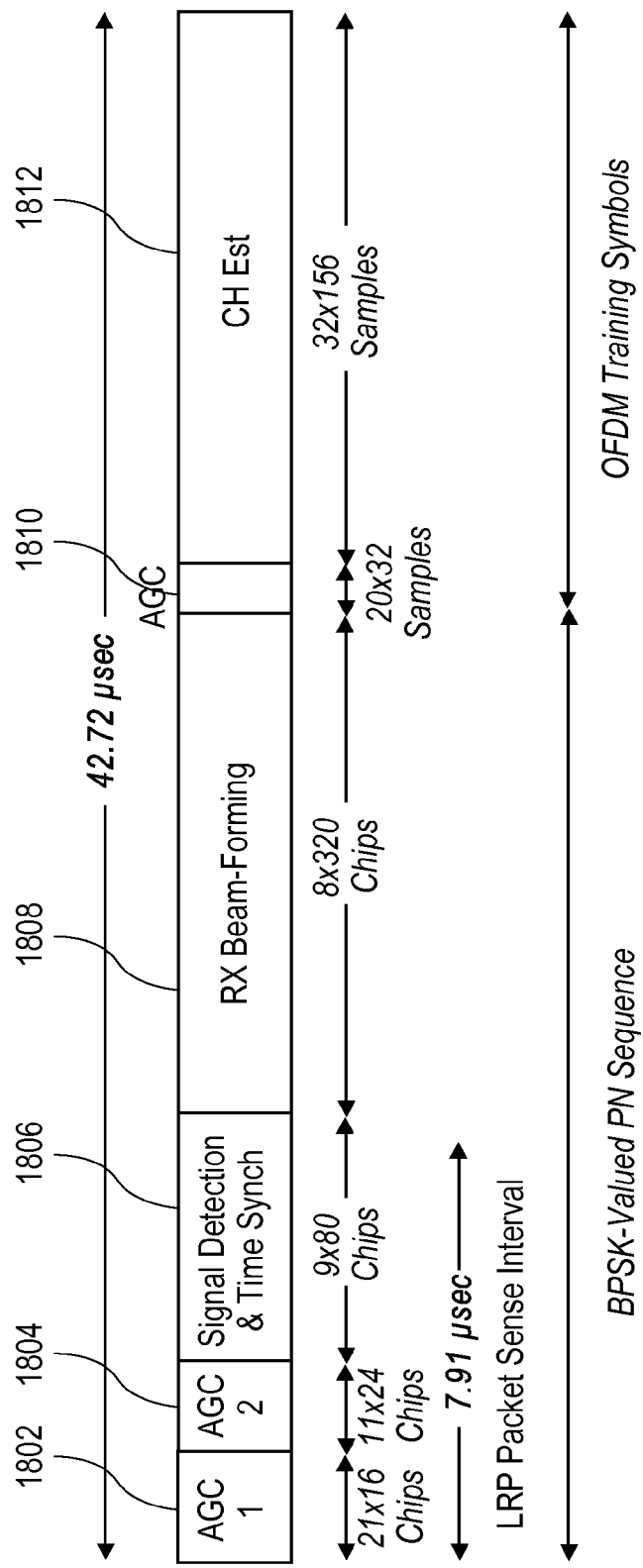
FIG. 18 is a block diagram of one embodiment of a short preamble format for an omnidirectional low rate packet (LRP) data packet.

FIG. 18 illustrates one embodiment of a short Omni Preamble 1800 having 6 segments (13392 samples): AGC segment 1802, AGC segment 1804, Signal Detection and Time Sync segment 1806, Rx Beam-forming segment 1808, AGC segment 1810, and Channel Estimation segment 1812. The first four preamble fields 1802, 1804, 1806, 1808 consist of a sequence of BPSK chips with chip rate of 156.75 MHz (each chip is equal to 2 samples) that are filtered to comply with 91 MHz LRP transmission mask. The chip sequence is generated by repeating a 63-tap M-sequence to be specified. The first two fields 1802, 1804 are AGC fields, which are respectively 336 and 264 chips long. The third field 1806 is 720 chips long and is used to detect the LRP packet and synchronize its timing within a −/+135 nsec window. A fourth field 1808 is 2560 chips long and is used for Rx beam-forming. The second AGC field 1804 is a 20 times repetition of a 32-sample long OFDM training symbol, which is equal to IFFT of following BPSK 32-point sequence: subcarriers −4 to 4 equal to {1 1 1 1 −0 −1 −1 1 −1}, and all others equal to zero. The Channel Estimation field 1812 consists of 32 128-sample OFDM training symbols, where each is equal to IFFT of the following 128-point BPSK sequence preceded by a 28-sample cyclic prefix: subcarriers 2-18 equal to {1 −1 1 −1 −1 1 −1 1 1 1 1 1 −1 1 1}, subcarriers −18 to −2 equal to {−1 1 1 1 1 1 −1 −1 1 −1 1 −1 −1 −1 1 −1 1 1}, and all others equal to zero. The Tx antenna phase array pattern changes at regular intervals for each of the 6 fields in Short Omni Preamble. So for 8 Tx antennas, Tx phase array changes every 32, 48, 160, 640, 64, and 156 samples for each of the above 6 fields respectively.

Figure 19:
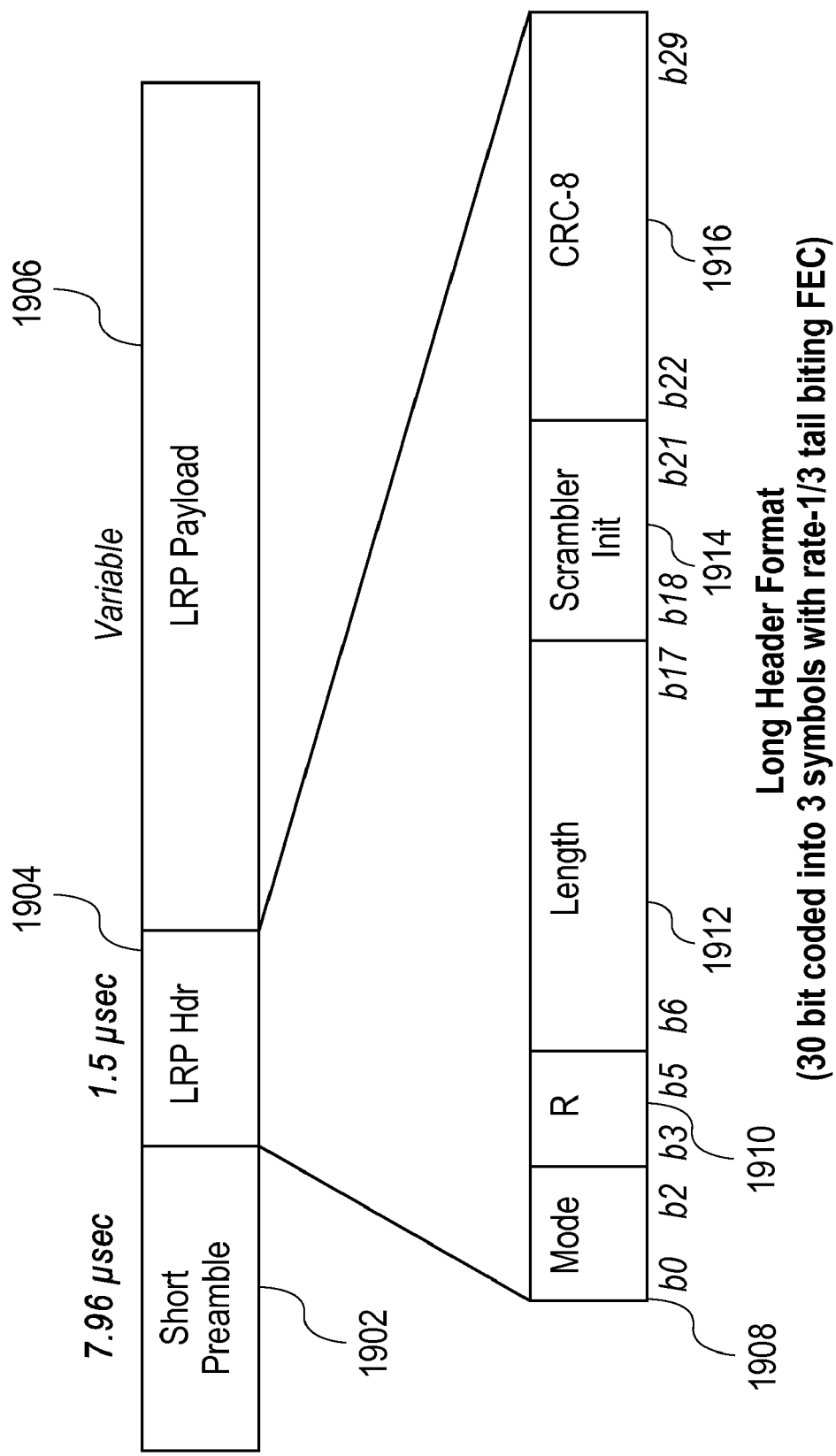
FIG. 19 is a block diagram of one embodiment of a format for a beam-formed low rate packet (LRP) data packet.

In LRP Beam-formed mode, the same technique as in HRP beam-forming may be used. This mode is the highest data rate but it is directional and requires beam updates. FIG. 19 illustrates one example of LRP Beam-formed data packet format 1900 comprising a short preamble 1902, a header 1904, and a payload 1906. The header 1904 may be 30 bit coded into 3 symbols with rate ⅓ tail biting convolutional code.

Figure 20:
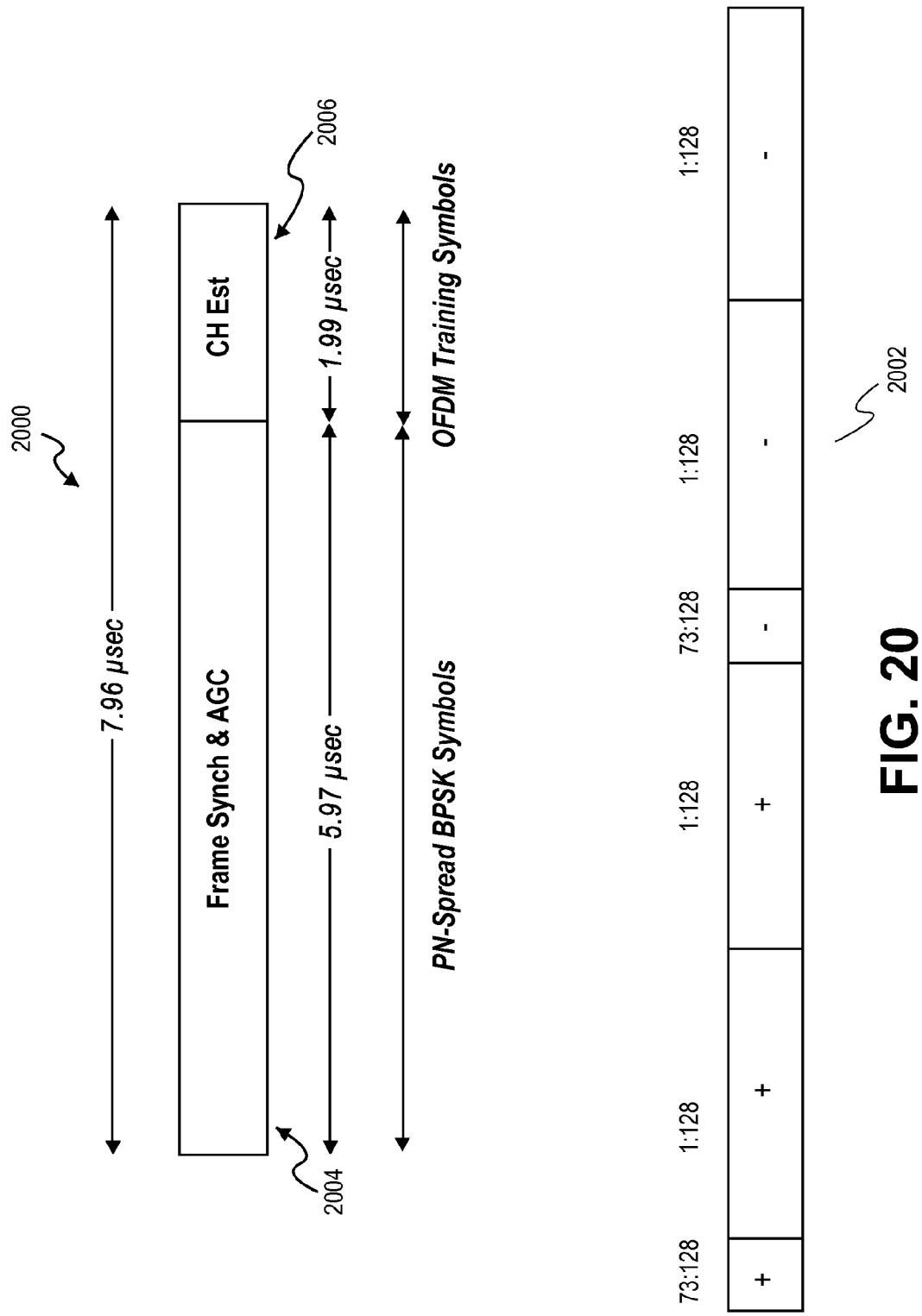
FIG. 20 is a block diagram of one embodiment of a preamble format for a beam-formed low rate packet (LRP) data packet.

The LRP Beam-formed preamble 1902 allows for blind timing synchronization, and has similar structure to HRP-PDU Preamble. FIG. 20 illustrates one embodiment of the LRP Beam-formed preamble 2000. The LRP Beam-formed preamble 2000 packet is 7.96 msec (2496 samples) long, and comprises two fields: Frame synch and AGC field 2004 and Channel Estimation field 2006.

Frame synch and AGC field 2004 consists of a sequence of BPSK chips with chip rate of 156.75 MHz (each chip is equal to 2 samples) that are filtered to comply with 91 MHz LRP transmission mask. Chip sequence is equal to 14 repetition of a 63-tap M-sequence to be specified for 936 chips, with the sequences modulated/multiplied respectively by [1 1 −1 −1 1 1 1 1 1 −1 −1 1 1 1].

Channel Estimation field 2006 is constructed by repeating the time-domain samples of the 128-tone OFDM training symbol, described by Table 35 in the frequency domain, as illustrated in sequence 2002 of FIG. 20, where the plus and minus sign mean that the corresponding samples are multiplied by 1 and −1 respectively.

In LRP Directional mode, the produced signal has a similar range as in forward channel, only requires "reverse direction" hardware (i.e. fewer Rx/Tx). In LRP directional mode, each signal is repeated multiple times using the best antenna pattern. In one embodiment, the best antenna patter is selected among the 8 possible antenna patterns used in the omnidirectional mode. In one embodiment, each signal is repeated 5 (=4+1) or 9 (=8+1) times. The optimal Tx phase array pattern may be tracked for example, every 10 packets. The best Tx diversity pattern is fed back to the back channel transmitter from the back channel receiver.

Figure 21A:
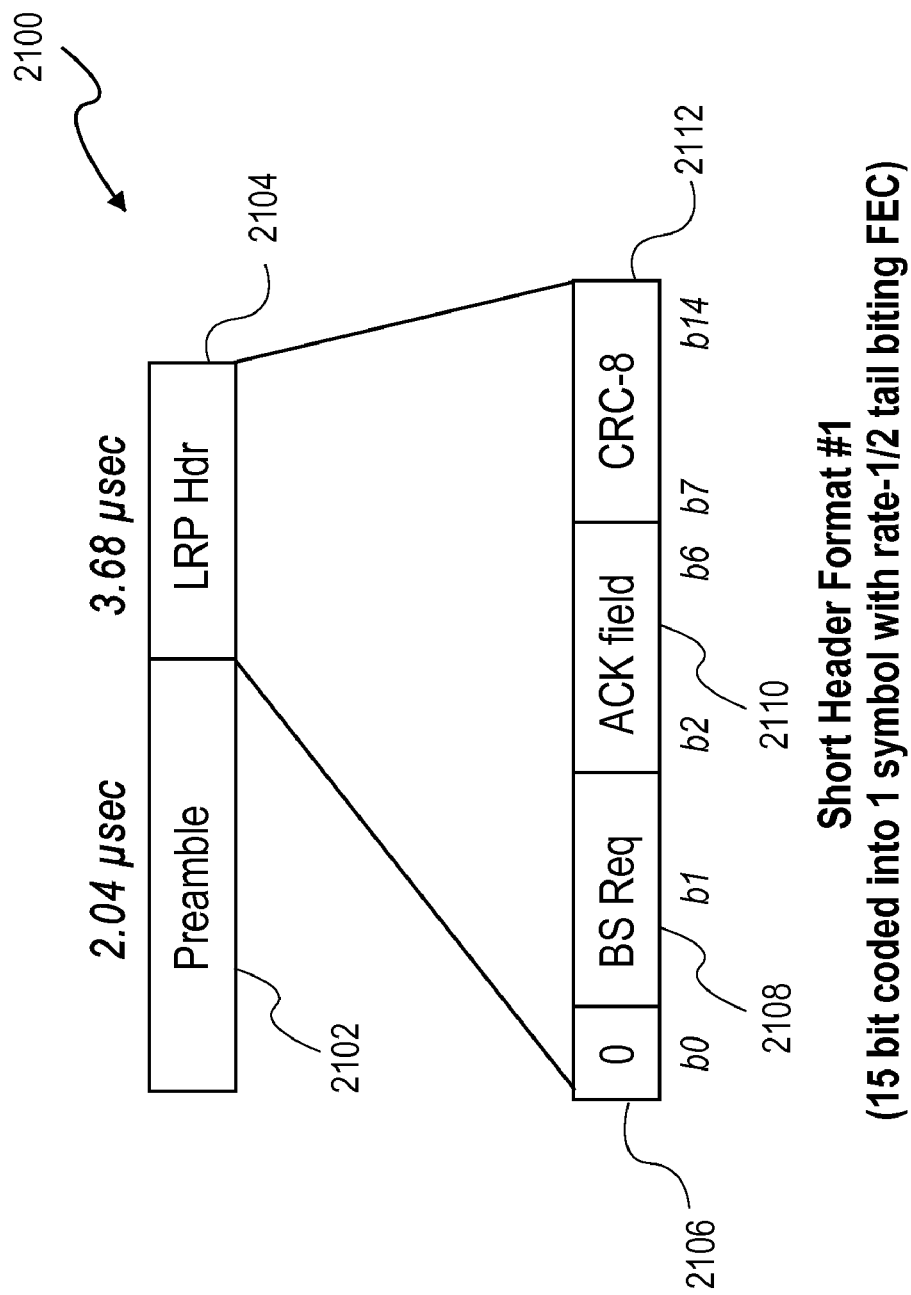
FIG. 21A is a block diagram of one embodiment of a format for a directional low rate packet (LRP) data packet without payload.

The line rates in the LRP Directional mode may be from about 5 to about 10 Mbps. Directional LRP packets may be used as ACK to acknowledge HRP or beam-formed LRP, data packets with or without additional payload. FIG. 21A illustrates a short 15-bit ACK header with no payload. FIG. 21B illustrates a 16-bit short ACK header with payload. The directional LRP short ACK header is encoded by rate-½ tail biting convolutional code and transmitted by 1 OFDM symbol. For Directional LRP packets with payload (second format), mode bit select one of following 2 non-beam-formed PHY data rates:

| 5 Mbps: | Mode Bit = 0 |
| 10 Mbps: | Mode Bit = 1 |

In LRP directional mode, the information is coded by rate-⅔ convolutional code. If tail biting can be used to reduce the number of OFDM symbol, tail biting is used. Otherwise, at least 6 consecutive zeroes are used to terminate the trellis for the convolutional code.

For these packets, Postamble Flag specifies whether a postamble is appended to the packet (flag=1), or not (flag=0).

Figure 22:
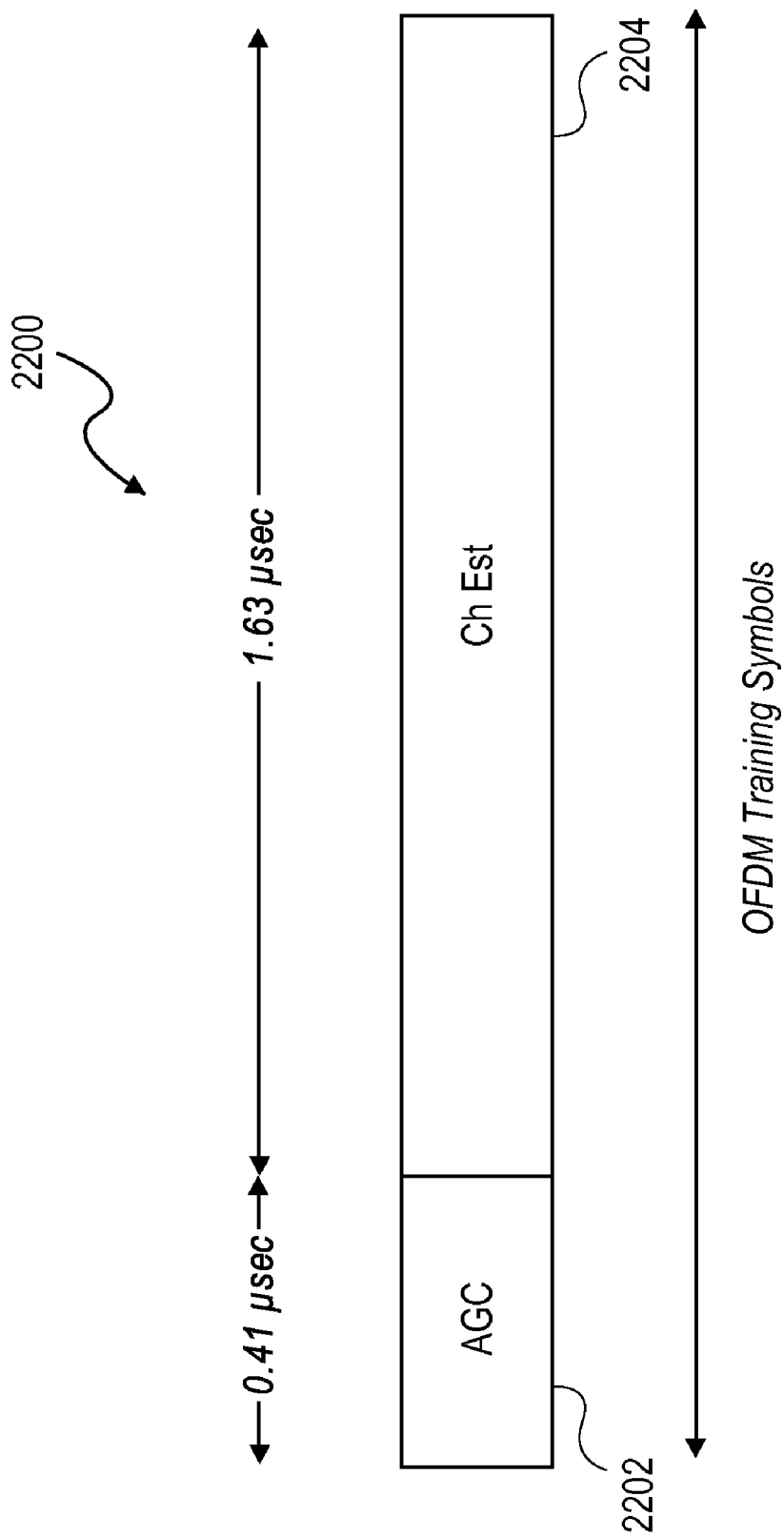
FIG. 22 is a block diagram of one embodiment of a format for a directional low rate packet (LRP) preamble.

FIG. 22 illustrates a directional LRP packet preamble 2200. LRPPDU Preamble for Directional packets is 2.04 msec (640 samples) long, and is comprised of 5 128-sample OFDM training symbols as shown here. The first symbol 2202 is used for AGC, and next 4 symbols are used for channel estimation and frequency offset estimation 2204. This preamble allows for limited (−/+150 nsec) timing uncertainty.

Figure 23:
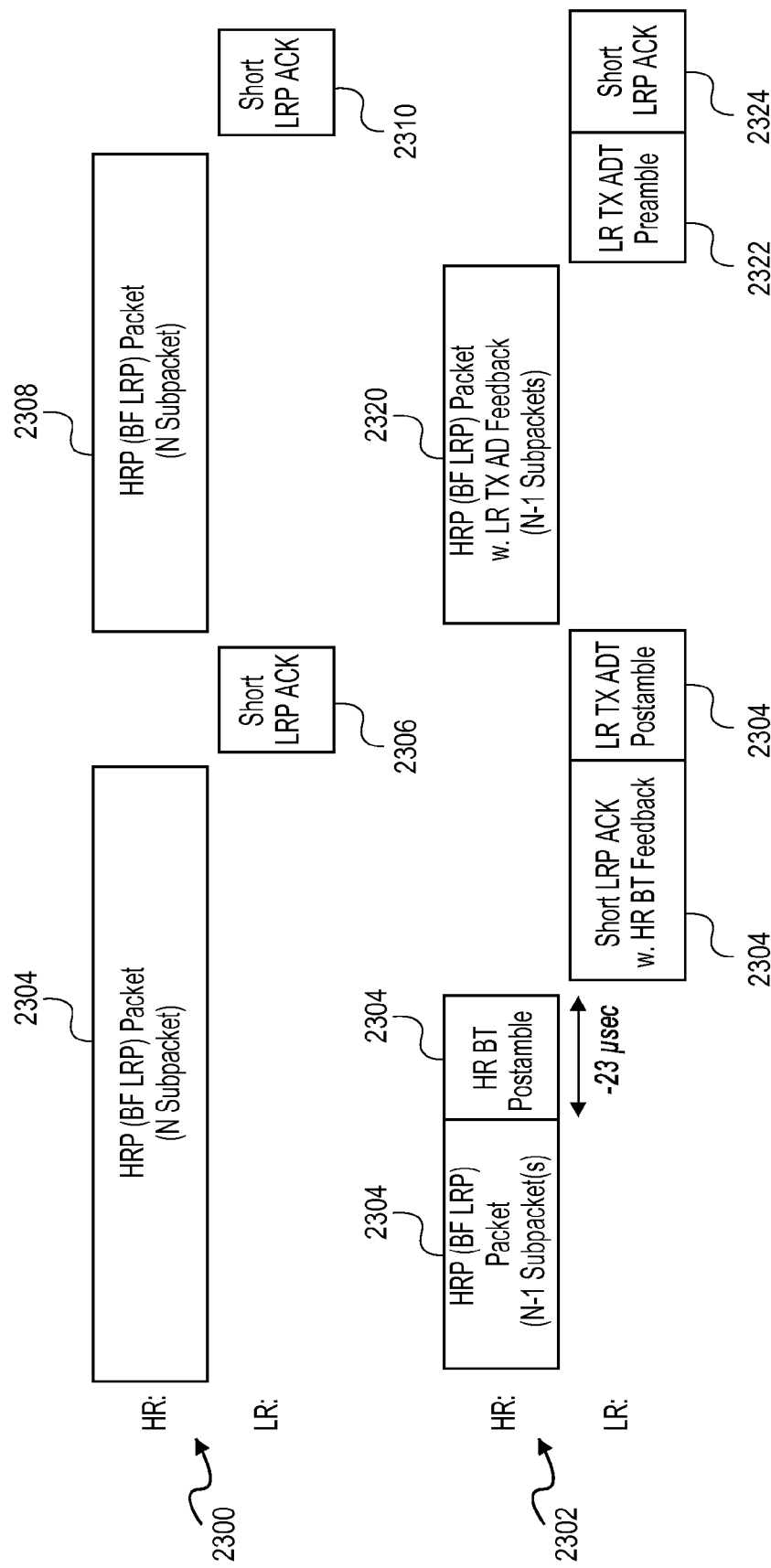
FIG. 23 is a block diagram of one embodiment of a format for directional low-rate packets (LRP) for antenna direction tracking.

FIG. 23 illustrates Antenna Direction Tracking for Directional LRP Packets. As mentioned, Directional LRP packets are used for Acknowledgement of HRP or Beam-formed (BF) LRP packets. These packets use the best Tx antenna direction from a set of up to 8 antenna directions, where the optimum Tx antenna direction needs to be tracked over time by using a special frame structure as described in FIG. 23. For every M regular HRP/Short-ACK, or Beam-formed-LRP/Short-ACK, frames may be formed as in 2300 of FIG. 23. There is a pair of HRP/Short-ACK, or Beam-formed-LRP/Short-ACK, frames with following special structure, where HR/LR Beam-Tracking, and LR Antenna Direction Tracking (ADT) take place as illustrated in 2302 of FIG. 23.

As shown Antenna Direction Tracking takes place in two stages: (1) selection of optimum Tx Antenna Direction by using a dedicated postamble and (2) Rx Beam-forming/tuning for the selected Tx Antenna Direction by using a dedicated preamble. Between the above two stages, the selected Antenna Direction index is fed back from Short ACK Rx to Short ACK Tx via a HRP, or Beam-formed LRP, packet.

Figure 24:
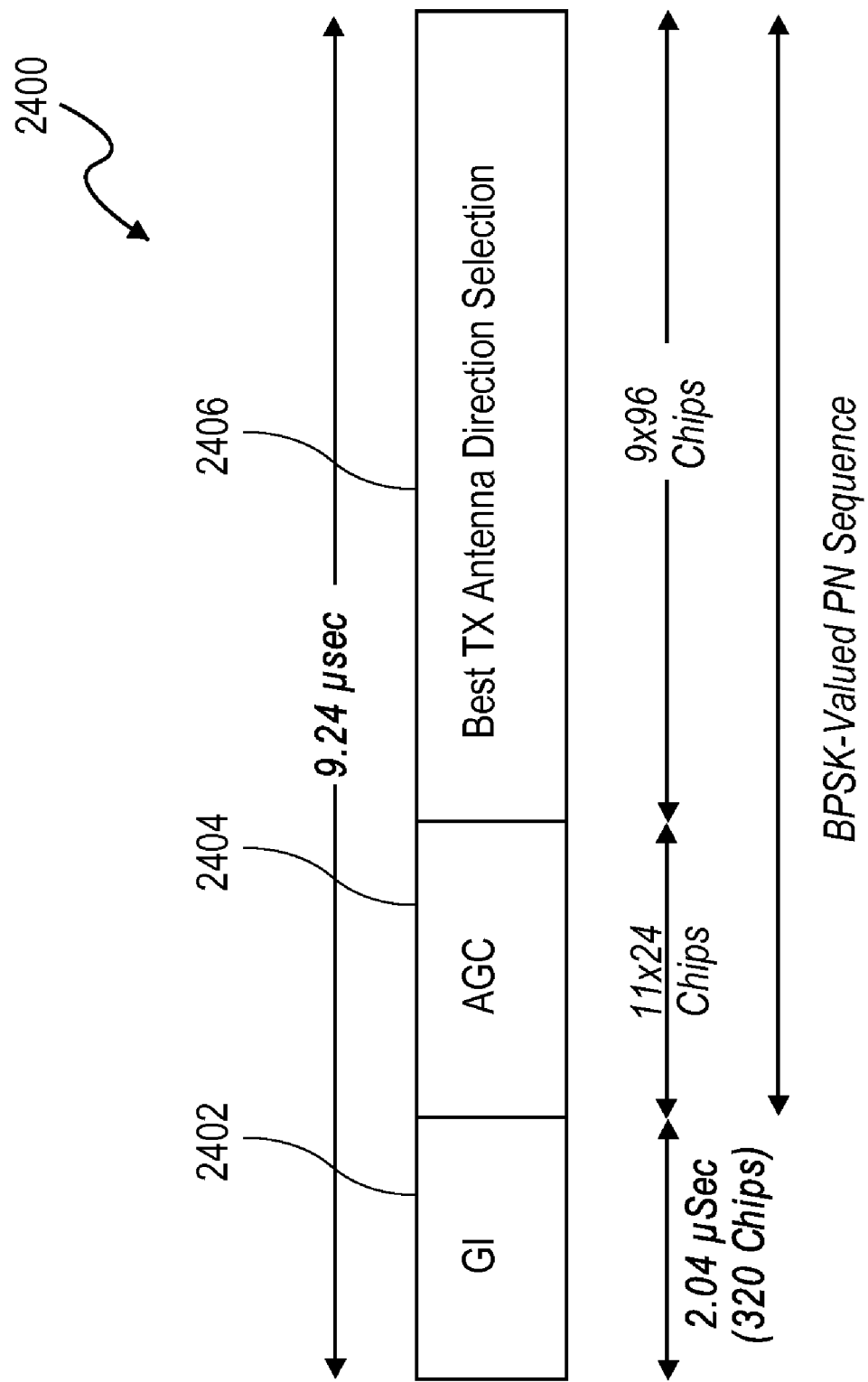
FIG. 24 is a block diagram of one embodiment of a postamble format for directional low-rate packets (LRP) for a transmitting antenna direction tracking.

FIG. 24 illustrates a Tx Antenna Direction Tracking Postamble 2400. Tx Antenna Direction Tracking postamble for Directional LRPPDU is appended to a Directional LRP packet with payload. Tx ADT postamble is 9.24 μsec (2896 samples) long, and, and is comprised three segments 2402, 2404, 2406. Two postamble fields 2404, 2406, follow a 2.04 msec Guard-Interval 2402 and consist of a sequence of BPSK chips with chip rate of 156.75 MHz (each chip is equal to 2 samples) that are filtered to comply with 91 MHz LRP transmission mask. The chip sequence is generated by repeating a 63-tap M-sequence to be specified. The second field 2404 is for AGC, which is 264 chips long. The third field 2406 is 864 chips long and is used to select the best Tx diversity combination among 8 antennas. Tx antenna phase array pattern changes at regular intervals of the postamble. For 8 Tx antennas, Tx phase array changes every 48, and 192 samples over each of the above 2 fields respectively.

Figure 25:
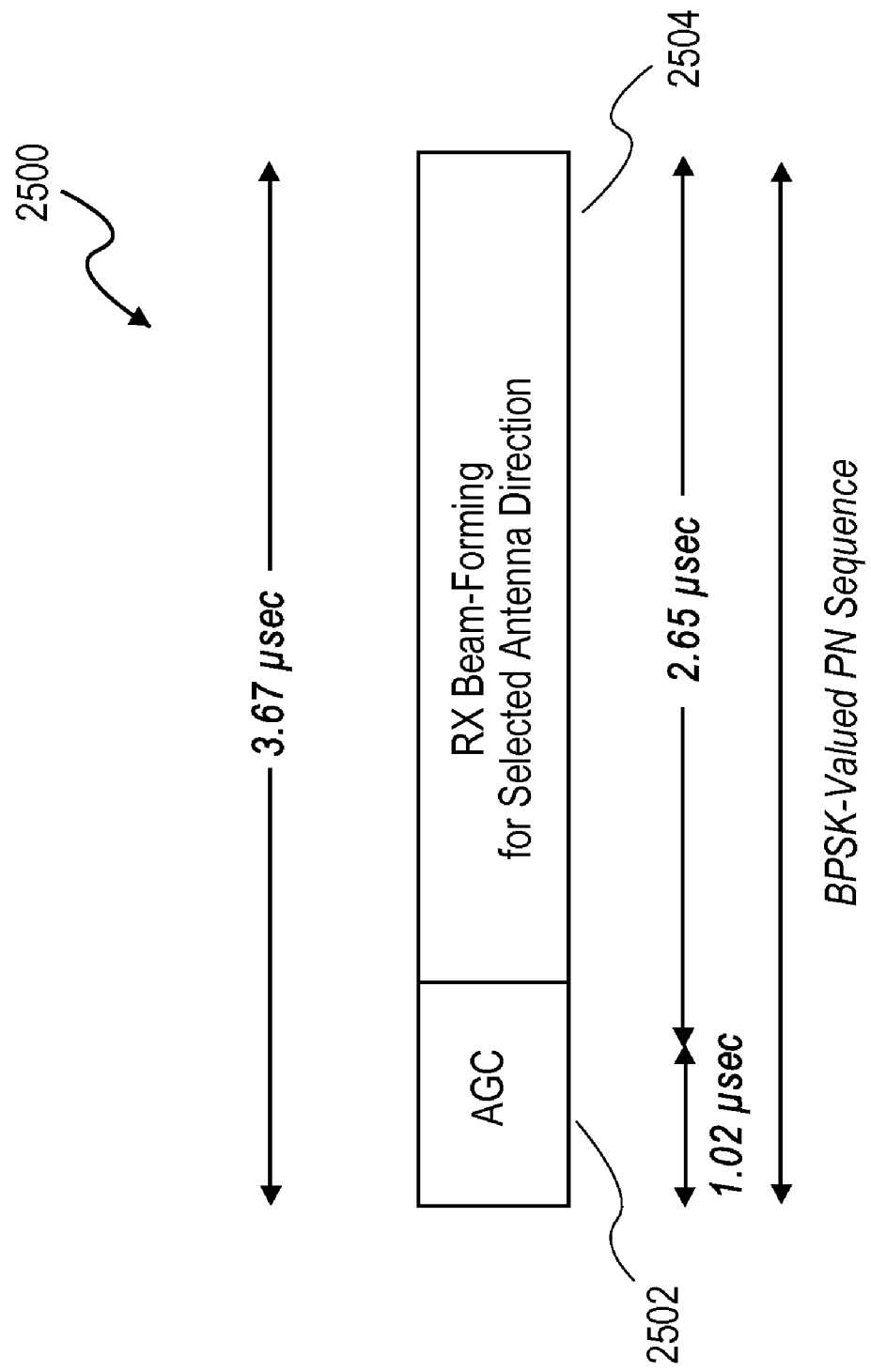
FIG. 25 is a block diagram of one embodiment of a preamble format for directional low-rate packets (LRP) for a receiving antenna direction tracking.

FIG. 25 illustrates a Tx Antenna Direction Tracking Preamble 2500. Rx ADT Preamble is added to a Directional LRP packet with no payload, and is used for Rx Beam-forming for selected Tx Antenna Direction. This extra preamble is comprised of two segments 2502, 2504 (1152 Samples). The two fields consist of a sequence of BPSK chips with chip rate of 156.75 MHz (each chip is equal to 2 samples) that are filtered to comply with 91 MHz LRP transmission mask. The chip sequence is generated by repeating a 63-tap M-sequence to be specified. The first field 2502 is for AGC, which is 128 chips long. The second field 2504 is 448 chips long and is used to carry out Rx Beam-Forming.

Beam-Forming Overview

In one embodiment, the communication system implements beam-forming with the following elements: a beam-search process; a beam-tracking process; and a beam-steering state machine. The beam search and beam tracking are used to compensate for the time-variation of the wireless channel and the possible obstruction of narrow beams. When called, the beam-search process finds the beam direction that maximizes the link budget. The obtained beam direction is then used for beam-forming. After the beam-search process has resulted in optimal beam-forming, the beam-tracking process tracks the beam versus small time-variations in the channel transfer function. The beam-steering state machine uses an arbitrary bad link detection mechanism (which can based on payload or beam-tracking results) to detect whether the Signal-to-Noise Ratio of the current link is below a desired threshold. For purposes herein, a bad link means that current beam direction is obstructed, and subsequently a new beam-search is scheduled to find the next best beam direction.

Figure 37:
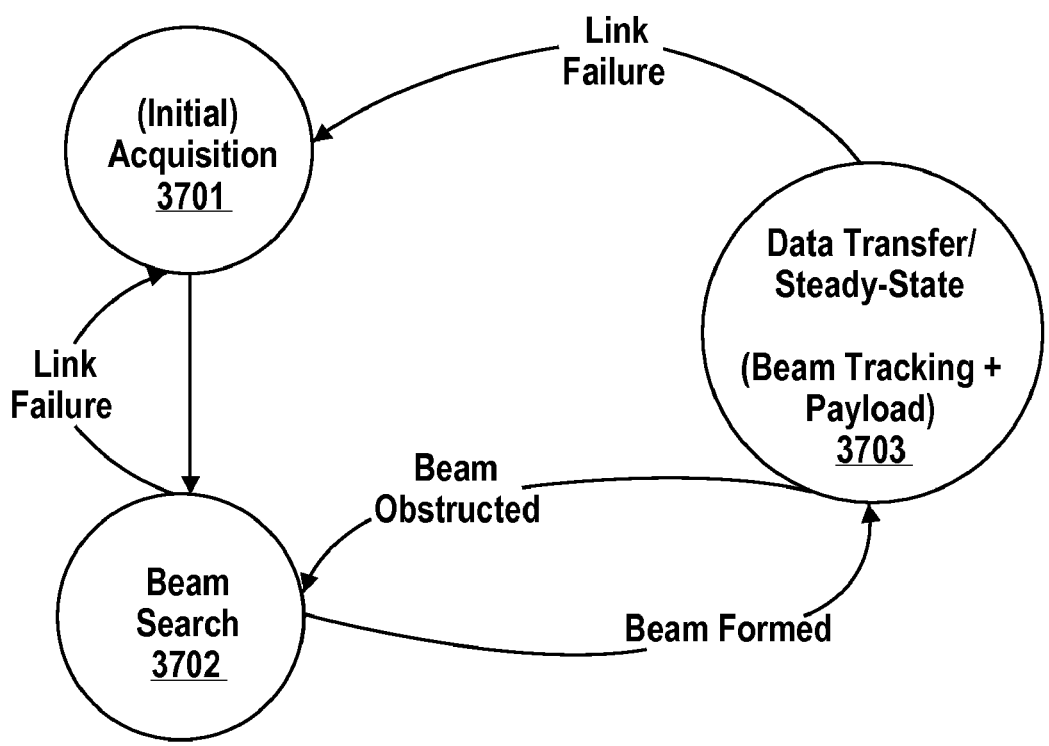
FIG. 37 illustrates one embodiment of a beam-steering state machine.

FIG. 37 illustrates one embodiment of a beam-steering state machine. Referring to FIG. 37, state machine 3700 includes an acquisition (initial/idle) state 3701, a beam search state 3702, and a steady-state, or data transfer state, 3703. The beam steering process begins in acquisition state 3701. In one embodiment, acquisition state 3701 is only entered once during link setup. After initial acquisition, state machine 3700 transitions to beam search state 3702 to perform the beam search. Beam search state 3702 is also entered as soon as a source (e.g., a transmitter) or destination (e.g., a receiver) determines that a channel is considered bad (e.g., beam obstructed) (based on one or more metrics). Note that in one embodiment, the beam search is scheduled regularly (e.g., every 0.5-2 sec) during data transfer state 3703. This may be useful in based of the beam being blocked.

After the beam search is successful, state machine 3700 transitions into steady-state 3703 where data transfer operations are performed. In one embodiment, this includes beam tracking at predetermined intervals (e.g., every 1-2 msec). In one embodiment, the beam tracking is a shortened version of the beam search process. These may be scheduled or based on request.

If there is a link failure that occurs when beam steering state machine 3700 is in either beam search state 3702 or data transfer state 3703, then beam steering state machine 3700 transitions to acquisition state 3701.

In one embodiment, beam-forming at the transmitter is performed by rotating the phase of the RF-modulated signal individually for each RF power amplifier and transmit antenna set, where phase rotation is described by the following equation:

$$A(t)\cos(2\pi f_c t + \varphi(t)) \xrightarrow[\text{rotate by } \theta]{} A(t)\cos(2\pi f_c t + \varphi(t) + \theta)$$

and the rotation angle θ is quantized to 2-4 bits. This may be achieved using quantized phase shifters.

Similarly, in one embodiment, beam-forming at the receiver is performed by rotating the phase of the received RF-modulated signal after each receive antenna and Low-Noise Amplifier (LNA) set, and then combining the phase-rotated signals.

It should be noted that in one embodiment, the receive antennas are coupled to one or more digitization paths, and the number of digitization paths is less than the number of receive antennas. Also, in one embodiment, the transmit antennas are coupled to one or more transmit signal generation paths, and the number of transmit signal generation paths are less than the number of transmit antennas.

An Example of a Beam-Search Process

In one embodiment, the beam-search process consists of two stages: timing recovery and an iterative beam-search. In the timing recovery stage, arrival time (delay) of the beam/ray with maximum gain is estimated. In one embodiment, delay estimation is performed by transmitting a known symbol sequence over the air and matching that sequence at the receiver via a matched filter. To maximize the signal-to-noise ratio, transmit antenna phases are set equal to columns of the N×N Hadamard matrix, H, one column at a time, where H has the following properties:

$$H(i,j) \in \{-1,1\}, H^T H = NI_{N \times N}$$

where $H^T$ is transpose of H, and $I_{N \times N}$ is the N×N identity matrix. Transmit antenna phases are swept through N columns of H (set equal to one at a time) P (e.g., 3) times, where each time a different receive antenna phase pattern is used. Receive antenna phase patterns are selected such that the corresponding beams cover the entire space. The receiver matched filter correlates the received signal, r(k), with the transmitted sequence, x(k), as described by the following equation, where the pattern is L symbol long:

$$y(k) = \sum_{i=0}^{L-1} r(k+i)x(i)$$

The time delay that results in a maximum matched-filter output energy, after it is summed over all transmit and receive antenna phase patterns, is selected as the time-delay of the maximum gain beam/ray. In addition, the receive antenna phase pattern, for which the matched-filter output at the selected time-delay has maximum energy, after it is summed over all transmit antenna phase patterns, is also selected.

At the next stage, a beam-search iterative process is used that, in one embodiment, alternatively changes transmit and receive phase patterns for a total of 2M (even) number (e.g., 4, 6, 8 or 10) of stages. In almost all cases, transmit and receive phase patterns converge towards the optimum values corresponding to the maximum-gain beam direction. In some isolated cases, the transmit and receive phase patterns may fluctuate between different phase patterns that correspond to similar beam-forming gains.

Figure 41:
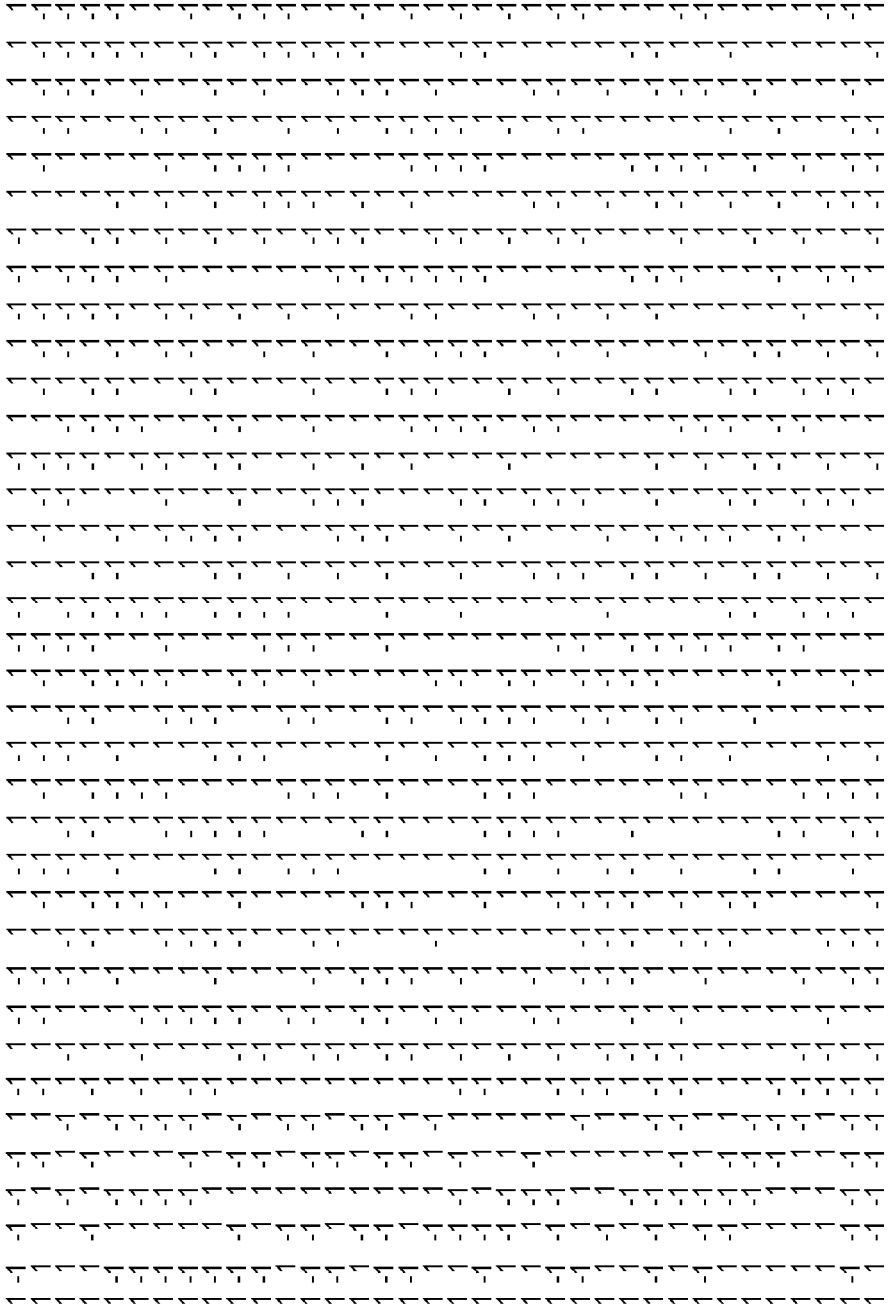
FIG. 41 illustrates an example of a 36×36 Hadamard matrix.

For the first iteration, the receive phase pattern is set to one of the P phase patterns that was selected at the end of the last timing-recovery stage. In other words, the receiver phase shifts are set to an ith initial value (for i=1, 2, 3, etc.). In one embodiment, the receive phase shifts are set by setting values of an antenna-array weight vector (AWV). The transmit pattern, on the other hand, is set equal to N columns of the Hadamard Matrix H one at a time. An example of a 36×36 Hadamard matrix is given in FIG. 41. Note that for a certain number of antennas, another unitary matrix could be used. Also, note that in one embodiment, the antenna-array weight vectors (AWV) for the receiver and the transmitter are complex weight vectors that can have magnitude and/or phase information. In one embodiment, the weight vectors are quantized phase shift vectors.

The transmitter transmits known symbol sequence over the air, which is used to estimate resulting Single-Input Single-Output (SISO) channel transfer functions from the RF-modulated signal before N transmit antenna phase rotations to the combined signal after N receive antenna phase rotations. During this stage, the transmitter phased array antenna switches between phase vectors derived from columns of matrix H, which span the entire space. In one embodiment, the transmitter antenna array weight vector (AWV) includes 36 weight vectors. For each transmit phase pattern, the received signal is correlated with the transmitted symbol sequence at the selected optimum time-delay. The complex-valued correlator output, $\tilde{h}=Ae^{j\Phi}$, is then used as the estimate of the corresponding channel transfer function. Thus, the N-Tx by 1-Rx channel gains per each delay corresponding to the receiver phase shifts are sequentially measured and the maximum-energy delay (e.g., cluster) is selected for the best initial value.

Next, the vector of N complex-valued channel estimates is complex-conjugated and multiplied by matrix H. Angles of the complex-valued elements of this vector are then quantized into 2-4 bits, forming a vector of quantized phases. This vector is referred to herein as the MRC-based transmitter quantized phase shift (QPS) vector (i.e., the transmitter AWV) and is sent back to the transmitter via a reverse wireless channel such as the back channel described above, where it is used as the fixed transmit phase pattern for the next part of the first iteration. In one embodiment, the index of the transmitter AWV that produces the strongest signal at the receiver is also sent back to the transmitter via the reverse channel.

For the next part of the first iteration, the transmit phase pattern is set equal to the quantized phase vector calculated at the end of last iteration. That is, the transmitter phase shifts are set to the values calculated in the first part of the iteration that is for tuning of the transmitter AWV. The receive phase pattern, on the other hand, is set equal to the N columns of H one at a time. Transmitting the same symbol sequence and using the same correlation procedure, SISO channel transfer functions are estimated for each receive phase pattern. In other words, the 1-Tx by N-Rx channel gains are sequentially measured at the receiver for maximum-energy delay and an estimate for the equivalent 1×M channel.

Similarly, the vector of N complex-valued channel estimates is complex-conjugated and multiplied by H. Angles of the complex-valued elements of this vector are then quantized into 2-4 bits, forming a vector of quantized phases. This vector is referred to as the MRC-based receiver quantized phase shift (QPS) vector (i.e., the receiver AWV). This AWV vector is used in the receiver as the fixed receive phase pattern for the next iteration. That is, the receiver phase shifts (weights) are set to these calculated values.

Thus, the same steps are repeated a number of times (e.g., 3, 4, etc.), where alternatively transmit or receive phase patterns are set equal to calculated quantized phase vectors from the previous iteration, while the patterns for the opposite operation, i.e., receive or transmit patterns, are set equal to N columns of H one at a time.

At the end of the iterations, the calculated transmit and receive phase vectors are used to form a beam in the optimum direction.

In one embodiment, the beam search (and beam tracking) signal is an OQPSK signal at $F_s/2$ sampling frequency, where $F_s$ is the OFDM sampling rate.

In one embodiment, up to three different initial receiver QPS vectors are used to improve performance of the optimum sampling-time estimation. Also, in one embodiment, the sequential channel estimation is performed by setting the transmitter (and receiver) weight vector to N columns of matrix H, one at time, and measuring N corresponding scalar channel estimates sequentially. Each channel estimation stage consists of N estimation intervals such that if V is the resulting 1×N (N×1) estimate vector, then the channel estimate is VH*(H*V)

The received signal should be neither saturated nor over-attenuated during each timing-recovery or iteration step, where transmit or receive phase patterns are swept through columns of H. Hence, an Automatic Gain Control (AGC) procedure is performed before each such step. In one embodiment, in this AGC procedure, an arbitrary symbol sequence covering the same bandwidth is transmitted over the air, while transmit and receive phase patterns are changed in the same fashion as the ensuing step. The received signal energy is measured, and the receiver gain is consequently set to a value such that the received signal is neither saturated nor over-attenuated for all transmit and receive phase patterns. If necessary, this procedure will be repeated a number of times (up to 3) until a suitable gain is found.

Figure 38:
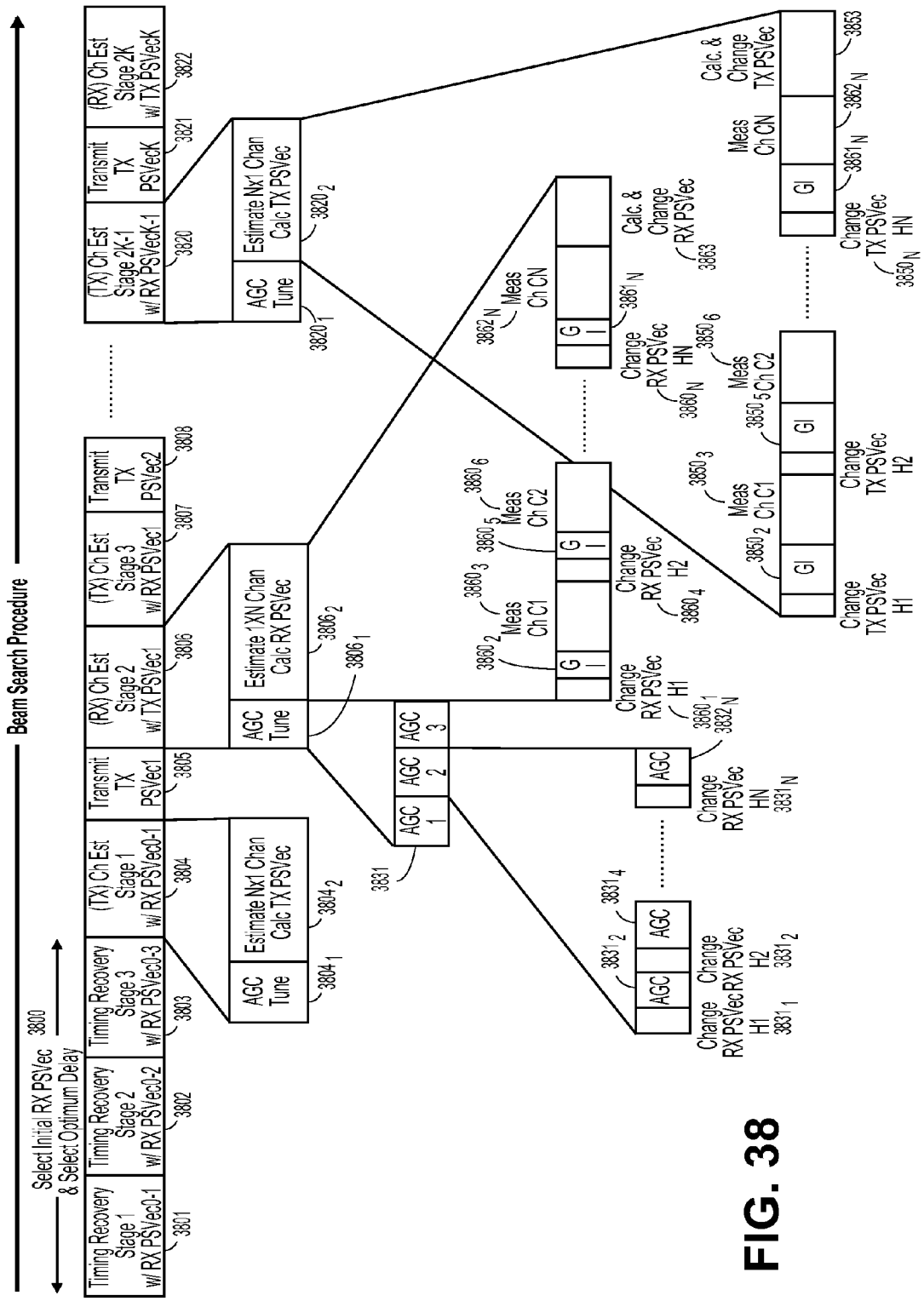
FIG. 38 illustrates stages of one embodiment of the beam search process.

FIG. 38 illustrates stages of one embodiment of the beam search process described above. Referring to FIG. 38, stages 3801-3803 represent timing recovery stages. During these stages, the initial receiver phase shift vectors and the optimum delay are selected. In one embodiment, during stages 3801 and 3802, the transmit energy is fixed.

After stage 3803, a series of iterations is performed. Each iteration consists of three blocks, with stages 3804-3806 representing an example of one iteration. Stage 3804 is a transmit channel estimate stage using a fixed receive phase pattern in which the receiver vectors that give the best energy are selected and used to estimate the channel. As shown, stage 3804 includes automatic gain control $3804_1$ along with a block in which the receiver generates a N×1 channel estimate using received vectors and calculates the transmit phase shift vector in substage $3804_2$. The operations of substage $3804_2$ are depicted in block form shown as an expanded version of substage $3820_2$ (since all the blocks are the same). Initially, the transmit phase shift vector is changed to H1 (substage $3850_1$), with a guard interval (substage $3850_2$) inserted to compensate for the phase shift latency. For a change in the transmit weight vectors, the guard interval is larger than the overall delay spread minus the transmit filter delay spread. Then the first channel (Ch1) is measured (block $3850_3$). After measuring the channel, the transmit phase shift vector is changed to H2 (substage $3850_4$), with a guard interval (substage $3850_5$). Then the second channel (Ch2) is measured (substage $3850_6$). This continues until the last channel, ChN, is measured. After all the transmit phase shift vectors have been transmitted and the channels estimated, the transmit phase shift vectors are calculated and changed (in preparation for estimating the receiver channel). In one embodiment, the transmitter antenna weight vector that produces the strongest received signal at the receiver is repeated more than once during this stage in order to allow the receiver to compensate for various phase inaccuracies inherent to the transmitter and receiver analog circuits.

After the transmit phase shift vector has been calculated, the receiver sends it back to the transmitter in stage 3805. In one embodiment, the receiver additionally sends back the index of the transmitter weight vector that produces the strongest received signal to be used during the next iterations. This may be performed using the backchannel.

Next, the receive channel estimation stage 3806 is performed using the fixed transmit phase shift vector. The receive channel estimation stage (stage 3806), as well as each of the other receive channel estimation stages, comprises an automatic gain control substage (substage $3806_1$) and a 1×N channel estimation and receive phase shift vector calculation stage (substage $3806_2$). AGC block $3806_1$ is depicted as three AGC blocks 3831, numbers 1-3, which are all the same. One of these is shown in more detail and is exemplary of the others. First, the receive phase shift vector is changed to H1 (substage $3831_1$) and AGC is performed on that phase shift vector (block $3831_2$). Then the receive phase shift vector is changed to H2 (substage $3831_3$) and AGC is performed on that phase shift vector (substage $3831_4$). This continues for all N receive phase shift vectors.

After AGC substage $3806_1$, the channel estimate and receive phase shift vector calculation occurs at substage $3806_2$. The operations of substage $3806_2$ are depicted in block form and are the same for all such blocks in FIG. 38. Initially, the receive phase shift vector is changed to H2 (substage $3860_1$), with a guard interval (substage $3860_2$) inserted to compensate for the phase shift latency. For a change in the receive weight vectors, the guard interval is larger than the overall delay spread minus the receive filter delay spread. Then the first channel (Ch1) is measured (substage $3860_3$). After measuring the channel, the receive phase shift vector is changed to H2 (substage $3860_4$), with a guard interval (substage $3860_5$). Then the second channel (Ch2) is measured (substage $3860_6$). This continues until the last channel, ChN, is measured. After all the receive phase shift vectors have been transmitted and the channels estimated, the receive phase shift vectors are calculated and changed. In one embodiment, with four iterations, there are fourteen stages.

Automatic Gain Control

The signal sent during AGC tuning intervals uses the same modulation but carries no information.

The AGC gain should be constant during each channel estimation stage. During each stage, either the transmit or receive weight vectors are changed (sweeping through N columns), which results in RSSI fluctuation. In this case, the AGC is run for all N possible weight vectors, the AGC level is fixed to the minimum obtained value, and then N channel estimations are performed.

Figure 39:
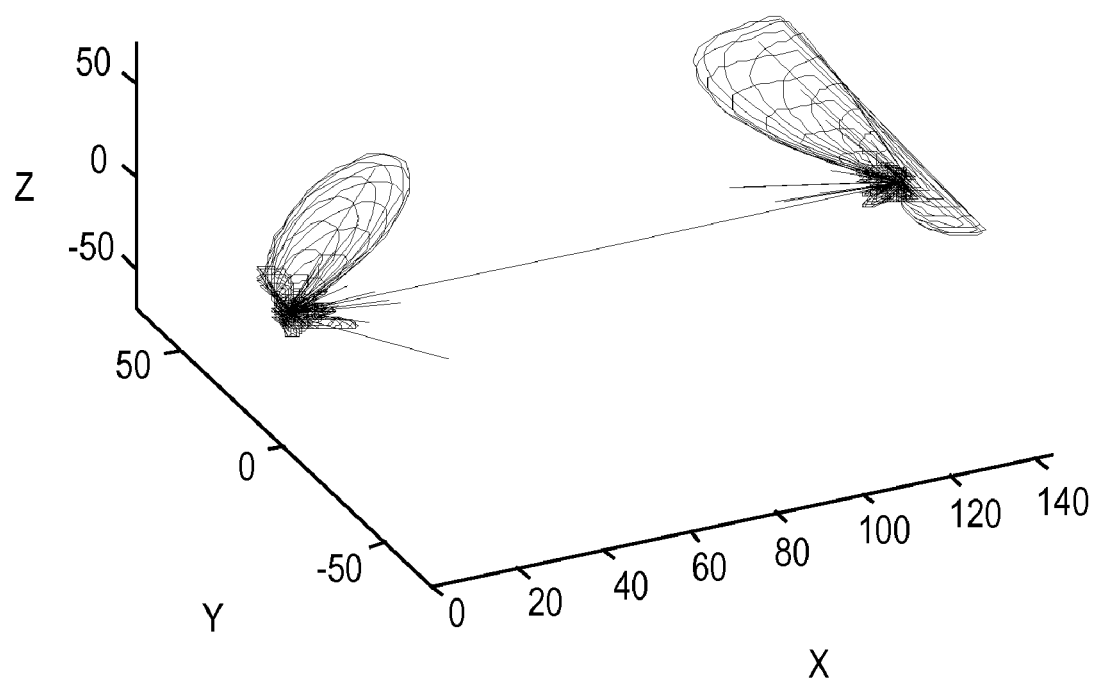
FIG. 39 illustrates a particular beam-forming that resulted from the beam search process of FIG. 38.

FIG. 39 illustrates a particular beam-forming that resulted from the beam search process of FIG. 38.

Figure 40:
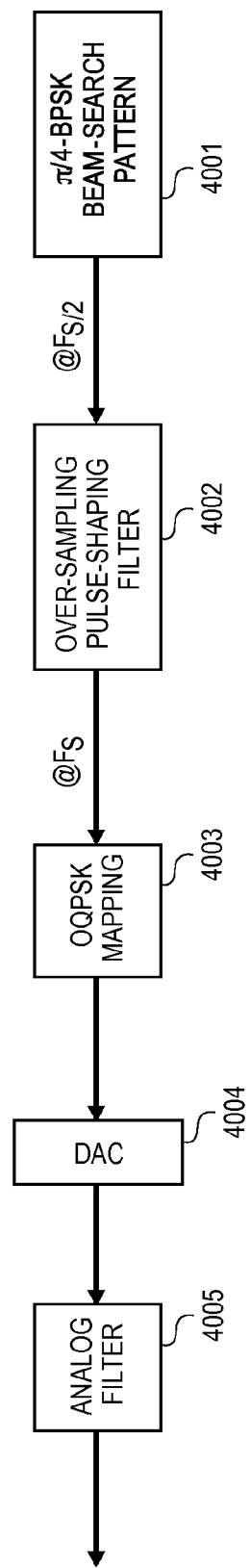
FIG. 40 illustrates one embodiment of a beam search and tracking diagram at the source/transmitter.

FIG. 40 illustrates one embodiment of a beam search and tracking diagram at the source/transmitter. Referring to FIG. 40, a BPSK beam search pattern 4001 is at a frequency of $F_s/2$ is filtered using oversampling coal shaping filter 4002, or produces the beam search pattern to a frequency $f_s$. This pattern is then sent to OQPSK mapping 4003, which maps the BPSK symbols −1 and 1 to complex QPSK symbols −1−j and 1+j respectively, and delays the Q component by half a sample with respect to the I component. The output of OQPSK mapping 4003 is converted to analog using dack 4004 and is then filtered using analog filter 4005 prior to transmission.

An Example of a Beam-Tracking Algorithm

Figure 42:
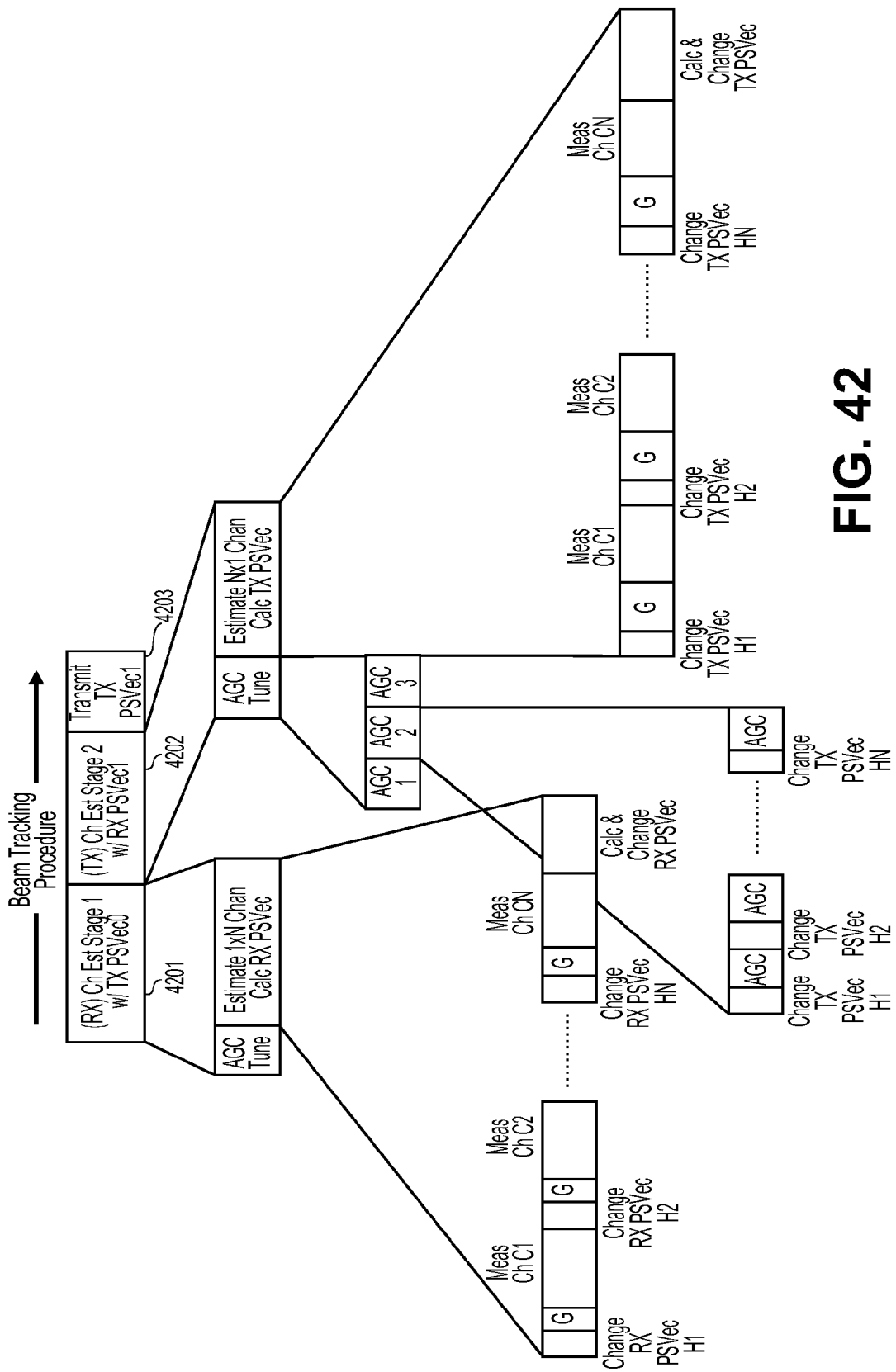
FIG. 42 is a flow diagram of one embodiment of the beam-tracking process.

In one embodiment, the beam-tracking algorithm consists of two iterations of the iterative beam-search process, e.g. the $2^{nd}$ and $3^{rd}$ iterations, described above. FIG. 42 is a flow diagram of one embodiment of the beam-tracking process. Referring to FIG. 42, in the first iteration (shown as block 4201), the transmit phase pattern is set equal to the transmit phase vector corresponding to the current beam (i.e., the transmit phase shifts are set to the current estimates), while the receive phase pattern is swept through N columns of H for the current delay. From this operation, the MRC-based receive quantized phase shift vector is calculated. The calculated quantized phase vector is then used as the fixed receive phase pattern for the second iteration (shown as block 4202), while the transmit phase pattern is swept through N columns of H and the MRC-based transmit quantized phase shift vectors are calculated. In one embodiment, the transmitter phase pattern that produces the strongest received signal at the receiver is repeated more than once during this stage in order to allow the receiver to compensate for various phase inaccuracies inherent to the transmitter and receiver analog circuits. In each iteration, channel transfer functions are estimated for the same time-delay that was derived in the timing-recovery stage of the beam-search process. The transmitter quantized phase vectors calculated in these iterations are then fed back (4203) to be used as the transmit phase patterns. In one embodiment, the index of the weight vector that produces the strongest received signal is additionally fed back to be used during the next beam-tracking instance. Note that blocks 4201 and 4202 are described in more detail in the same manner as FIG. 5 above.

The same AGC procedure as described above in the beam-search process is performed before each iteration in order to ensure that the received signal is neither saturated nor over-attenuated during the ensuing operation. These are shown in FIG. 42, with example AGC tuning for one channel, which is the same as the others, being shown in detail.

Alternative Embodiments of a Beam-Search Algorithm

Figure 43:
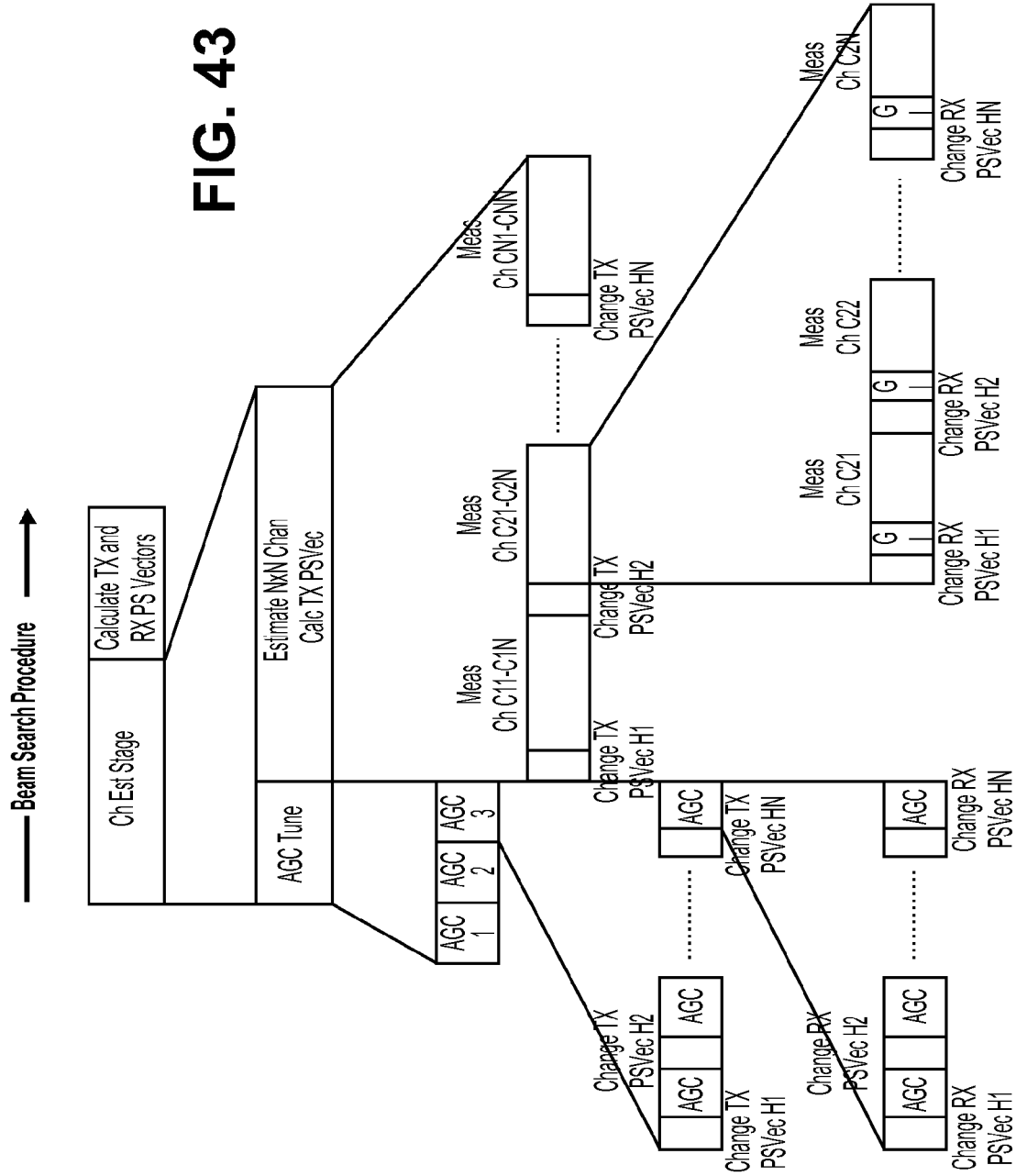
FIG. 43 illustrates a second, alternative embodiment of a beam-search process.

A second, alternative embodiment of a beam-search process is shown in FIG. 43. Referring to FIG. 43, first, a known symbol sequence is transmitted over the air, which is used to estimate the channel. Next, the transmit phase pattern is set equal to N columns of H one at a time. For each such transmit phase pattern, the receive phase pattern is then set equal to N columns of H one at a time, resulting in N×N different transmit and receive phase pattern combination.

Afterwards, in one embodiment, the N×N corresponding SISO channel transfer functions are estimated by matching the received signal with the given symbol sequence at the optimum time-delay (the timing-recovery procedure is similar to the first embodiment of the beam-search process except that all combinations of transmit and receive antenna patterns are used). The N×N estimates are used to form an N×N matrix, Γ. Γ is then multiplied by H and transpose of H as in the following equation:

$$G = H\Gamma H^T$$

where G is the MIMO channel transfer function estimate. The following iteration is then performed for k=1, ..., M:

$$z = \text{conj}(G^T u_{k-1}), v_k = \text{quant}([\angle z_1, \angle z_2, \ldots, \angle z_N])$$

$$w = \text{conj}(G v_{k-1}), u_k = \text{quant}([\angle w_1, \angle w_2, \ldots, \angle w_N])$$

where $u_0$ is the arbitrary initial receive phase pattern.

The above estimation phase is preceded by an AGC procedure similar to the AGC procedure described above. This AGC procedure, which measures the received signal energy for all transmit and phase pattern combinations, and can be repeated a few times as needed, ensures that the received signal is neither saturated nor over-attenuated during the estimation.

Extensions to Adaptive Beam-Steering
Optional Tx Power Control Feedback

Another embodiment of a beam-search LRP feedback payload format includes an optional feedback as illustrated in the following table. In this particular embodiment, there is up to 4 gain steps with nominal gain steps of 5 dB. Gain step code-words in increasing order of gain are 0x0000, 0xFFC0, 0x03FF, and 0xFC3F. No CRC is needed due to large coding gain for gain selection, while phase-shift feedback is used based on overall link quality.

| 16-Bit codeword for Tx Gain Selection | 2 bits reserved | 78 bits BS Tx Antenna Weight Vector Feedback |
|---|---|---|

In one embodiment, Tx gain/power control takes place during the first beam-search feedback, because the first few stages of the beam-search process can tolerate open-loop power control due to lower beam-forming gain.

Optional Support of Magnitude Feedback

In another embodiment, beam search/tracking feedback includes 72-bit antenna weight vector. In a previous embodiment, HRP: (36) 2-bit phase values in 90 degree steps, and LRP: (8) 4-bit phase values in 22.5 degree steps.

In another embodiment, HRP includes 36 2-bit phase values in 90 degree steps (mandatory), 24 3-bit phase values in 45 degree steps (optional), 18 4-bit phase values in 22.5 degree steps (optional), or 12 3-bit phase values in 45 deg steps and 3-bit magnitude values (optional). LRP includes 8 mandatory 4-bit phase values in 22.5 deg steps and optional 5-bit magnitude values.

These optional feedback methods with magnitude information could be used to support other antenna configurations such as switched antenna modes such as sectorized antennas. These switched antenna modes could be used by the transmitter by enabling or selecting the antenna(s) with the greatest magnitude and disabling the other antennas. Note that if there are a fewer number of antennas, more information bits per antenna can be used without substantial increase in complexity.

Optional Support of Up to 64 Independent Tx Elements

In one embodiment, up to 64 independent transmitter antenna elements (vs. mandatory mode w/up to 36) can be supported. The use of optional 64-element mode incurs more overhead. Duration of feedback also increases as 128 bits weight vector information is transmitted back instead of 72 bits. Various feedback modes described herein support ranging from (64) 2-bit phases to higher accuracy for fewer elements.

Beam-Search LRP Feedback Packets

During Beam Search, the beam-forming receiver derives optimum transmitter AWV information during the transmitter AWV training stages 3, 6, 9, and 12 (for HRP Beam-Search only). This information is then sent back to the beam-forming transmitter using LRP packets during the stages 4, 7, 10, and 13 (for HRP Beam-Search only), where the Stage 4 feedback is carried over an omni-directional LRP packet, while the rest are sent using directional LRP packets.

For the HRP Beam-Search, the feedback information consists of a 78-bit Tx AWV feedback field, which is comprised of a 72-bit Antenna Weight Vector (AWV) field, followed by a 6-bit Tx AWV Index field. Based on the capabilities of the beam-forming transmitter, which are sent to the beam-forming receiver a priori, the 72-bit AWV field complies with one of the following four formats:

Format P2: (Mandatory) A sequence of thirty-six 2-bit-valued phases, where each 2-bit phase value represents 90 degree phase increments according to the following gray-coded mapping:

TABLE 35

| 2-bit binary representation of phase values | |
|---|---|
| Binary Representation | Phase Value (Degrees) |
| 00 | 0 |
| 01 | 90 |
| 11 | 180 |
| 10 | 270 |

Format P3: (Optional) A sequence of twenty-four 3-bit-valued phases, where each 3-bit phase value represents 45 degree phase increments according to the following gray-coded mapping:

TABLE 36

3-bit binary representation of phase values

| Binary Representation | Phase Value (Degrees) |
|---|---|
| 000 | 0 |
| 001 | 45 |
| 011 | 90 |
| 010 | 135 |
| 110 | 180 |
| 111 | 225 |
| 101 | 270 |
| 100 | 315 |

Format P4: (Optional) A sequence of eighteen 4-bit-valued phases, where each 4-bit phase value represents 22.5 degree phase increments according to the following gray-coded mapping:

TABLE 37

4-bit binary representation of phase values

| Binary Representation | Phase Value (Degrees) |
|---|---|
| 0000 | 0 |
| 0001 | 22.5 |
| 0011 | 45 |
| 0010 | 67.5 |
| 0110 | 90 |
| 0111 | 112.5 |
| 0101 | 135 |
| 0100 | 157.5 |
| 1100 | 180 |
| 1101 | 202.5 |
| 1111 | 225 |
| 1110 | 247.5 |
| 1010 | 270 |
| 1011 | 292.5 |
| 1001 | 315 |
| 1000 | 337.5 |

Format P3M3: (Optional) A sequence of twelve 6-bit-valued phase & magnitude codewords, where each 6-bit code word is comprised of a gray-coded 3-bit phase value as defined in Table 36, followed by a gray-coded 3-bit magnitude codeword defined in the following Table:

TABLE 38

3-bit binary representation of magnitude values

| Binary Representation | Magnitude Ratio (w.r.t max. magnitude) |
|---|---|
| 000 | 1 |
| 001 | 0.875 |
| 011 | 0.75 |
| 010 | 0.625 |

TABLE 38-continued 3-bit binary representation of magnitude values

| Binary Representation | Magnitude Ratio (w.r.t max. magnitude) |
|---|---|
| 110 | 0.5 |
| 111 | 0.33 |
| 101 | 0.17 |
| 100 | 0 |

In one embodiment, the 6-bit Tx AWV Index field includes the index of the optimally received Tx AWV during the previous stage. This index is between 0 and N−1, where maximum N is 36.

In one embodiment, all devices support the P2 format. In addition, beam forming receivers can optionally support P3, P4, and P3M3 formats as indicated in the PHY capability bits. Beam forming transmitters request a desired Tx AWV feedback format that is supported by the receiver as indicated in the PHY capability bits. If the transmitter requests a format that the receiver does not support, the receiver signals back using the P2 format.

For the LRP Beam-Search, the feedback information also consists of a 78-bit Tx AWV feedback field, which is comprised of a 72-bit Antenna Weight Vector (AWV) field, followed by a 6-bit Tx AWV Index field. Based on the capabilities of the beam-forming transmitter, which is sent to the beam-forming receiver a priori, the 72-bit AWV field complies with the following format:

Format P4M5: A sequence of eight 9-bit-valued phase & magnitude codewords, where each 9-bit code word is comprised of a gray-coded 4-bit phase value as defined in Table 37, followed by a gray-coded 5-bit magnitude codeword corresponding to magnitude ratio decrements of 0.03125 starting with magnitude ratio of 1.

In one embodiment, the phase information feedback is mandatory, while the magnitude information feedback is optional. In one embodiment, if no magnitude information is available to be fed back, the last 5 bits of each codeword are set to the magnitude ratio 00000 code indicating magnitude of 1 for all antenna elements. The ability of the receiver to feed back LRP magnitude information is indicated in the PHY capability bits.

In one embodiment, the 6-bit Tx AWV Index field includes the index of the optimally received Tx AWV during the previous stage. This index is between 0 and 7.

In one embodiment, the phase values are transmitted over the ACK packet in the ascending order of the transmitter antenna indices, where the indices are from 1 to maximum 36 for HRP, and 1 to 8 for LRP. This is equivalent to saying that the phase value corresponding to the antenna index 1 is transmitted first and so on. It is assumed that the transmitter antenna with index k corresponds to the k-th row of the transfer matrix HH, or LH.

Details of the LRP feedback packets for HRP and LRP Beam-Search procedures are summarized in Table 39:

TABLE 39

Beam search LRP feedback parameters

| BS Feedback Stage No. | LRP Packet Type | Data-Rate/ Coding-Rate | No. Data Bytes | No. Payload + PHY Header Symbols |
|---|---|---|---|---|
| HRP BS Stage 4 | Omni-directional w. Short Preamble | 3.75 Mbps/1/2 | 12 | 9 |
| HRP BS Stages 7, 10, 13 | Directional | 5 Mbps/2/3 | 12 (incl. CRC) | 6 |

The payload of the first omni-directional Beam-Search feedback has the following format:

| 16-bit Codeword for Tx Gain Selection (Optional) | 2 bits Reserved | 72 Bits Tx AWV | 6 Bits Tx AWV Index |
| --- | --- | --- | --- |

As an option, in one embodiment, 16 Tx gain selection bits are used for coarse (focused) transmit power control through mechanisms including selecting different number of transmit antennas and adjusting the transmit output power per antenna based on the received signal strength during the first 3 Beam Search stages.

In one embodiment, beam forming transmitter optionally supports up to 4 different beam-forming (focused) transmit power settings where each two supported successive gain steps are nominally 5 dB apart. In one embodiment, these 4 gain levels (g, g+5, g+10, and g+15) are represented by 16-bit codewords 0x0000, 0xFFC0, 0x03FF, and 0xFC3F, respectively, and the 16-bit Tx Gain Selection field are set to one of these 4 codewords corresponding to the desired gain setting. If a beam forming receiver does not support the optional Tx gain selection feature, it sends the 0x0000 codeword.

Support of coarse (focusted) transmit power control feedback is indicated by the PHY capability bits.

In one embodiment, the payload of the other directional Beam-Search feedbacks has the following format:

| 6 bits Reserved | 72 Bits Tx AWV Feedback | 6 Bits Tx AWV Index | 12 bits CRC |
| --- | --- | --- | --- |

Finally, note that in one embodiment all LRP feedback packets are preceded and followed by SIFS intervals of 640 LRP samples, which separate them from the Beam-Search training sequences.

Beam-Tracking Feedback Using LRP ACK Packets

After the second stage of Beam-Tracking, the beam-forming receiver needs to send back the derived transmitter AWV feedback information to the beam-forming transmitter. This information is comprised of the same 72-bit Antenna Weight Vector (AWV) field, followed by a 6-bit Tx AWV Index field, as the Beam-Search feedback. In one embodiment, the 72-bit AWV field complies with one of the four P2, P3, P4, or P3M3 formats for HRP Beam Tracking, and P4M5 format for LRP Beam Tracking, as described herein. In one embodiment, the P2 and P4M5 formats are mandatory (partially mandatory in case of P4M5), while others are optional.

The details of the corresponding ACK packets are summarized in Table 40:

The payload of the directional Beam-Tracking feedbacks has the following format:

| 6 bits Imm-ACK Payload (BS Req + ACK Field) | 4 bits for Fast Link Adaptation | 72 Bits Tx AWV Feedback | 6 Bits Tx AWV Index | 12 bits CRC |
| --- | --- | --- | --- | --- |

The reserved bits can be used to signal link adaptation. The 4 bits signify the desired data mode index directly, where 1111 means no rate adaptation.

Note that, in one embodiment, the PHY header of the Beam-Tracking feedback packets the payload length as 12 Bytes (96 bits), however, in one embodiment, the payload uses all available 100 bits over 5 Directional LRP OFDM symbols at 5 Mbps rate.

Similar to other ACK packets, the ACK packet carrying the Beam-Tracking feedback information is also preceded and followed by SIFS intervals of 640 LRP samples.

Extended HRP Beam-Forming Framework

In an embodiment, up to 36 independently controllable Tx antennas are supported. Thus, more Tx antennas can be used, though the additional antennas' control information must be derived from the 36-antenna feedback. Additionally, existing preambles and design do not limit the number of Rx antennas. This extension allows for up to 64 independently controllable Tx antennas, where the larger number of antennas allow for a larger beam-forming gain. The extended HRP beam-forming uses the same general framework that is described in above, and is similarly comprised of Beam Search and Beam Tracking stages. In one embodiment, a similar state machine is used for the Beam-Search with fewer numbers of iterations/stages in order to reduce beam-search time (resulting in slight decrease in coverage performance).

Extended HRP Beam-Search

Figure 26:
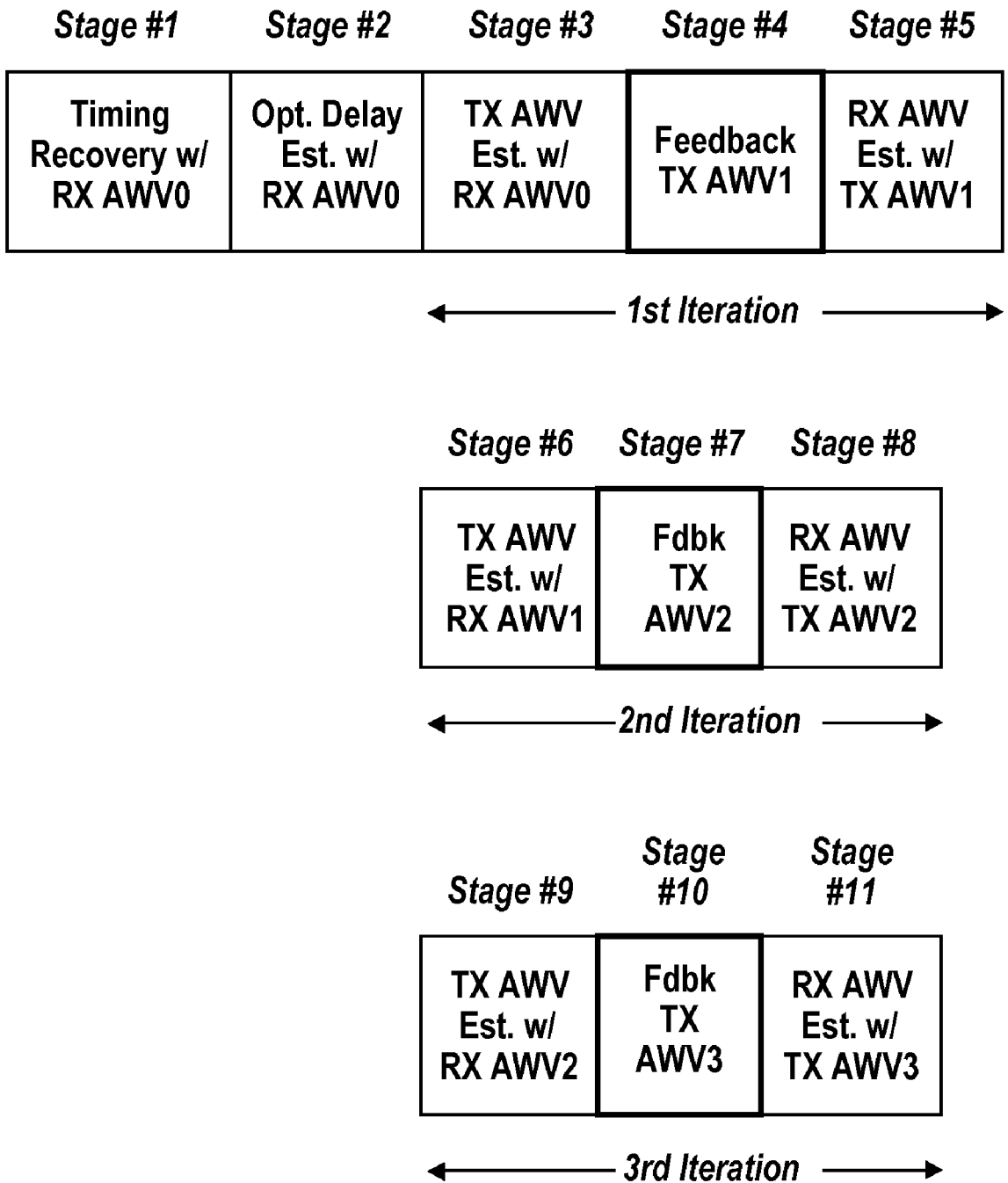
FIG. 26 is a block diagram of one embodiment of extended HRP Beam-Search stages.
Figure 27:
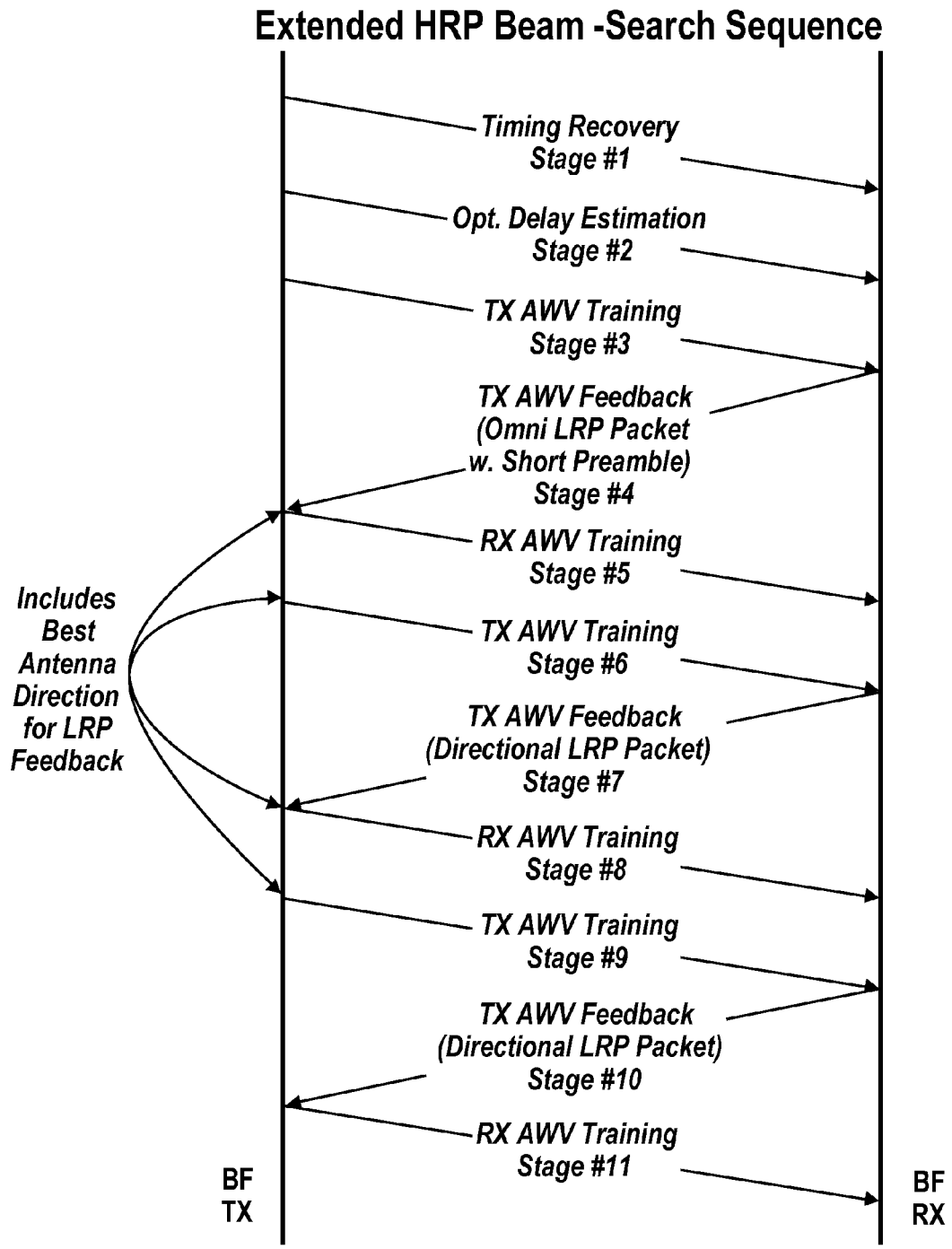
FIG. 27 is a ladder diagram of one embodiment of a sequence of extended HRP beam-search.

Extended HRP Beam Search process consists of the Timing Recovery, Delay Estimation, Tx AWV Training, Tx AWV Feedback, and Rx AWV Training stages. During the Timing Recovery, Delay Estimation, and Tx AWV Training stages, the transmit antenna weight vector (AWV) switches between 64 different weight vectors instead of 36 weight vectors. Furthermore, the Tx AWV Training, Tx AWV Feedback, and Rx AWV Training stages are repeated 3 times instead of 4. The Tx AWV feedback corresponds to up to 64 antenna, or antenna array, elements. FIGS. 26 and 27 show the beam-search stages and sequence of events. In one embodiment, the complete Extended HRP Beam-Search takes 1603504 HRP samples at 2.508 GHz sampling rate, which is around 639.4 μsec.

TABLE 40

| Beam tracking feedback parameters | | | | |
| --- | --- | --- | --- | --- |
| | Feedback LRP Packet Type | Data-Rate/ Coding-Rate | No. Data Bits | No. Payload + PHY Header Symbols |
| HRP Beam-Tracking | ACK w. Payload (Directional) | 5 Mbps/2/3 | 100 (incl. ARQ, BS-Req, and CRC) | 6 |

Due to increase in beam-forming gain, the single antenna SNR is assumed to be less by an average of (N'/N)3, where N' is the increased number of antennas (64) and N=36.

Delay Estimation and first Tx AWV Estimation stages increase in length by approximately (N'/N)3 (actual increase in length is smaller due to common overhead).

Other Tx and Rx AWV Estimation stages increase in length by approximately $(N'/N)^2$ to (N'/N) for later stages when beam-search converges (actual increase in length is smaller due to common overhead).

Duration of feedback would also increase as more phase shift values need to be fed back, where increase is less than N'/N due to significant overhead.

Extended HRP Beam-Search State Machines

Similar to regular HRP Beam Search if an extended HRP Beam-Search event is performed in place of regular HRP packets, in one embodiment, the beam-forming transmitter starts Beam-Search sequence 23040 HRP samples at 2.508 GHz sampling rate, or around 9.2 μsec, after the nominal start of the HRP packet. In this case, the overall Beam-Search period will be less than three HRP Inter-Packet Periods (IPPs).

Extended HRP Beam-Tracking

The extended HRP Beam Tracking process is specified to be the same as the regular HRP Beam Tracking process in terms of number of stages, state transitions and sequence of events, and duration and format of the Beam Tracking training sequences.

This means that for each instance of extended HRP Beam Tracking, the corresponding Tx AWV Training stage uses only 36 different weight vectors similar to the regular HRP Beam Tracking. Subsequently, two (2) extended HRP Beam Tracking instances will be used to track up to 64 antenna weights based on the following protocol:

The up to 64 antenna weights are divided into 2 groups of up to 32 antenna weights each.

During the (2k)-th beam tracking instance the first set of antenna weights are tracked while the second set is kept constant at their current values.

During the (2k+1)-th beam tracking instance the second set of antenna weights are tracked while the first set is kept constant at their current values.

The 32 transmitter antenna weights that are estimated in the Tx AWV Training stages are sent back to the beam-forming transmitter as payload of the subsequent ACK, a directional LRP packet described herein.

The two stages of extended HRP Beam-Tracking take 55936 HRP samples at 2.508 GHz sampling rate, or around 22.3 μsec, the same as the regular Beam Tracking duration.

The extended HRP Beam-Tracking sequences are transmitted at regular intervals every P Inter-Packet Periods (IPPs), where P is a programmable constant. This means that tracking of all of the antenna weights, or in other words the complete extended HRP Beam Tracking, will take place once every 2P IPPs.

Extended HRP Beam-Search and Beam-Tracking Training Sequences

In one embodiment, the Pseudo-Random Noise (PRN) training sequences that are transmitted during the extended HRP Beam-Search and Beam-Tracking stages are defined in the same way as those defined for the regular HRP Beam-Search and Beam-Tracking stages. During the extended HRP Beam Search stages 1, 2, 3, 6, and 9, i.e. the Timing Recovery, Delay Estimation, and Tx AWV Training stages, the transmitter AWVs are derived from the columns of the 64×64 Hadamard transfer matrix, EE, where the (i, j)-th element of the matrix EE is defined by the following equation:

$$EE(i,j)=N_1(\&(i,j)) \text{ for } i,j=0, 1, \ldots, 63$$

where &(i, j) is the bitwise AND of the (6-bit) binary representations of i and j, and $N_1(x)$ is equal to 1 if the 6-bit binary representation of x has even number of 1 s, and is equal to −1 otherwise.

In one embodiment, if there are N transmit antenna, or antenna array, elements, where N<=64, the phase vectors are comprised of the first N elements of columns of EE.

On the other hand, the same 36×36 Hadamard transfer matrix, HH, is used for the $2^{nd}$ extended HRP Beam Tracking (Tx AWV Training) stage.

Extended HRP Beam-Search Stage 1 (Timing Recovery) Training Sequence

In one embodiment, the PRN training sequence of the (1st) extended HRP Beam-Search Timing Recovery stage is the same PN chip sequence used for the (1st) regular HRP Beam-Search Timing Recovery stage.

Extended HRP Beam-Search Stage 2 (Delay Estimation) Training Sequence

Figure 28:
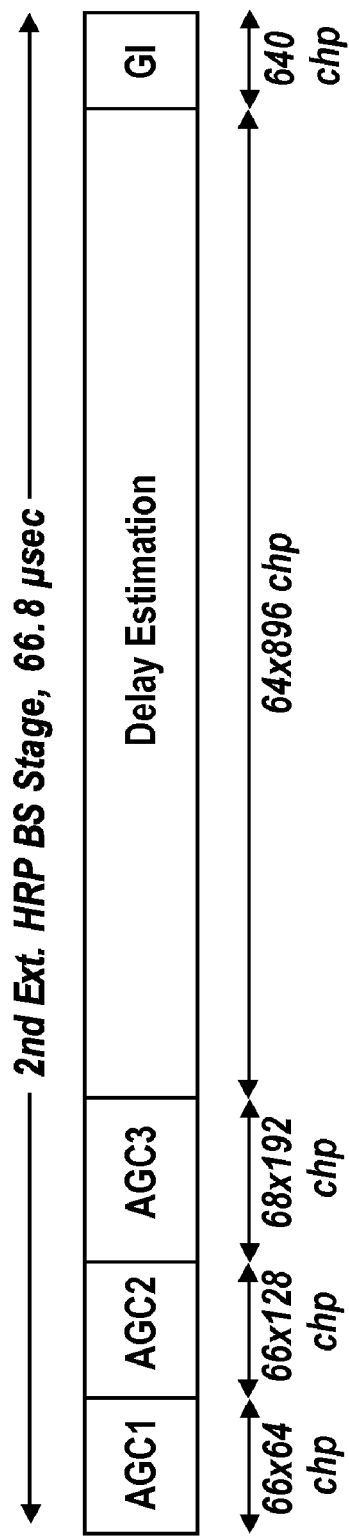
FIG. 28 is a block diagram of one embodiment of extended HRP Beam-Search stage 2.
Figure 44:
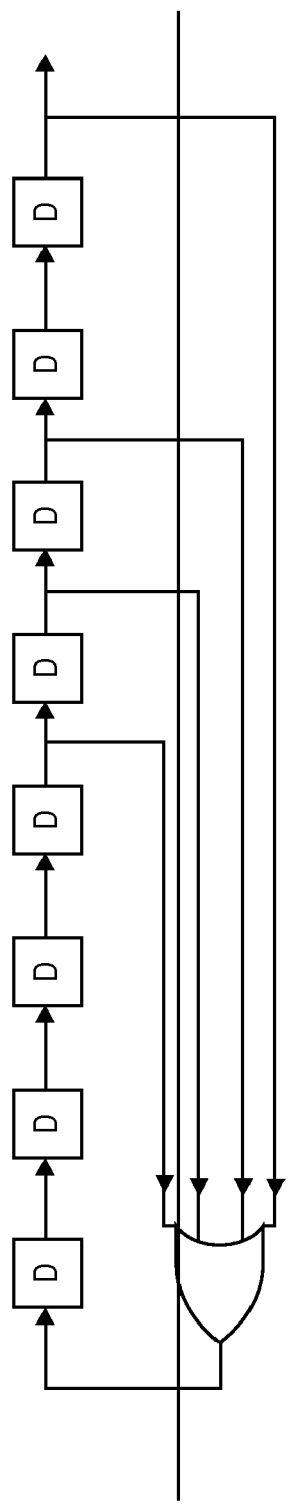
FIG. 44 illustrates one embodiment of an LFSR for generating an $8^{th}$-order M-sequence.

FIG. 28 illustrates an extended HRP beam search stage 2. The PRN training sequence of the ($2^{nd}$) extended HRP Beam-Search Delay Estimation stage is constructed by repeating the 8th-order 255-sample M-sequence generated by the polynomial $x^8+x^6+x^5+x^4+1$ for 83712 chips (the last repetition is terminated after 72 chips). FIG. 44 shows the LFSR that generates this M-sequence, where, in one embodiment, the seed is set equal to 10011011 with LSB representing the last register.

The stage 2 training sequence is divided into 5 fields as shown in FIG. 28. In one embodiment, the transmitter AWV is changed over AGC1, AGC2, AGC3, and the Delay Estimation fields every 64, 128, 192, and 896 chips, respectively, where, the k-th phase vector is set equal to EE(i) with i=mod (k−1, 64)+1.

In one embodiment, the transmitter AWV is arbitrary over the Guard-Interval (GI).

Extended HRP Beam-Search Stage 3 (Tx AWV Estimation) Training Sequence

Figure 29:
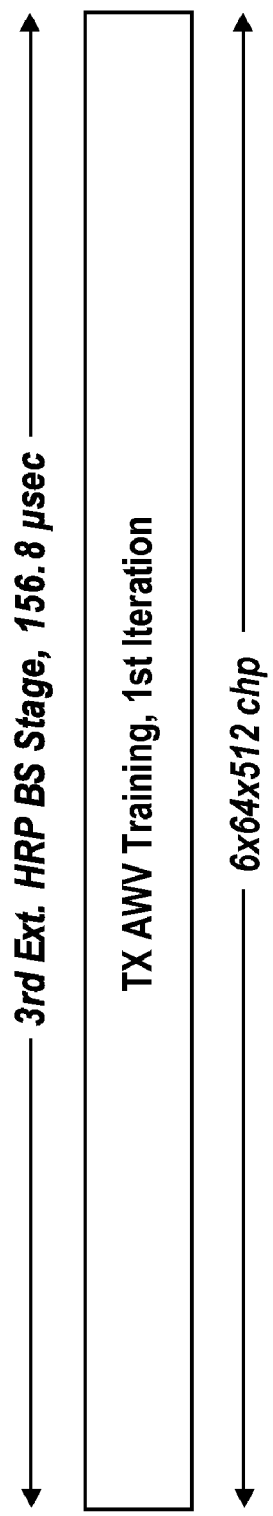
FIG. 29 is a block diagram of one embodiment of extended HRP Beam-Search stage 3.

The PRN training sequence of the extended HRP Beam-Search stage 3 is constructed by repeating the 255-sample M-sequence for 196608 chips (the last repetition is terminated after 3 chips). The stage 3 training sequence is comprised of one field as shown in FIG. 29. The transmitter AWV is changed over the Tx AWV Estimation field every 512 chips.

Figure 30:
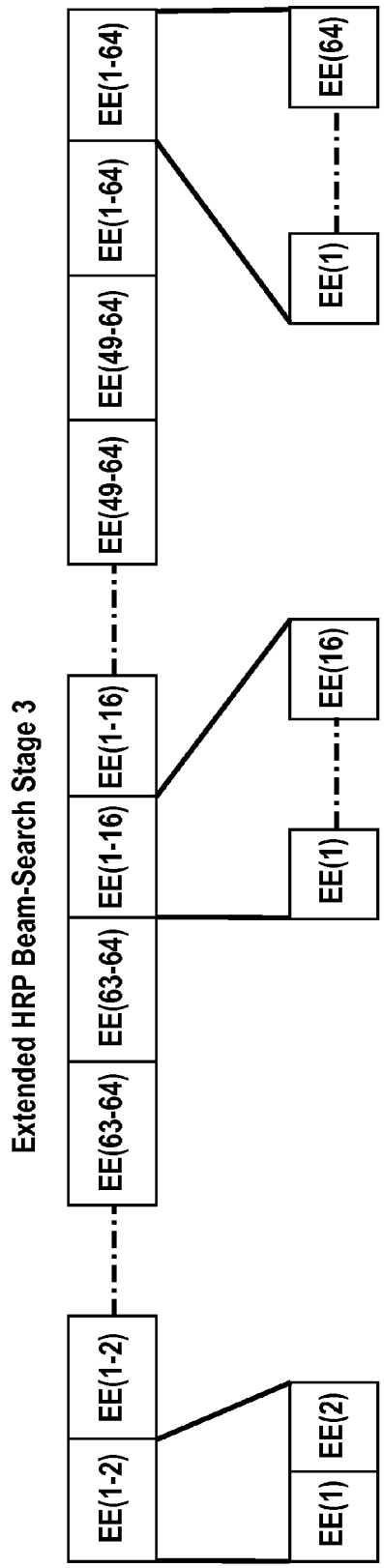
FIG. 30 is a block diagram of one embodiment of a phase vector order for extended HRP Beam-Search stage 3.

During the Stage 3, the transmitter AWV is set equal to 384 EE(k) phase vectors in the order shown in FIG. 30, which allows the receiver to correct for small residual frequency offset and timing drift.

Extended HRP Beam-Search Stage 5 (Rx AWV Estimation) Training Sequence

Figure 31:
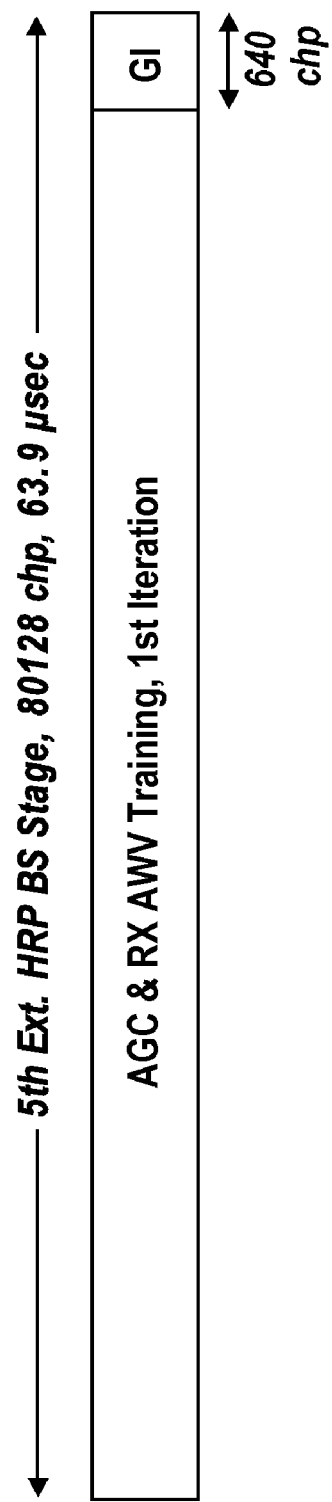
FIG. 31 is a block diagram of one embodiment of extended HRP Beam-Search stage 5.

The PRN training sequence of the extended HRP Beam-Search stage 5 is constructed by repeating the 255-sample M-sequence for 80128 chips (the last repetition is terminated after 58 chips), where the last 640 chips are Guard-Interval as shown in FIG. 31. The transmitter AWV is constant during the stage 5 except for the Guard Interval (GI), and is set equal to the phase vector fed back in Stage 4. The transmitter AWV is arbitrary over the Guard-Interval.

In one embodiment, the Stage 5 training sequence also carries the 3-bit index of the optimum (best) antenna direction for the Stage 7 directional LRP feedback packet, where the index is estimated while receiving the Stage 4 omni-directional LRP feedback packet. These 3 bits, denoted as $b_0$, $b_1$, and $b_2$, are differentially coded into the following 4 sign values:

$s_1=1,$ $s_2=2b_0-1,$ $s_3=(2b_0-1)(2b_1-1),$ $s_4=(2b_0-1)(2b_1 1)(2b_2-1)$

The last four 640-chip sequences of the Stage 5 training sequence before the GI are then multiplied by the above signs respectively.

Extended HRP Beam-Search Stage 6 (Tx AWV Estimation) Training Sequence

Figure 32:
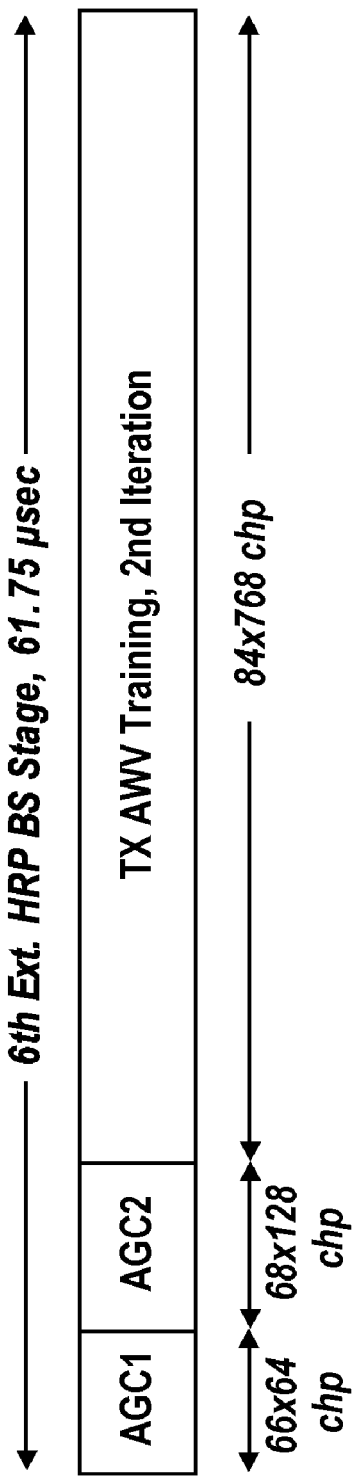
FIG. 32 is a block diagram of one embodiment of extended HRP Beam-Search stage 6.

The PRN training sequence of the extended HRP Beam-Search stage 6 is constructed by repeating the 255-sample M-sequence for 77440 chips (the last repetition is terminated after 175 chips). The stage 6 training sequence is comprised of 3 fields as shown in FIG. 32. The transmitter AWV is changed over the AGC1, AGC2, and Tx AWV Estimation fields every 64, 128, and 768 chips, respectively.

Figure 33:
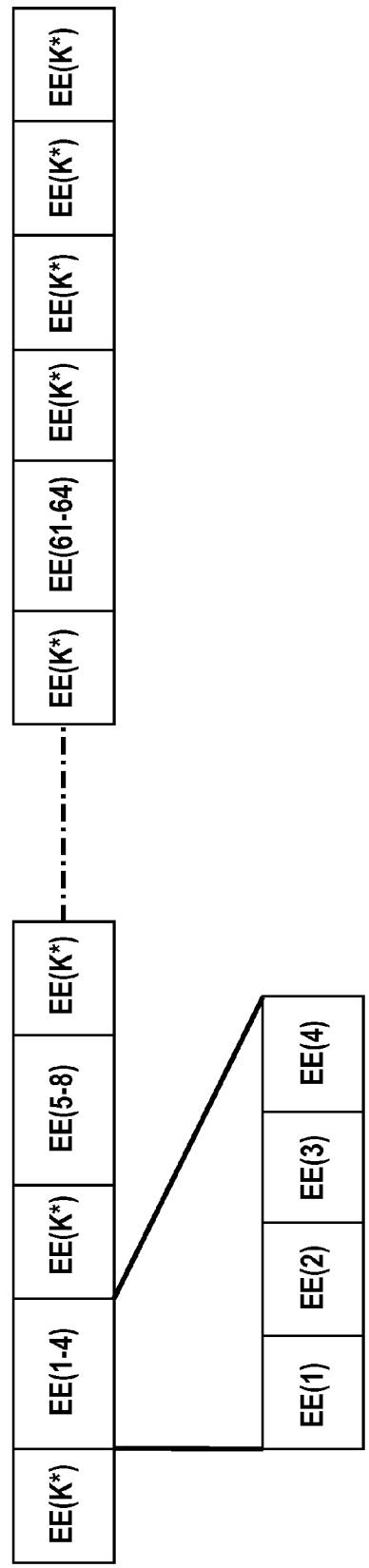
FIG. 33 is a block diagram of one embodiment of a phase vector order for extended HRP Beam-Search stages 6, 9, and 12.

During the Stage 6, the transmitter AWV is set equal to 84 EE(k) phase vectors in the order shown in FIG. 32, where K* refers to index of the optimum (best) received transmitter AWV during Stage 3, which is fed back in Stage 4. Insertion of the optimum transmitter AWV within the sequence of 64 transmitter AWVs, as shown in FIG. 33, allows the receiver to correct for small residual frequency offset and timing drift. In one embodiment, the same phase vector order is also used in Stage 9.

In one embodiment, the Stage 6 training sequence also carries the 3-bit index of the optimum (best) antenna direction for the Stage 7 feedback directional LRP packet, where the index is estimated while receiving the Stage 4 omni-directional LRP feedback packet. These 3 bits are differentially coded into 4 sign values, with the last four 768-chip sequences of the Stage 6 training sequence being multiplied by these signs respectively.

Extended HRP Beam-Search Stage 8 and 11 (Rx AWV Estimation) Training Sequences

Figure 34:
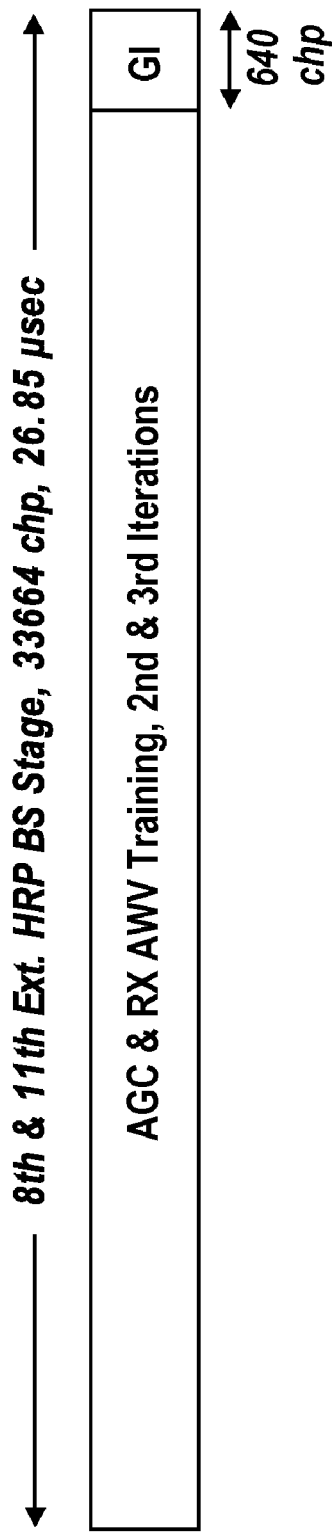
FIG. 34 is a block diagram of one embodiment of extended HRP Beam-Search stages 8 and 11.

The PRN training sequence of the extended HRP Beam-Search stages 8 and 11 is constructed by repeating the 255-sample M-sequence for 33664 chips (the last repetition is terminated after 4 chips), where the last 640 chips are Guard-Interval as shown in FIG. 34. In one embodiment, the transmitter AWV is constant during the stages 8 and 11 except for the Guard Interval (GI), and is set equal to the phase vector fed back in Stage 7 if that feedback is reliable, or earlier feedback values otherwise. The transmitter AWV is arbitrary over the Guard-Interval.

The Stage 8 training sequence also carries the 3-bit index of the optimum (best) antenna direction for the Stage 10 directional LRP feedback packet, where the index is estimated while receiving the Stage 4 omni-directional LRP feedback packet. These 3 bits are differentially coded into 4 sign values as specified above in relation to Extended HRP Beam-Search Stage 5, with the last four 384-chip sequences of the Stage 8 training sequence before the GI being multiplied by these signs respectively.

Extended HRP Beam-Search Stage 9 (Tx AWV Estimation) Training Sequence

Figure 35:
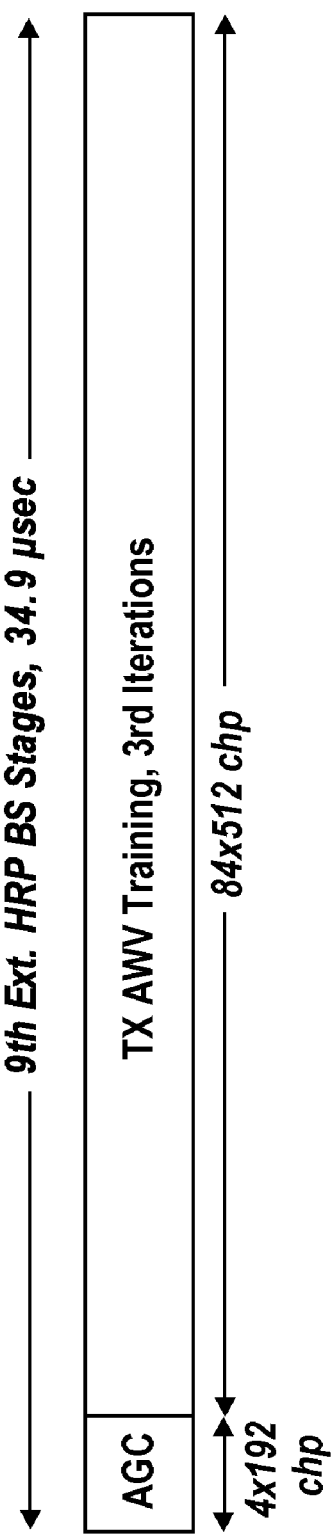
FIG. 35 is a block diagram of one embodiment of extended HRP Beam-Search stages 9 and 12.
Figure 36:
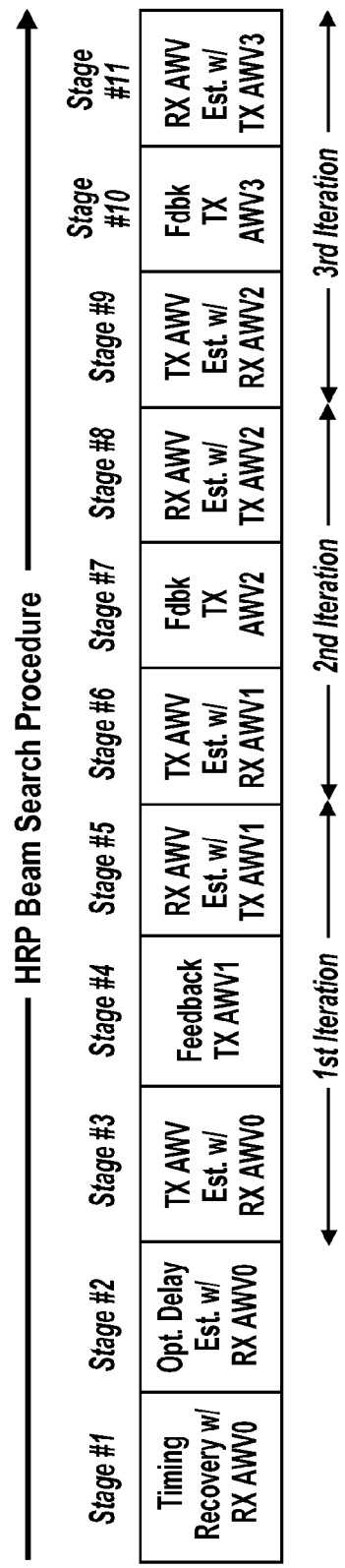
FIG. 36 is a block diagram of one embodiment of a HRP beam search procedure.

The PRN training sequence of the extended HRP Beam-Search stage 9 are constructed by repeating the 255-sample M-sequence for 43776 chips (the last repetition is terminated after 171 chips). The stage 9 training sequence is comprised of 2 fields as shown in FIG. 35. The transmitter AWV is changed over the AGC, and Tx AWV Estimation fields every 192, and 512 chips, respectively.

During Stage 9, the transmitter AWV is set equal to 84 EE(k) phase vectors in the order shown in FIG. 33.

In one embodiment, the Stage 9 training sequence also carries the 3-bit index of the optimum (best) antenna direction for the Stage 10 directional LRP feedback packet, where the index is estimated while receiving the Stage 4 omni-directional LRP feedback packet. These 3 bits are differentially coded into 4 sign values, with the last four 512-chip sequences of the Stage 9 training sequence being multiplied by these signs respectively.

Extended HRP Beam-Tracking Stage 1 (Rx AWV Estimation) Training Sequence

The PRN training sequence of the first stage of the extended HRP Beam-Tracking is the same PN chip sequence used for the first stage of the regular HRP Beam-Tracking.

Extended HRP Beam-Tracking Stage 2 (Tx AWV Estimation) Training Sequence

The PRN training sequence of the second stage of the extended HRP Beam-Tracking is the same PN chip sequence used for the second stage of the regular HRP Beam-Tracking.

Beam-Search LRP Feedback Packets

During the extended HRP Beam Search, the beam-forming receiver derives optimum transmitter AWV information during the transmitter AWV training stages 3, 6, and 9. This information is then sent back to the beam-forming transmitter using LRP packets during the stages 4, 7, and 10, where the Stage 4 feedback is carried over an omni-directional LRP packet, while the rest are sent using directional LRP packets.

For the HRP Beam-Search, the feedback information consists of a 134-bit Tx AWV feedback field, which is comprised of a 128-bit Antenna Weight Vector (AWV) field, followed by a 6-bit Tx AWV Index field. In one embodiment, based on the capabilities of the beam-forming transmitter, which is sent to the beam-forming receiver a priori, the 128-bit AWV field complies with one of the following four formats:

Format EP2: A sequence of sixty-four 2-bit-valued phases, where each 2-bit phase value represents 90 degree phase increments according to the gray-coded mapping defined in Table 35.

Format EP4: A sequence of thirty-two 4-bit-valued phases, where each 4-bit phase value represents 22.5 degree phase increments according to the gray-coded mapping defined in Table 37.

Format EP2M2: A sequence of thirty-two 4-bit-valued phase & magnitude codewords, where each 4-bit code word is comprised of a gray-coded 2-bit phase value as defined in Table 35, followed by a gray-coded 2-bit magnitude codeword defined in the following Table:

TABLE 41

2-bit binary representation of magnitude values

| Binary Representation | Magnitude Ratio (w.r.t max. magnitude) |
|---|---|
| 00 | 1 |
| 01 | 0.67 |
| 11 | 0.33 |
| 10 | 0 |

Format EP4M4: A sequence of sixteen 8-bit-valued phase & magnitude codewords, where each 8-bit code word is comprised of a gray-coded 4-bit phase value as defined in Table 37, followed by a gray-coded 4-bit magnitude codeword defined in the following Table:

TABLE 42

4-bit binary representation of magnitude values

| Binary Representation | Magnitude Ratio (w.r.t max. magnitude) |
|---|---|
| 0000 | 1 |
| 0001 | 0.9375 |
| 0011 | 0.875 |
| 0010 | 0.8125 |
| 0110 | 0.75 |
| 0111 | 0.6875 |
| 0101 | 0.625 |
| 0100 | 0.5625 |
| 1100 | 0.5 |
| 1101 | 0.4375 |
| 1111 | 0.375 |
| 1110 | 0.3125 |
| 1010 | 0.25 |
| 1011 | 0.17 |
| 1001 | 0.08 |
| 1000 | 0 |

In one embodiment, the 6-bit Tx AWV Index field includes the index of the optimally received Tx AWV during the previous stage. In one embodiment, this index is between 0 and N−1, where maximum N is 36.

In one embodiment, beam forming receivers that support the optional extended HRP beam forming, support the EP2 format, and can optionally support EP4, EP2M2, and EP4M4 formats as indicated in the PHY capability bits. In one embodiment, beam forming transmitters that support the optional extended HRP beam forming requests a desired Tx AWV feedback format that is supported by the receiver as indicated in the PHY capability bits. If the transmitter requests a format that the receiver does not support, the receiver signals back using the EP2 format.

The phase values are transmitted over the ACK packet in the ascending order of the transmitter antenna indices, where the indices are from 1 to maximum 64. This is equivalent to saying that the phase value corresponding to the antenna index 1 is transmitted first and so on. It is assumed that the transmitter antenna with index k corresponds to the k-th row of the Hadamard transfer matrix EE.

Details of the LRP feedback packets for Extended HRP Beam-Search procedure are summarized in Table 43:

TABLE 43

Extended HRP Beam search LRP feedback parameters

| BS Feedback Stage No. | LRP Packet Type | Data-Rate/ Coding-Rate | No. Data Bytes | No. Payload + PHY Header Symbols |
|---|---|---|---|---|
| E-HRP BS Stage 4 | Omni-directional w. Short Preamble | 3.75 Mbps/1/2 | 19 | 13 |
| E-HRP BS Stages 7, 10, 13 | Directional | 5 Mbps/2/3 | 19 (incl. CRC) | 9 |

In one embodiment, the payload of the first omni-directional Beam-Search feedback has the following format:

| 16-bit Codeword for Tx Gain Selection (Optional) | 2 bits Reserved | 128 Bits Tx AWV Feedback | 6 Bits Tx AWV Index |
|---|---|---|---|

In one embodiment, as an option, 16 Tx gain selection bits are used for coarse (focused) transmit power control through mechanisms including selecting different number of transmit antennas and adjusting the transmit output power per antenna based on the received signal strength during the first 3 Beam Search stages.

In one embodiment, beam forming transmitter optionally supports up to 4 different beam-forming (focused) transmit power settings where each two supported successive gain steps are nominally 5 dB apart. In one embodiment, these 4 gain levels (g, g+5, g+10, and g+15) are represented by 16-bit codewords 0x0000, 0xFFC0, 0x03FF, and 0xFC3F, respectively, and the 16-bit Tx Gain Selection field is set to one of these 4 codewords corresponding to the desired gain setting. In one embodiment, if a beam forming receiver does not support the optional Tx gain selection feature, it always sends the 0x0000 codeword.

Support of coarse (focused) transmit power control feedback is indicated by the PHY capability bits.

In one embodiment, the payload of the other directional Beam-Search feedbacks has the following format:

| 6 bits Reserved | 128 Bits Tx AWV Feedback | 6 Bits Tx AWV Index | 12 bits CRC |
|---|---|---|---|

In one embodiment, all LRP feedback packets are preceded and followed by SIFS intervals of 640 LRP samples (~2.04 μsec), which separate them from the Beam-Search training sequences.

Extended HRP Beam-Tracking Feedback Using LRP ACK Packets

Format of the extended HRP Beam Tracking feedback is exactly the same as the regular Beam Tracking feedback, where it also uses the same LRP packet type (directional LRPDU with payload).

Similar to other ACK packets, the ACK packet carrying the Beam-Tracking feedback information is also preceded and followed by SIFS intervals of 640 LRP samples (about 2.04 μsec).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
a transmitter having a first digital baseband processing unit coupled to a first phased array antenna system;
a receiver having a second digital baseband processing unit coupled to a second phased array antenna system, wherein the first and second digital baseband processing units cooperate to encode and decode between a digital signal and a modulated analog signal, the receiver further including a physical layer circuit comprising a high rate physical layer circuit and a low rate physical layer circuit; and a feedback channel to feed back control information from the receiver to the transmitter, wherein the feedback channel physical layer comprises of a low rate physical circuit that is operable to produce data rates in the order of megabits per second, and to generate a low rate physical layer (LRP) packet that includes beam-forming phase and magnitude feedback information for transmit antennas.

2. The apparatus of claim 1 wherein the beam forming feedback for the high rate physical layer, which is operable to produce data rates in the order of gigabits per second, and the beam forming feedback for the low rate physical layer, which is operable to produce data rates in the order of megabits per second, includes a 72-bit transmit antenna weight vector.

3. The apparatus of claim 1 wherein the beam forming feedback for the high rate physical layer carries coarse phase information for higher number of transmit antennas, or fine phase information for lower number of transmit antennas, or phase and magnitude information for fewer number of transmit antennas.

4. The apparatus of claim 1 wherein the beam forming feedback for the high rate physical layer carries 2-bit phase information for 36 transmit antennas.

5. The apparatus of claim 1 wherein the beam forming feedback for the high rate physical layer carries 3-bit phase information for 24 transmit antennas.

6. The apparatus of claim 1 wherein the beam forming feedback for the high rate physical layer carries 4-bit phase information for 18 transmit antennas.

7. The apparatus of claim 1 wherein the beam forming feedback for the high rate physical layer carries 3-bit phase information and 3-bit magnitude information for 12 transmit antennas.

8. The apparatus of claim 1 wherein the beam forming feedback for the low rate physical layer carries 4-bit phase and 5-bit magnitude information for 8 transmit antennas.

9. The apparatus of claim 1 wherein the beam forming feedback for the high and low rate physical layers uses gray-coded mapping.

10. The apparatus of claim 1 wherein up to 12 antennas are used in a sectorized manner where the magnitude feedback information is used to select which one or more of the sectors to use.

11. An apparatus comprising:
a transmitter having a first digital baseband processing unit coupled to a first phased array antenna system;
a receiver having a second digital baseband processing unit coupled to a second phased array antenna system, wherein the first and second digital baseband processing units cooperate to encode and decode between a digital signal and a modulated analog signal, the receiver further including a physical layer circuit comprising a high rate physical layer circuit and a low rate physical layer circuit; and
a feedback channel to feed back control information from the receiver to the transmitter, wherein the feedback channel physical layer comprises of a low rate physical circuit that is operable to produce data rates in the order of megabits per second, and to generate low rate physical layer (LRP) packet that includes beam steering feedback information, and wherein the high rate physical layer circuit is operable to support up to 64 transmit antenna elements coupled to the transmitter.

12. The apparatus of claim 11 wherein the high rate physical layer circuit is operable to produce data rates in the order of gigabits per second, and the low rate physical layer circuit is operable to produce data rates in the order of megabits per second.

13. The apparatus defined in claim 11 wherein the first and second digital baseband processing units cooperate to perform adaptive beam steering by
performing adaptive beam forming that includes a beam search process to identify a beam direction; and
performing a beam tracking process to track the beam during a data transfer phase.

14. The apparatus defined in claim 11 wherein the receiver is operable to estimate a transmitter antenna-array weight vector and a receiver antenna-array weight vector.

15. The apparatus defined in claim 11 wherein the receiver is operable to set the receive weight vector while estimating the transmitter antenna-array weight vector and set the transmit weight vector while estimating the receiver antenna-array weight vector.

16. The apparatus defined in claim 11 wherein the first and second digital baseband processing units cooperate to perform beam search and adaptive beam steering by using a set of operations performed iteratively, the set of operations including
(a) the second digital baseband processing unit setting receive phase shifts for receive antennas of the second phased array antenna based on a first weight vector;
(b) the second digital baseband processing unit causing channel gains corresponding to each phase to be sequentially measured and forming a first set of channel gains;
(c) the second digital baseband processing unit calculating a second weight vector based on the first set of channel gains;
(d) the first digital baseband processing unit setting transmit phase shifts for transmit antennas of the first phased array antenna based on the second weight vector;
(e) the second digital baseband processing unit causing channel gains corresponding to each phase to be measured at the receiver and forming a second set of channel gains; and
(f) the second digital baseband processing unit calculating a third weight vector based on the second set of measured channel gains.

17. The apparatus defined in claim 16 wherein the second digital baseband processing unit estimates the transmitter antenna weight vector by estimating channel vector elements one at a time, wherein a number of sequential estimation slots is set to 64.

18. The apparatus defined in claim 16 wherein the second digital baseband processing unit estimates the transmitter antenna weight vector by using a 64-by-64 Hadamard-type matrix as a transfer matrix, such that transmit antenna weight vector is set to columns of the Hadamard-type matrix.

19. The apparatus defined in claim 16 wherein the set of operations further comprises the second digital baseband processing unit using the third weight vector in place of the first weight vector when setting receive phase shifts for the receive antennas for a next iteration, and then repeating operations (a) through (f).

20. The apparatus defined in claim 16 wherein the set of operations is performed for three iterations.

21. The apparatus defined in claim 11 wherein the first and second digital baseband processing units cooperate to perform timing recovery prior to iteratively performing the set of operations.

22. The apparatus defined in claim 16 wherein the first and second digital baseband processing units cooperate to perform delay estimation prior to iteratively performing the set of operations to determine the arrival time of the beam with maximum gain.

23. The apparatus defined in claim 11 wherein the first and second digital baseband processing units cooperate to perform delay estimation by:
the first digital baseband processing unit causing the first phased array antenna to transmit a known symbol sequence over the air; and
the second digital baseband processing unit causing the known symbol sequence to be matched at the receiver via a matched filter.

24. The apparatus defined in claim 11:
wherein the first and second digital baseband processing units cooperate to perform adaptive beam steering by performing a beam tracking process; and
wherein the beam tracking process comprises performing a single iteration of the pair of trainings defined in claim 20 in two operations for 64 transmit antennas, wherein the first 32 antennas are trained in a first operation, and the second 32 antennas are trained in a second operation.

25. The apparatus defined in claim 24 wherein the second digital baseband processing unit estimates the transmitter antenna weight vector by estimating channel vector elements one at a time, wherein a number of sequential estimation slots is set to 36.

26. The apparatus defined in claim 24 wherein the second digital baseband processing unit estimates the transmitter antenna weight vector by using a 36-by-36 Hadamard-type matrix as a transfer matrix, such that transmit antenna weight vector is set to columns of the Hadamard-type matrix.

27. The apparatus defined in claim 11 wherein the transmitter antenna weight vector that produces the strongest received signal at the receiver is repeated more than once during the sequential estimation of the transmitter antenna weight vector.

28. The apparatus defined in claim 11 wherein the second digital baseband processing unit sends an index of the transmit weight vector that produced the strongest received signal at the receiver during the sequential estimation of the transmitter antenna weight vector, from the receiver to the transmitter using the back channel.

29. A method comprising:
generating a modulated analog signal to send, via a wireless communication channel, wherein generating the modulated analog signal further comprises
sending, on a feedback channel, control information as feedback from a receiver to a transmitter using a low rate physical circuit that is part of the feedback channel physical layer and is operable to produce data rates in the order of megabits per second, and to generate a low rate physical layer (LRP) packet that includes beam-forming phase and magnitude feedback information for transmit antennas.

30. The method of claim 29 wherein the control information comprises beam forming feedback for a high rate physical layer, which is operable to produce data rates in the order of gigabits per second, and the beam forming feedback for the low rate physical layer, which is operable to produce data rates in the order of megabits per second, includes a 72-bit antenna weight vector.

31. The method of claim 29 wherein the control information comprises beam forming feedback for a high rate physical layer which comprises coarse phase information for higher number of transmit antennas, or fine phase information for lower number of transmit antennas, or phase and magnitude information for fewer number of transmit antennas.

32. The method of claim 29 wherein the control information comprises beam forming feedback for a high rate physical layer which comprises 2-bit phase information for 36 transmit antennas.

33. The method of claim 29 wherein the control information comprises beam forming feedback for a high rate physical layer which comprises 3-bit phase information for 24 transmit antennas.

34. The method of claim 29 wherein the control information comprises beam forming feedback for a high rate physical layer which comprises 4-bit phase information for 18 transmit antennas.

35. The method of claim 29 wherein the control information comprises beam forming feedback for a high rate physical layer which comprises 3-bit phase information and 3-bit magnitude information for 12 transmit antennas.

36. The method of claim 29 wherein the control information comprises beam forming feedback for a low rate physical layer which comprises 4-bit phase and 5-bit magnitude information for 8 transmit antennas.

37. The method of claim 29 wherein the control information comprises beam forming feedback for high and low rate physical layers that use gray-coded mapping.

38. The method of claim 35 wherein the 12 transmit antennas are sectorized antennas, and the magnitude feedback values are used to select one or more sectors to select.

39. A method comprising:
generating a modulated analog signal to send, via a wireless communication channel, wherein generating the modulated analog signal further comprises using a high rate channel from a transmitter to a receiver in which a high rate physical layer circuit is operable to support up to 64 transmit antenna elements coupled to the transmitter; and
setting a receive weight vector while estimating a transmitter antenna-array weight vector and setting a transmit weight vector while estimating a receiver antenna-array weight vector.

40. The method of claim 39 wherein the high rate physical layer circuit is operable to produce data rates in the order of gigabits per second, and a low rate physical layer circuit of the receiver is operable to produce data rates in the order of megabits per second.

41. The method of claim 39 further comprising first and second digital baseband processing units cooperating to perform adaptive beam steering by
performing adaptive beam forming that includes a beam search process to identify a beam direction; and
performing a beam tracking process to track the beam during a data transfer phase.

42. The method of claim 39 further comprising:
estimating the transmitter antenna-array weight vector and the receiver antenna-array weight vector at the receiver.

43. The method of claim 39 further comprising first and second digital baseband processing units cooperating to perform a beam search and adaptive beam steering by using a set of operations performed iteratively, wherein the first digital baseband processing unit is coupled with a first phased array antenna system, wherein the second digital baseband processing unit is coupled with a second phased array antenna system, and wherein the set of operations includes:
(a) the second digital baseband processing unit setting receive phase shifts for receive antennas of the second phased array antenna based on a first weight vector;

(b) the second digital baseband processing unit causing channel gains corresponding to each phase to be sequentially measured and forming a first set of channel gains;

(c) the second digital baseband processing unit calculating a second weight vector based on the first set of channel gains;

(d) the first digital baseband processing unit setting transmit phase shifts for transmit antennas of the first phased array antenna based on the second weight vector;

(e) the second digital baseband processing unit causing channel gains corresponding to each phase to be measured at the receiver and forming a second set of channel gains; and (f) the second digital baseband processing unit calculating a third weight vector based on the second set of measured channel gains.

44. The method of claim 43 wherein the second digital baseband processing unit estimates the transmitter antenna weight vector by estimating channel vector elements one at a time, wherein a number of sequential estimation slots is set to 64.

45. The method of claim 43 wherein the second digital baseband processing unit estimates the transmitter antenna weight vector by using a 64-by-64 Hadamard-type matrix as a transfer matrix, such that transmit antenna weight vector is set to columns of the Hadamard-type matrix.

46. The method of claim 43 wherein the set of operations further comprises the second digital baseband processing unit using the third weight vector in place of the first weight vector when setting receive phase shifts for the receive antennas for a next iteration, and then repeating operations (a) through (f).

47. The method of claim 43 wherein the set of operations is performed for three iterations.

48. The method of claim 43 further comprising first and second digital baseband processing units cooperating to perform timing recovery prior to iteratively performing the set of operations.

49. The method of claim 43 further comprising first and second digital baseband processing units cooperating to perform delay estimation prior to iteratively performing the set of operations to determine an arrival time of a beam with maximum gain.

50. The method of claim 39 further comprising first and second digital baseband processing units cooperating to perform delay estimation by:

the first digital baseband processing unit causing a first phased array antenna coupled with the first digital baseband processing unit to transmit a known symbol sequence over the air; and the second digital baseband processing unit causing the known symbol sequence to be matched at the receiver via a matched filter.

51. The method of claim 39 further comprising performing a beam tracking process by performing a single iteration of the pair of trainings defined in claim 16 in two operations for 64 transmit antennas, wherein the first 32 antennas are trained in a first operation, and the second 32 antennas are trained in a second operation.

52. The method of claim 51 further comprising a second digital baseband processing unit estimating a transmitter antenna weight vector by estimating channel vector elements one at a time, wherein a number of sequential estimation slots is set to 36.

53. The method of claim 51 further comprising a second digital baseband processing unit estimating the transmitter antenna weight vector by using a 36-by-36 Hadamard-type matrix as a transfer matrix, such that transmit antenna weight vector is set to columns of the Hadamard-type matrix.

54. The method of claim 39 further comprising repeating a transmitter antenna weight vector that produces the strongest received signal at the receiver more than once during the sequential estimation of the transmitter antenna weight vector.

55. The method of claim 39 further comprising a second digital baseband processing unit sending an index of the transmit weight vector that produced the strongest received signal at the receiver during the sequential estimation of the transmitter antenna weight vector, from the receiver to the transmitter using the back channel.

\* \* \* \* \*